United States Patent
Xu et al.

(10) Patent No.: US 12,500,969 B2
(45) Date of Patent: Dec. 16, 2025

(54) FOLDING APPARATUS AND ELECTRONIC DEVICE

(71) Applicant: Huawei Technologies Co., Ltd., Shenzhen (CN)

(72) Inventors: Zhengyi Xu, Shanghai (CN); Chunjun Ma, Shanghai (CN); Linhui Niu, Shanghai (CN); Yunyong Li, Shanghai (CN); Gangchao Wang, Shanghai (CN); Ting Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 648 days.

(21) Appl. No.: 17/919,066

(22) PCT Filed: Apr. 15, 2021

(86) PCT No.: PCT/CN2021/087451
§ 371 (c)(1),
(2) Date: Oct. 14, 2022

(87) PCT Pub. No.: WO2021/208998
PCT Pub. Date: Oct. 21, 2021

(65) Prior Publication Data
US 2023/0164253 A1 May 25, 2023

(30) Foreign Application Priority Data
Apr. 15, 2020 (CN) .......................... 202010295201.4

(51) Int. Cl.
*H04M 1/02* (2006.01)
*G06F 1/16* (2006.01)

(52) U.S. Cl.
CPC ........ *H04M 1/0268* (2013.01); *G06F 1/1641* (2013.01); *G06F 1/1652* (2013.01); *H04M 1/022* (2013.01)

(58) Field of Classification Search
CPC .. H04M 1/0268; H04M 1/022; H04M 1/0216; H04M 1/02; H04M 1/0249;
(Continued)

(56) References Cited

U.S. PATENT DOCUMENTS 10,480,225 B1 11/2019 Hsu et al.
2015/0233162 A1 8/2015 Lee et al.
(Continued)

FOREIGN PATENT DOCUMENTS

CN 206112430 U 4/2017
CN 206282175 U 6/2017
(Continued)

*Primary Examiner* — Fred A Casca
(74) *Attorney, Agent, or Firm* — Slater Matsil, LLP

(57) ABSTRACT

A rotating mechanism includes a main shaft assembly, a first fixed bracket, a first transmission arm, a first rotating arm, a second fixed bracket, a second transmission arm, and a second rotating arm. A sliding end of the first transmission arm is slidably connected to the first fixed bracket, a rotating end of the first transmission arm is rotatably connected to the main shaft assembly, one end of the first rotating arm is rotatably connected to the first fixed bracket, and an other end of the first rotating arm is rotatably connected to the main shaft assembly.

20 Claims, 27 Drawing Sheets

(58) Field of Classification Search
CPC .... H04M 1/035; G06F 1/1641; G06F 1/1652; G06F 1/1681; G06F 1/1675; G06F 1/16; G06F 1/1683; G06F 1/1684; G06F 1/1688; H04R 1/04; H04R 1/2876; H04R 1/406; H04R 3/005; H04R 2499/11
See application file for complete search history.

(56) References Cited

U.S. PATENT DOCUMENTS

| | | | |
|---|---|---|---|
| 2018/0210496 A1* | 7/2018 | Lin | .................... E05D 11/0054 |
| 2019/0391618 A1 | 12/2019 | Hsu | |
| 2020/0103935 A1 | 4/2020 | Hsu | |

FOREIGN PATENT DOCUMENTS

| | | |
|---|---|---|
| CN | 107067982 A | 8/2017 |
| CN | 206790538 U | 12/2017 |
| CN | 108428408 A | 8/2018 |
| CN | 108648624 A | 10/2018 |
| CN | 109194782 A | 1/2019 |
| CN | 109936648 A | 6/2019 |
| CN | 209232310 U | 8/2019 |
| CN | 209375705 U | 9/2019 |
| CN | 110445913 A | 11/2019 |
| CN | 110599907 A | 12/2019 |
| CN | 209881844 U | 12/2019 |
| CN | 110719346 A | 1/2020 |
| CN | 110767091 A | 2/2020 |
| CN | 110958338 A | 4/2020 |
| CN | 111614806 A | 9/2020 |
| EP | 4089990 A1 | 11/2022 |
| EP | 4216520 A1 | 7/2023 |
| WO | 2019120167 A1 | 6/2019 |

* cited by examiner

FOLDING APPARATUS AND ELECTRONIC DEVICE

CROSS REFERENCE TO RELATED APPLICATIONS

This application is a National Stage of International Application No. PCT/CN2021/087451, filed on Apr. 15, 2021, which claims priority to Chinese Patent Application No. 202010295201.4, filed on Apr. 15, 2020. Both of the aforementioned applications are hereby incorporated by reference in their entireties.

TECHNICAL FIELD

This application relates to the field of foldable electronic product technologies, and in particular, to a folding apparatus and an electronic device.

BACKGROUND

In recent years, flexible displays are widely applied to various foldable electronic devices because of advantages such as lightness, thinness, and non-fragility. The foldable electronic device further includes a folding apparatus configured to bear the flexible display. The folding apparatus usually includes two housings and a rotating mechanism connected between the two housings. The two housings are folded or unfolded relative to each other through deformation of the rotating mechanism, to drive folding or unfolding of the flexible display. However, when a conventional folding apparatus is folded or unfolded, because a length of a bearing surface of the conventional folding apparatus that is used to bear a flexible display is changed significantly, the flexible display tends to be stretched in a folding process and squeezed in an unfolding process. As a result, the flexible display is easily damaged, and a service life of the flexible display is shortened.

SUMMARY

An objective of this application is to provide a folding apparatus and an electronic device. The folding apparatus is configured to bear a flexible display. According to this application, when the folding apparatus is folded or unfolded, a risk that the flexible display is stretched or squeezed is low, so that reliability of the flexible display is high, and a service life of the flexible display is long.

According to a first aspect, this application provides a folding apparatus. The folding apparatus may be applied to a foldable electronic device, and is configured to bear a flexible display. The folding apparatus includes a first housing, a rotating mechanism, and a second housing that are connected sequentially. The rotating mechanism can deform, so that the first housing and the second housing are folded or unfolded relative to each other.

The rotating mechanism includes a main shaft assembly, a first fixed bracket, a first transmission arm, a first rotating arm, a second fixed bracket, a second transmission arm, and a second rotating arm. The first fixed bracket is fastened to the first housing, the first transmission arm includes a sliding end and a rotating end, the sliding end of the first transmission arm is slidably connected to the first fixed bracket, the rotating end of the first transmission arm is rotatably connected to the main shaft assembly, one end of the first rotating arm is rotatably connected to the first fixed bracket, and the other end of the first rotating arm is rotatably connected to the main shaft assembly. The second fixed bracket is fastened to the second housing, the second transmission arm includes a sliding end and a rotating end, the sliding end of the second transmission arm is slidably connected to the second fixed bracket, the rotating end of the second transmission arm is rotatably connected to the main shaft assembly, one end of the second rotating arm is rotatably connected to the second fixed bracket, and the other end of the second rotating arm is rotatably connected to the main shaft assembly.

In this application, the rotating mechanism controls motion tracks of the first fixed bracket and the first housing by using both the first transmission arm and the first rotating arm, and controls motion tracks of the second fixed bracket and the second housing by using both the second transmission arm and the second rotating arm. Therefore, when the first housing and the second housing are folded relative to each other, the rotating mechanism enables the first fixed bracket to drive the first housing to approach the main shaft assembly, and enables the second fixed bracket to drive the second housing to approach the main shaft assembly. When the first housing and the second housing are unfolded relative to each other, the rotating mechanism enables the first fixed bracket drive the first housing to move away from the main shaft assembly, and enables the second fixed bracket to drive the second housing to move away from the main shaft assembly. In other words, the rotating mechanism can implement pulling-in of the housing when the folding apparatus is switched from a flattened state to a closed state and pushing-out of the housing when the folding apparatus is switched from the closed state to the flattened state, so that the folding apparatus can implement deformation by using the flexible display as a neutral surface when being unfolded or folded. In this way, a risk that the flexible display is stretched or squeezed is reduced, to protect the flexible display and improve reliability of the flexible display, so that the flexible display and the electronic device have long service lives.

When the first housing and the second housing are folded relative to each other to the closed state by using the rotating mechanism, the first housing and the second housing can be completely closed, and there is no gap between the first housing and the second housing or a gap between the first housing and the second housing is small. Therefore, appearance integrity of the folding apparatus is implemented, and self-shielding in appearance is implemented. Appearance integrity of the electronic device to which the folding apparatus is applied is implemented, so that product reliability and user experience are improved.

In addition, the first transmission arm is rotatably connected to the main shaft assembly and slidably connected to the first fixed bracket to form a link-slider structure, and the first rotating arm is rotatably connected to the main shaft assembly and rotatably connected to the first fixed bracket to form a link structure. The second transmission arm is rotatably connected to the main shaft assembly and is slidably connected to the second fixed bracket to form a link-slider structure. The second rotating arm is rotatably connected to the main shaft assembly and rotatably connected to the second fixed bracket to form a link structure. In the rotating mechanism, the housing is connected to the main shaft assembly by using the link-slider structure and the link structure. A quantity of components of the rotating mechanism is small, a cooperation relationship and a cooperation position are simple, and the components are easy to manufacture and assemble. This facilitates mass production. In addition, because the main shaft assembly is associated with the first fixed bracket by using the first transmission arm and the first rotating arm, and the main shaft assembly is associated with the second fixed bracket by using the second transmission arm and the second rotating arm, the rotating mechanism has a better mechanism stretching-resistance capability and mechanism squeezing-resistance capability.

In a possible implementation, the main shaft assembly includes a main inner shaft and a main outer shaft that is fastened to the main inner shaft, and when the first housing and the second housing are folded relative to each other to a closed state, the main inner shaft is located between the main outer shaft and each of the first fixed bracket and the second fixed bracket.

A rotation center around which the first transmission arm rotates relative to the main shaft assembly is close to the main inner shaft and away from the main outer shaft, and a rotation center around which the first rotating arm rotates relative to the main shaft assembly is close to the main outer shaft and away from the main inner shaft. A rotation center around which the second transmission arm rotates relative to the main shaft assembly is close to the main inner shaft and away from the main outer shaft, and a rotation center around which the second rotating arm rotates relative to the main shaft assembly is close to the main outer shaft and away from the main inner shaft.

In this implementation, locations of the rotation center around which the first transmission arm rotates relative to the main shaft assembly, the rotation center around which the first rotating arm rotates relative to the main shaft assembly, the rotation center around which the second transmission arm rotates relative to the main shaft assembly, and the rotation center around which the second rotating arm rotates relative to the main shaft assembly are set, so that the rotating mechanism can more easily implement pulling-in of the housing when the folding apparatus is switched from the flattened state to the closed state and pushing-out of the housing when the folding apparatus is switched from the closed state to the flattened state.

In a possible implementation, a plurality of three-dimensional space structures are disposed on both the main inner shaft and the main outer shaft. These structures are designed, so that after the main inner shaft and the main outer shaft are assembled, the main inner shaft and the main outer shaft can jointly form a plurality of movement spaces, and mechanical parts of the rotating mechanism are movably disposed in the plurality of movement spaces of the main shaft assembly, to implement connection to the main shaft assembly. A split design of the main inner shaft and the main outer shaft helps reduce manufacturing difficulty of the main shaft assembly, and improve manufacturing precision and a product yield of the main shaft assembly.

In a possible implementation, the main inner shaft and the main outer shaft of the main shaft assembly jointly enclose a plurality of arc-shaped grooves. The rotating end of the first transmission arm is arc-shaped and is disposed in one of the arc-shaped grooves, and an end that is of the first rotating arm and that is rotatably connected to the main shaft assembly is arc-shaped and is disposed in another arc-shaped groove. The rotating end of the second transmission arm is arc-shaped and is disposed in another arc-shaped groove, and an end that is of the second rotating arm and that is rotatably connected to the main shaft assembly is arc-shaped and is disposed in another arc-shaped groove.

In this implementation, the first transmission arm is connected to the main shaft assembly by using a virtual shaft, the first rotating arm is connected to the main shaft assembly by using a virtual shaft, the second transmission arm is connected to the main shaft assembly by using a virtual shaft, and the second rotating arm is connected to the main shaft assembly by using a virtual shaft. A rotatable connection has a simple structure and occupies small space. This helps reduce a thickness of the rotating mechanism, so that the folding apparatus and the electronic device are more light and thin.

In a possible implementation, there is a first arc-shaped groove on the first fixed bracket, and an end that is of the first rotating arm and that is rotatably connected to the first fixed bracket is arc-shaped and is disposed in the first arc-shaped groove. There is a second arc-shaped groove on the second fixed bracket, and an end that is of the second rotating arm and that is rotatably connected to the second fixed bracket is arc-shaped and is disposed in the second arc-shaped groove.

In this implementation, the first rotating arm is connected to first fixed bracket by using a virtual shaft, and the second rotating arm is connected to the second fixed bracket by using a virtual shaft. In this way, a rotatable connection has a simple structure and occupies small space. This helps reduce a thickness of the rotating mechanism, so that the folding apparatus and the electronic device are more light and thin.

In a possible implementation, the first fixed bracket includes a first fixed base and a first fastener, and the first fastener is fastened to the first fixed base, and encloses the first arc-shaped groove with the first fixed base. In this implementation, a processing manner is used in which the first fixed base and the first fastener are separately manufactured, and then the first fixed base and the first fastener are assembled into the first fixed bracket. This helps reduce processing difficulty of the first fixed bracket, and improve a product yield of the first fixed bracket. The first fastener and the first fixed base may be fastened to each other by using a fastener.

In a possible implementation, the first fastener has an arc surface used to enclose the first arc-shaped groove, and a limiting groove is formed on a middle part of the arc surface and configured to limit, in an axial direction of the main shaft assembly, the first rotating arm disposed in the first arc-shaped groove, to improve reliability of a connection structure. In some other implementations, the limiting groove may alternatively be formed on an arc surface that is of the first fixed base and that is used to enclose the first arc-shaped groove. The first fastener may further have a stop block, configured to prevent the first rotating arm disposed in the first arc-shaped groove from being accidentally detached from the first arc-shaped groove.

In a possible implementation, the second fixed bracket includes a second fixed base and a second fastener. The second fastener is fastened to the second fixed base, and encloses a second arc-shaped groove with the second fixed base.

In a possible implementation, an end that is of the first rotating arm and that is connected to the first fixed bracket includes a limiting bulge and a limiting projection. The limiting bulge is configured to cooperate with the limiting groove of the first arc-shaped groove. The limiting projection is configured to cooperate with the stop block of the first fixed bracket. In a possible implementation, an end that is of the first rotating arm and that is connected to the main shaft assembly includes a limiting bulge and a limiting projection. The limiting bulge is configured to cooperate with a limiting groove of the main shaft assembly. The limiting projection is configured to cooperate with a limiting projection of the main shaft assembly.

In this implementation, the first rotating arm is approximately in a "W" shape. The first rotating arm is connected to the first fixed bracket by using a virtual shaft, and the first rotating arm is also connected to the main shaft assembly by using a virtual shaft. In this way, a rotatable connection has a simple structure and occupies small space. This helps reduce a thickness of the rotating mechanism, so that the folding apparatus and the electronic device are more light and thin.

In a possible implementation, there is a first sliding slot and a first accommodating slot on the first fixed bracket, and the first accommodating slot communicates with the first sliding slot. The rotating mechanism further includes a first limiting component, the first limiting component is disposed in the first accommodating slot. The sliding end of the first transmission arm is disposed in the first sliding slot, there is a first recessed area and a second recessed area on the sliding end of the first transmission arm, and the second recessed area is located between the first recessed area and the rotating end of the first transmission arm. When the first housing and the second housing are unfolded relative to each other to the flattened state, the first limiting component is partially clamped into the first recessed area. When the first housing and the second housing are folded relative to each other to the closed state, the first limiting component is partially clamped into the second recessed area.

In this implementation, the first limiting component is clamped to the sliding end of the first transmission arm to limit the first transmission arm, so that the first transmission arm and the first fixed bracket can maintain a preset relative position relationship when no large external force is applied, the rotating mechanism can stay at a preset angle, and the rotating mechanism can maintain the flattened state or the closed state. In this way, user experience of the folding apparatus and the electronic device is improved.

In a possible implementation, there is a recessed guiding space on a side wall of the first sliding slot, the sliding end of the first transmission arm includes a first flange on a circumferential side, the first flange is disposed in the guiding space of the first sliding slot, and the first recessed area and the second recessed area are formed on the first flange. The guiding space of the first sliding slot cooperates with the first flange of the first transmission arm, so that the sliding end of the first transmission arm can be guided in a sliding direction of the first sliding slot. In this way, a relative sliding action between the first transmission arm and the first fixed bracket is easier to implement and control precision is higher.

In a possible implementation, the first limiting component includes a first bracket and a first elastic part. The first bracket is a rigid structure and is not easy to deform under an external force. The first elastic part is an elastic structure and is easy to deform under an external force. The first bracket includes a control part and an abutting part, one end of the first elastic part is disposed on the control part of the first bracket, the other end of the first elastic part abuts against a slot wall of the first accommodating slot, and the abutting part of the first bracket is clamped to the sliding end of the first transmission arm.

In this implementation, because the first elastic part of the first limiting component can deform under an external force, the first limiting component can smoothly move between the first recessed area and the second recessed area relative to the sliding end of the first transmission arm, to improve reliability of limiting between the first limiting component and the sliding end of the first transmission arm.

In a possible implementation, the first limiting component may further include a first elastic part, and the first elastic part is disposed on the abutting part of the first bracket. The first elastic part may be made of a material (for example, rubber) with low rigidity, so that when subject to an external force, the first elastic part can absorb an impact force through deformation, to implement cushioning. Because the first elastic part is sleeved on the abutting part of the first bracket, the first limiting component abuts against the sliding end of the first transmission arm by using the first elastic part having a cushioning function. This helps reduce a risk of wearing the first bracket and the first transmission arm in a long-time relative movement, improve limiting reliability of the first limiting component, and improve reliability of the rotating assembly.

In a possible implementation, the first bracket of the first limiting component may further include a positioning part. The positioning part is fastened below the abutting part, and protrudes relative to the abutting part in a direction away from the control part. Two adjacent surfaces of the first flange of the first transmission arm respectively abut the abutting part of the first bracket and the positioning part of the first bracket, so that the first flange can slide relative to the positioning part of the first bracket. The positioning part of the first bracket is disposed, so that a limiting connection relationship between the first limiting component and the sliding end of the first transmission arm is more reliable, to improve reliability of the rotating assembly.

In a possible implementation, the rotating mechanism further includes a first synchronous swing arm and a second synchronous swing arm. The first synchronous swing arm includes a rotating end and a movable end, the rotating end of the first synchronous swing arm is rotatably connected to the main shaft assembly, the movable end of the first synchronous swing arm is movably connected to the first fixed bracket, and when the first housing and the second housing are folded or unfolded relative to each other, the movable end of the first synchronous swing arm slides and rotates relative to the first fixed bracket. The second synchronous swing arm includes a rotating end and a movable end, the rotating end of the second synchronous swing arm is rotatably connected to the main shaft assembly, the rotating end of the second synchronous swing arm is engaged with the rotating end of the first synchronous swing arm, the movable end of the second synchronous swing arm is movably connected to the second fixed bracket, and when the first housing and the second housing are folded or unfolded relative to each other, the movable end of the second synchronous swing arm slides and rotates relative to the second fixed bracket.

In this implementation, the rotating end of the first synchronous swing arm and the rotating end of the second synchronous swing arm are engaged with each other, and both the rotating end of the first synchronous swing arm and the rotating end of the second synchronous swing arm are rotatably connected to the main shaft assembly, the movable end of the first synchronous swing arm is movably connected to the first fixed bracket, and the movable end of the second synchronous swing arm is movably connected to the second fixed bracket. Therefore, when the first housing and the second housing are unfolded or folded relative to each other, the first synchronous swing arm and the second synchronous swing arm can control rotation angles of the first fixed bracket and the second fixed bracket to be consistent relative to the main shaft assembly, so that rotation actions of the first housing and the second housing are synchronous and consistent. Symmetry of folding actions and unfolding actions of the folding apparatus is high. This helps improve user experience.

The first synchronous swing arm is rotatably connected to the main shaft assembly, and slidably and rotatably connected to the first fixed bracket, so that a link-slider structure is formed. The second synchronous swing arm is rotatably connected to the main shaft assembly, and slidably and rotatably connected to the second fixed bracket, so that a link-slider structure is formed. The two link-slider structures that are engaged with each other can effectively control the rotation actions of the first housing and the second housing to be synchronous and consistent.

In a possible implementation, the rotating end of the first synchronous swing arm includes a first rotating body, a first rotating shaft, and a first gear, the first rotating shaft is fastened to a front facet and/or a back facet of the first rotating body, the first gear is fastened to a circumferential side facet of the first rotating body, and the first rotating shaft is rotatably connected to the main shaft assembly.

The rotating end of the second synchronous swing arm includes a second rotating body, a second rotating shaft, and a second gear, the second rotating shaft is fastened to a front facet and/or a back facet of the second rotating body, the second gear is fastened to a circumferential side facet of the second rotating body, the second rotating shaft is rotatably connected to the main shaft assembly, and the second gear is engaged with the first gear.

In this implementation, the rotating end of the first synchronous swing arm and the rotating end of the second synchronous swing arm are directly engaged with each other by using the first gear and the second gear, so that a synchronization assembly jointly formed by the first synchronous swing arm and the second synchronous swing arm has a simple structure, a movement process is easy to control, and accuracy is high.

In a possible implementation, there is a third sliding slot on the first fixed bracket, there is a recessed guiding space on a slot wall of the third sliding slot, the movable end of the first synchronous swing arm has a third rotating shaft, the first synchronous swing arm is disposed in the third sliding slot, and the third rotating shaft is disposed in the guiding space of the third sliding slot. There is a fourth sliding slot on the second fixed bracket, there is a recessed guiding space on a slot wall of the fourth sliding slot, the movable end of the second synchronous swing arm has a fourth rotating shaft, the second synchronous swing arm is disposed in the fourth sliding slot, and the fourth rotating shaft is disposed in the guiding space of the fourth sliding slot.

In this implementation, the guiding space of the third sliding slot cooperates with the first rotating shaft of the first synchronous swing arm, so that the movable end of the first synchronous swing arm can be guided in a sliding direction of the third sliding slot. In this way, a relative movement action between the first synchronous swing arm and the first fixed bracket is easier to implement and control precision is higher. The guiding space of the fourth sliding slot cooperates with the fourth rotating shaft of the second synchronous swing arm, so that the movable end of the second synchronous swing arm can be guided in a sliding direction of the fourth sliding slot. In this way, a relative movement action between the second synchronous swing arm and the second fixed bracket is easier to implement and control precision is higher.

In some other implementations, the first synchronous swing arm may alternatively be connected to the first fixed bracket by using a connector, and the second synchronous swing arm may alternatively be connected to the second fixed bracket by using a connector. For example, the rotating mechanism further includes a first connector and a second connector. The first connector is slidably disposed in the guiding space of the third sliding slot, the first rotating shaft is rotatably connected to the first connector, the second connector is slidably disposed in the guiding space of the fourth sliding slot, and the second rotating shaft is rotatably connected to the second connector.

In a possible implementation, the rotating mechanism further includes a first supporting plate and a second supporting plate, the first supporting plate is fixedly connected to the sliding end of the first transmission arm, and the second supporting plate is fixedly connected to the sliding end of the second transmission arm. When the first housing and the second housing are unfolded relative to each other to the flattened state, the first supporting plate is flush with the second supporting plate, the first supporting plate is laid between the first fixed bracket and the main shaft assembly, and the second supporting plate is laid between the second fixed bracket and the main shaft assembly. When the first housing and the second housing are folded relative to each other to the closed state, the first supporting plate is stacked on a side that is of the first fixed bracket and that is away from the second fixed bracket, and the second supporting plate is stacked on a side that is of the second fixed bracket and that is away from the first fixed bracket.

In this implementation, when the first housing and the second housing are unfolded relative to each other to the flattened state, the first supporting plate, the main shaft assembly, and the second supporting plate can jointly form a complete planar support for a bending part of the flexible display. When the first housing and second housing are folded relative to each other to the closed state, the first supporting plate and the second supporting plate can slide and be accommodated relative to the first housing and the second housing respectively, so that the main shaft assembly is exposed to form complete support for the bending part of the flexible display. In other words, when the folding apparatus is in the flattened state or the closed state, the rotating mechanism can completely support the bending part of the flexible display, thereby helping protect the flexible display and improving user experience.

In a possible implementation, the main shaft assembly has a supporting surface. When the first housing and the second housing are folded relative to each other to the closed state, the supporting surface of the main shaft assembly is exposed relative to the first supporting plate and the second supporting plate. The supporting surface of the main shaft assembly is arc-shaped.

In this implementation, when the first housing and the second housing are folded relative to each other to a closed state, the main shaft assembly can provide a complete-semicircle or nearly-semicircle support for the bending part of the flexible display, which is consistent with an ideal closed form of the bending part of the flexible display, so that more optimized support can be provided for the flexible display in the closed form.

In a possible implementation, the rotating mechanism further includes a first shielding plate and a second shielding plate. The first shielding plate is fixedly connected to the sliding end of the first transmission arm, and the second shielding plate is fixedly connected to the sliding end of the second transmission arm. The first shielding plate is located on a side that is of the first transmission arm and that faces away from the first supporting plate, and the second shielding plate is located on a side that is of the second transmission arm and that faces away from the second supporting plate.

When the first housing and the second housing are unfolded relative to each other to the flattened state, the first shielding plate is flush with the second shielding plate, the first shielding plate is laid between the first fixed bracket and the main shaft assembly, and the second shielding plate is laid between the second fixed bracket and the main shaft assembly. When the first housing and the second housing are folded relative to each other to the closed state, the first shielding plate is located between the first fixed bracket and the first housing, and the second shielding plate is located between the second fixed bracket and the second housing.

In this implementation, when the first housing and the second housing are unfolded relative to each other to the flattened state, the first shielding plate is flush with the second shielding plate, the first shielding plate is laid between the first fixed bracket and the main shaft assembly, and can shield a gap between the first fixed bracket and the main shaft assembly, and the second shielding plate is laid between the second fixed bracket and the main shaft assembly, and can shield a gap between the second fixed bracket and the main shaft assembly. Therefore, the folding apparatus can implement self-shielding. In this way, appearance integrity is improved, a risk that dust, sundries, and the like enter the rotating mechanism from outside can also be lowered, to ensure reliability of the folding apparatus. When the first housing and the second housing are folded relative to each other to the closed state, the first shielding plate can be accommodated between the first fixed bracket and the first housing, and the second shielding plate can be accommodated between the second fixed bracket and the second housing, so that avoidance is achieved. In this way, the folding apparatus can be smoothly folded to the closed form, and mechanism reliability is high.

In this implementation, the first supporting plate and the first shielding plate are fastened to the sliding end of the first transmission arm, and the first supporting plate and the first shielding plate move with the sliding end of the first transmission arm, and the second supporting plate and the second shielding plate are fastened to the sliding end of the second transmission arm, and the second supporting plate and the second shielding plate move with the sliding end of the second transmission arm. Therefore, when the folding apparatus is switched from the closed state to the flattened state or when the folding apparatus is switched from the flattened state to the closed state, the first supporting plate and the second supporting plate gradually approach the main shaft assembly or move away from the main shaft assembly, so that the folding apparatus can completely support the flexible display in various forms. In this way, reliability of the flexible display and the electronic device is improved and service lives of the flexible display and the electronic device are increased. In addition, when the folding apparatus is switched from the closed state to the flattened state or when the folding apparatus is switched from the flattened state to the closed state, the first shielding plate and the second shielding plate gradually approach the main shaft assembly or move away from the main shaft assembly, so that the folding apparatus in the various forms can adapt to forms of the rotating mechanism, to implement self-shielding. In this way, mechanism reliability is high.

Moreover, because both the first supporting plate and the first shielding plate are fastened to the sliding end of the first transmission arm, and both the second supporting plate and the second shielding plate are fastened to the sliding end of the second transmission arm, the first transmission arm and the second transmission arm not only control rotation actions of the first housing and the second housing, but also control extending or retracting of the first supporting plate, the first shielding plate, the second supporting plate, and the second shielding plate. Therefore, the rotating mechanism is highly integrated, an overall connection relationship is simple, and mechanism reliability is high.

In a possible implementation, the main shaft assembly has a shielding surface. When the first housing and the second housing are unfolded relative to each other to the flattened state, the shielding surface of the main shaft assembly is exposed relative to the first shielding plate and the second shielding plate. Therefore, the first shielding plate, the main shaft assembly, and the second shielding plate can jointly shield a gap between the first housing and the second housing, so that the rotating mechanism can implement self-shielding in the flattened state. This improves appearance integrity.

In a possible implementation, the main shaft assembly further includes a shielding plate, and the shielding plate is fastened on a side that is of the main inner shaft and that faces away from the main outer shaft. The shielding surface of the main shaft assembly is formed on the shielding plate, and the shielding surface is disposed to face away from the main inner shaft. The shielding plate may be integrated with the main inner shaft, or the shielding plate and the main inner shaft may be fastened to each other in an assembled manner.

In a possible implementation, the rotating mechanism further includes a third transmission arm, a third fixed bracket, a fourth transmission arm, and a fourth fixed bracket, the third fixed bracket is fastened to the first housing, one end of the third transmission arm is rotatably connected to the main shaft assembly, the other end of the third transmission arm is slidably connected to the third fixed bracket, the fourth fixed bracket is fastened to the second housing, one end of the fourth transmission arm is rotatably connected to the main shaft assembly, and the other end of the fourth transmission arm is slidably connected to the fourth fixed bracket.

In this implementation, the third transmission arm, the third fixed bracket, the fourth transmission arm, and the fourth fixed bracket are disposed in the rotating mechanism to increase interaction force between the first housing and the second housing, and the rotating mechanism, so that the folding apparatus is easier to fold and unfold.

In a possible implementation, there is a fifth sliding slot on the third fixed bracket, and a middle part of a slot wall of the fifth sliding slot is recessed to form a guiding space of the fifth sliding slot. The third transmission arm includes a sliding end and a rotating end. The sliding end of the third transmission arm has a third flange. The sliding end of the third transmission arm is disposed in the fifth sliding slot, and the third flange is disposed in the guiding space of the fifth sliding slot. The rotating end of the third transmission arm is arc-shaped and is disposed in one of the arc-shaped grooves of the main shaft assembly. In this case, the third transmission arm is rotatably connected to the main shaft assembly by using a virtual shaft.

In a possible implementation, a rotation center around which the third transmission arm rotates relative to the main shaft assembly and the rotation center around which the first transmission arm rotates relative to the main shaft assembly are collinear. A rotation center around which the fourth transmission arm rotates relative to the main shaft assembly and the rotation center around which the second transmission arm rotates relative to the main shaft assembly are collinear.

In this implementation, the rotation centers around which the third transmission arm and the first transmission arm rotate relative to the main shaft assembly are collinear, and the third transmission arm is slidably connected to the third fixed bracket, and the rotation centers around which the fourth transmission arm and the second transmission arm rotate relative to the main shaft assembly are collinear, and the fourth transmission arm is slidably connected to the fourth fixed bracket. In this way, movement of the third transmission arm can be synchronized with movement of the first transmission arm, and movement of the fourth transmission arm can be synchronized with movement of the second transmission arm, so that a structure design and a connection relationship of the rotating mechanism can be simplified, and reliability of the rotating structure is improved. In addition, a structure of the third transmission arm may be the same as a structure of the first transmission arm, and a structure of the fourth transmission arm may be the same as a structure of the second transmission arm, to reduce design difficulty of the rotating mechanism.

In a possible implementation, there is a first fixed groove on a side that is of the first housing and that is close to the rotating mechanism, the first housing includes a first positioning plate located in the first fixed groove, the first positioning plate and a groove bottom wall of the first fixed groove are spaced, and the first fixed bracket is located between the first positioning plate and the groove bottom wall of the first fixed groove, and is fixedly connected to the first positioning plate. In this implementation, because the first fixed bracket and the first housing are fastened to each other, the first housing moves with the first fixed bracket, and the rotating mechanism may control a motion trail of the first housing by controlling a motion trail of the first fixed bracket.

In a possible implementation, the first housing has a first supporting surface, and the first positioning plate sinks relative to the first supporting surface to form a first accommodating groove. The first accommodating groove can provide an accommodation and movement space for the first supporting plate. A location at which the first accommodating groove is disposed enables a supporting surface of the first supporting plate disposed in the first accommodating groove to be flush with the first supporting surface of the first housing. In this way, the first supporting plate can better support the flexible display. A depth of the first accommodating groove is very shallow, and a supporting backplane with high hardness is disposed on a non-display side of the flexible display. Therefore, when the first supporting plate partially extends out of the first accommodating groove, a part that is of the flexible display and that faces the first accommodating groove does not deform significantly when been pressed by a user. This also ensures reliability of the flexible display.

In a possible implementation, the third fixed bracket is located between the first positioning plate and the groove bottom wall of the first fixed groove, and is fixedly connected to the first positioning plate. A gap is formed between the two first fixed brackets and the third fixed bracket, and the groove bottom wall of the first fixed groove, and the gap is used to provide an accommodation and movement space for the first shielding plate.

In a possible implementation, there is a second fixed groove on a side that is of the second housing and that is close to the rotating mechanism, the second housing includes a second positioning plate located in the second fixed groove, the second positioning plate and a groove bottom wall of the second fixed groove are spaced, and the second fixed bracket is located between the second positioning plate and the groove bottom wall of the second fixed groove, and is fixedly connected to the second positioning plate. In this embodiment, because the second fixed bracket and the second housing are fastened to each other, the second housing moves with the second fixed bracket, and the rotating mechanism may control a motion trail of the second housing by controlling a motion trail of the second fixed bracket.

In a possible implementation, the second housing has a second supporting surface, and the second positioning plate sinks relative to the second supporting surface to form a second accommodating groove. The second accommodating groove can provide an accommodation and movement space for the second supporting plate. A location at which the second accommodating groove is disposed enables a supporting surface of the second supporting plate disposed in the second accommodating groove to be flush with the second supporting surface of the second housing. In this way, the second supporting plate can better support the flexible display. A depth of the second accommodating groove is very shallow, and the supporting backplane with high hardness is disposed on the non-display side of the flexible display. Therefore, when the second supporting plate partially extends out of the second accommodating groove, a part that is of the flexible display and that faces the second accommodating groove does not deform significantly when been pressed by a user. This also ensures reliability of the flexible display.

In a possible implementation, the fourth fixed bracket is located between the second positioning plate and the groove bottom wall of the second fixed groove, and is fixedly connected to the second positioning plate. A gap is formed between the two second fixed brackets and the fourth fixed bracket, and the groove bottom wall of the second fixed groove, and the gap is used to provide an accommodation and movement space for the second shielding plate.

According to a second aspect, this application further provides an electronic device, including a flexible display and the folding apparatus according to any one of the foregoing implementations. The flexible display includes a first non-bending part, a bending part, and a second non-bending part that are sequentially arranged, the first non-bending part is fastened to a first housing, the second non-bending part is fastened to a second housing, and when the first housing and the second housing are folded or unfolded relative to each other, the bending part deforms.

In this application, the flexible display can be unfolded or folded with the folding apparatus. When the electronic device is in a flattened state, the flexible display is in a flattened form, and can perform full-screen display, so that the electronic device has a large display area, to improve viewing experience of a user. When the electronic device is in the closed state, a planar size of the electronic device is small (with a small width), so that it is convenient for a user to carry and place the electronic device.

In other words, the folding apparatus can implement pulling-in of the housing when the folding apparatus is switched from the flattened state to the closed state and pushing-out of the housing when the folding apparatus is switched from the closed state to the flattened state, to implement deformation by using the flexible display as a neutral surface when being unfolded or folded. In this way, a risk that the flexible display is stretched or squeezed is reduced, to protect the flexible display and improve reliability of the flexible display, so that the flexible display and the electronic device have long service lives.

DETAILED DESCRIPTION OF ILLUSTRATIVE EMBODIMENTS

The following describes embodiments of this application with reference to the accompanying drawings in the embodiments of this application.

Embodiments of this application provide a folding apparatus and an electronic device. The electronic device includes the folding apparatus and a flexible display fastened to the folding apparatus. The folding apparatus may be unfolded to a flattened state, or may be folded to a closed state, or may be in an intermediate state between the flattened state and the closed state. The flexible display is unfolded and folded with the folding apparatus. In the electronic device, a rotating mechanism of the folding apparatus is optimized, so that the folding apparatus can rotate by using the flexible display as a neutral surface. In this way, a risk that the flexible display is stretched or squeezed is reduced, to protect the flexible display and improve reliability of the flexible display, so that the flexible display and the electronic device have long service lives.

Figure 1:
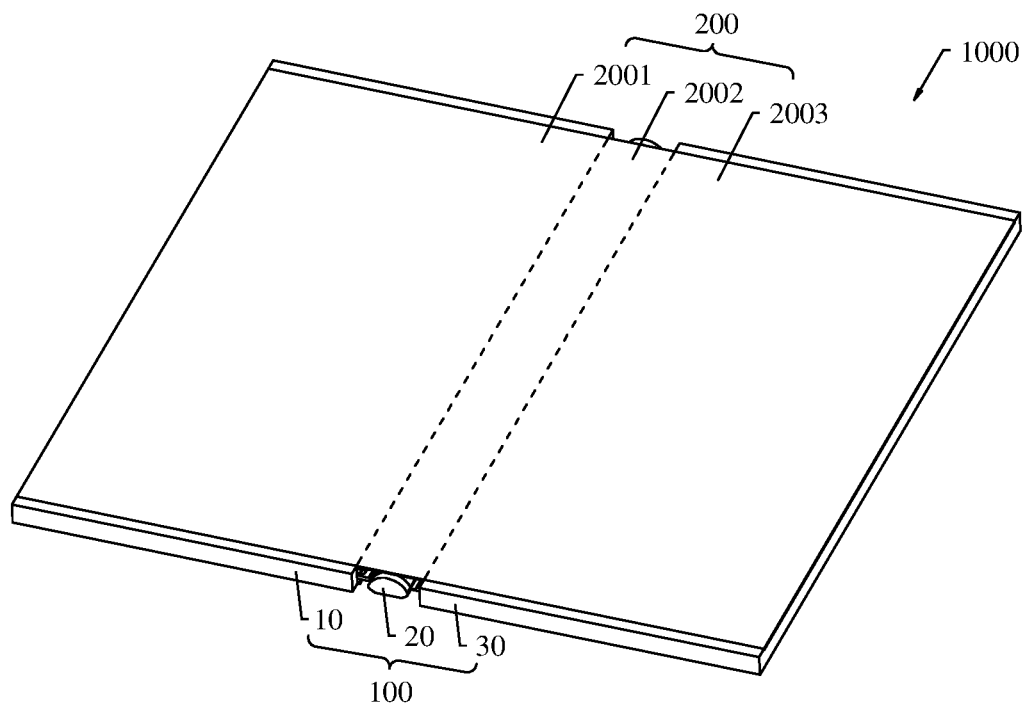
FIG. 1 is a schematic diagram of a structure in which an electronic device is in a flattened state according to an embodiment of this application.
Figure 2:
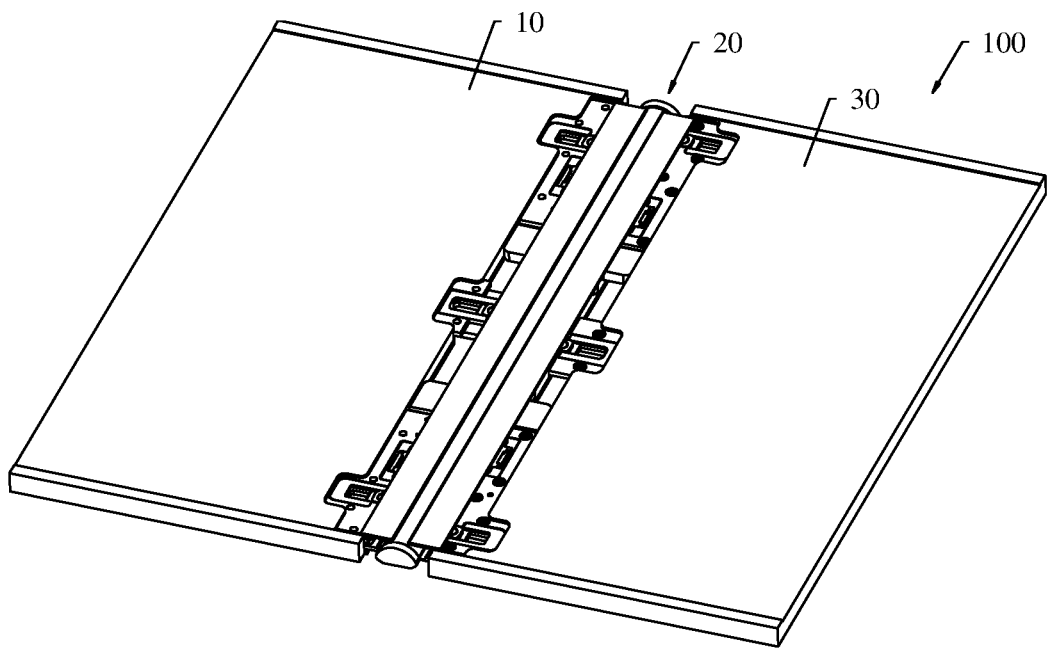
FIG. 2 is a schematic diagram of a structure of a folding apparatus of the electronic device shown in FIG. 1.
Figure 3:
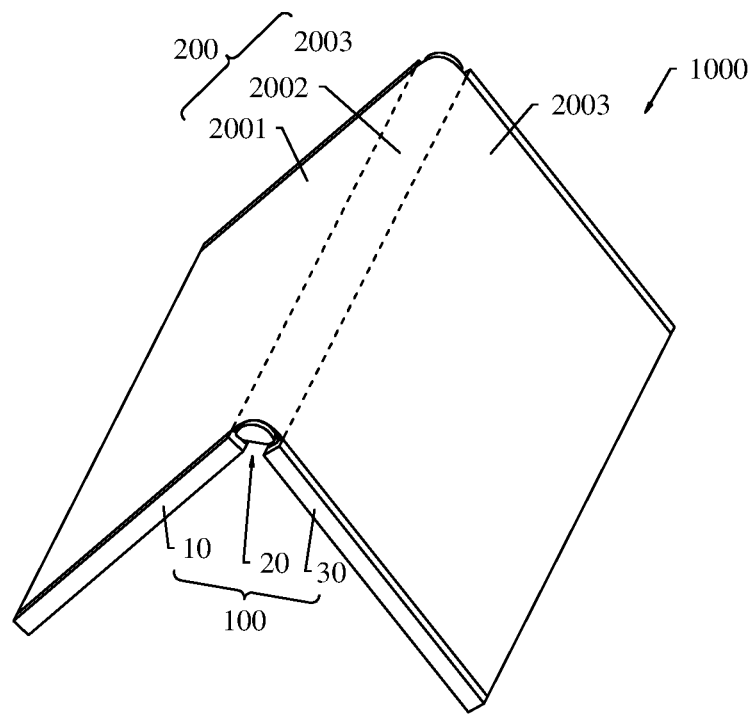
FIG. 3 is a schematic diagram of a structure in which the electronic device shown in FIG. 1 is in an intermediate state.
Figure 4:
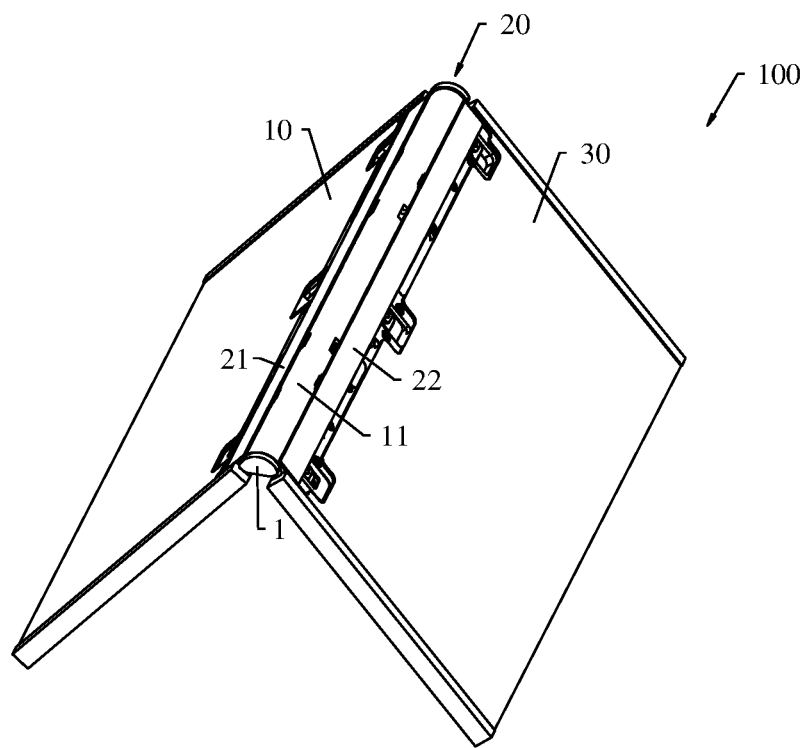
FIG. 4 is a schematic diagram of a structure of a folding apparatus of the electronic device shown in FIG. 3.
Figure 5:
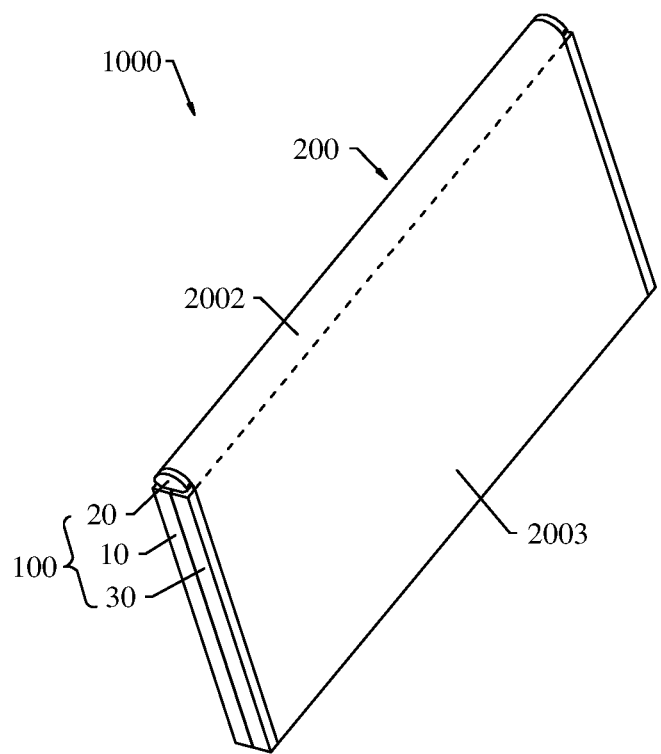
FIG. 5 is a schematic diagram of a structure in which the electronic device shown in FIG. 1 is in a closed state.
Figure 6:
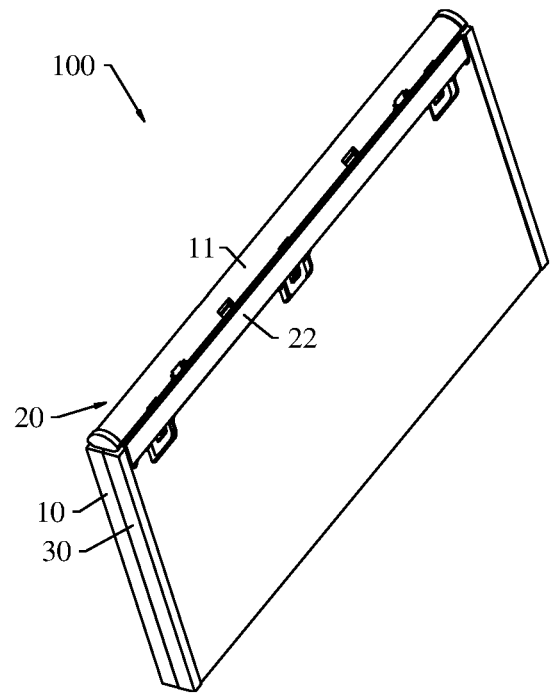
FIG. 6 is a schematic diagram of a structure of a folding apparatus of the electronic device shown in FIG. 5.

FIG. 1 is a schematic diagram of a structure in which an electronic device 1000 is in a flattened state according to an embodiment of this application, FIG. 2 is a schematic diagram of a structure of a folding apparatus 100 of the electronic device 1000 shown in FIG. 1, FIG. 3 is a schematic diagram of a structure in which the electronic device 1000 shown in FIG. 1 is in an intermediate state, FIG. 4 is a schematic diagram of a structure of the folding apparatus 100 of the electronic device 1000 shown in FIG. 3, FIG. 5 is a schematic diagram of a structure in which the electronic device 1000 shown in FIG. 1 is in a closed state, and FIG. 6 is a schematic diagram of a structure of a folding apparatus 100 of the electronic device 1000 shown in FIG. 5. The electronic device 1000 may be a product such as a mobile phone, a tablet computer, or a notebook computer. This embodiment is described by using an example in which the electronic device 1000 is a mobile phone.

The electronic device 1000 includes the folding apparatus 100 and a flexible display 200. The folding apparatus 100 includes a first housing 10, a rotating mechanism 20, and a second housing 30 that are sequentially connected. The rotating mechanism 20 can deform, so that the first housing 10 and the second housing 30 are folded or unfolded relative to each other. As shown in FIG. 1 and FIG. 2, the first housing 10 and the second housing 30 can be unfolded relative to each other to a flattened state, so that the electronic device 1000 is in a flattened state. For example, when the first housing 10 and the second housing 30 are in the flattened state, an included angle between the first housing 10 and the second housing 30 may be approximately 180° (a slight deviation is allowed, for example, the included angle is 165°, 177°, or) 185°. As shown in FIG. 3 and FIG. 4, the first housing 10 and the second housing 30 can be rotated (unfolded or folded) relative to each other to an intermediate state, so that the electronic device 1000 is in an intermediate state. As shown in FIG. 5 and FIG. 6, the first housing 10 and the second housing 30 can be folded relative to each other to a closed state, so that the electronic device 1000 is in a closed state. For example, when the first housing 10 and the second housing 30 are in the closed state, the first housing 10 and the second housing 30 can be completely closed to be parallel to each other (a slight deviation is also allowed). The intermediate state shown in FIG. 3 and FIG. 4 may be any state between the flattened state and the closed state. Therefore, the electronic device 1000 may be switched between the flattened state and the closed state through deformation of the rotating mechanism 20.

In some embodiments, the flexible display 200 is configured to display an image. For example, the flexible display 200 may be an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, or a quantum dot light-emitting diode (quantum dot light-emitting diodes, QLED) display.

The flexible display 200 includes a first non-bending part 2001, a bending part 2002, and a second non-bending part 2003 that are sequentially arranged. The flexible display 200 is fastened to the folding apparatus 100. For example, the flexible display 200 may be bonded to the folding apparatus 100 by using an adhesive layer. The first non-bending part 2001 of the flexible display 200 is fastened to the first housing 10, and the second non-bending part 2003 is fastened to the second housing 30. When the first housing 10 and the second housing 30 are folded or unfolded relative to each other, the bending part 2002 deforms. As shown in FIG. 1, when the first housing 10 and the second housing 30 are in the flattened state, the flexible display 200 is in a flattened form. As shown in FIG. 3, when the first housing 10 and the second housing 30 are in the intermediate state, the flexible display 200 is in an intermediate form between the flattened form and a closed form. As shown in FIG. 5, when the first housing 10 and the second housing 30 are in the closed state, the flexible display 200 is in the closed form. When the electronic device 1000 is in the closed state, the flexible display 200 is located on an outer side of the folding apparatus 100, and the flexible display 200 may be approximately U-shaped.

In this embodiment, the flexible display 200 can be unfolded or folded with the folding apparatus 100. When the electronic device 1000 is in the flattened state, the flexible display 200 is in the flattened form, and can perform full-screen display, so that the electronic device 1000 has a large display area, to improve viewing experience of a user. When the electronic device 1000 is in the closed state, a planar size of the electronic device 1000 is small (with a small width), so that it is convenient for a user to carry and place the electronic device 1000.

It may be understood that this embodiment is described by using an example in which "a rotation center of the electronic device 1000 is parallel to a width direction of the electronic device 1000". In this case, the electronic device 1000 can rotate leftward and rightward, and folding and unfolding of the electronic device 1000 affect a width of the electronic device 1000. In some other embodiments, a rotation center of the electronic device 1000 may alternatively be parallel to a length direction of the electronic device 1000. In this case, the electronic device 1000 can rotate up and down, and folding and unfolding of the electronic device 1000 affect a length of the electronic device 1000.

Figure 7:
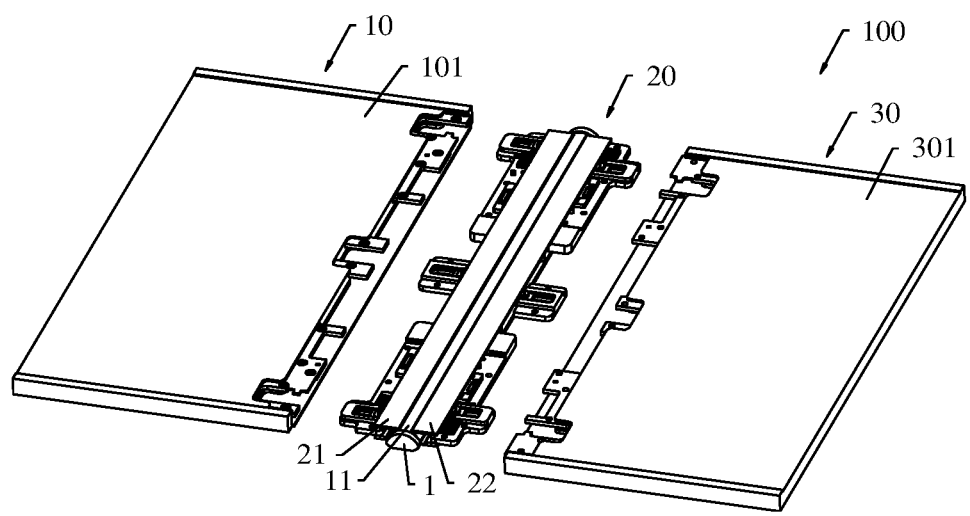
FIG. 7 is a schematic diagram of a partially-exploded structure of the folding apparatus shown in FIG. 2.
Figure 8:
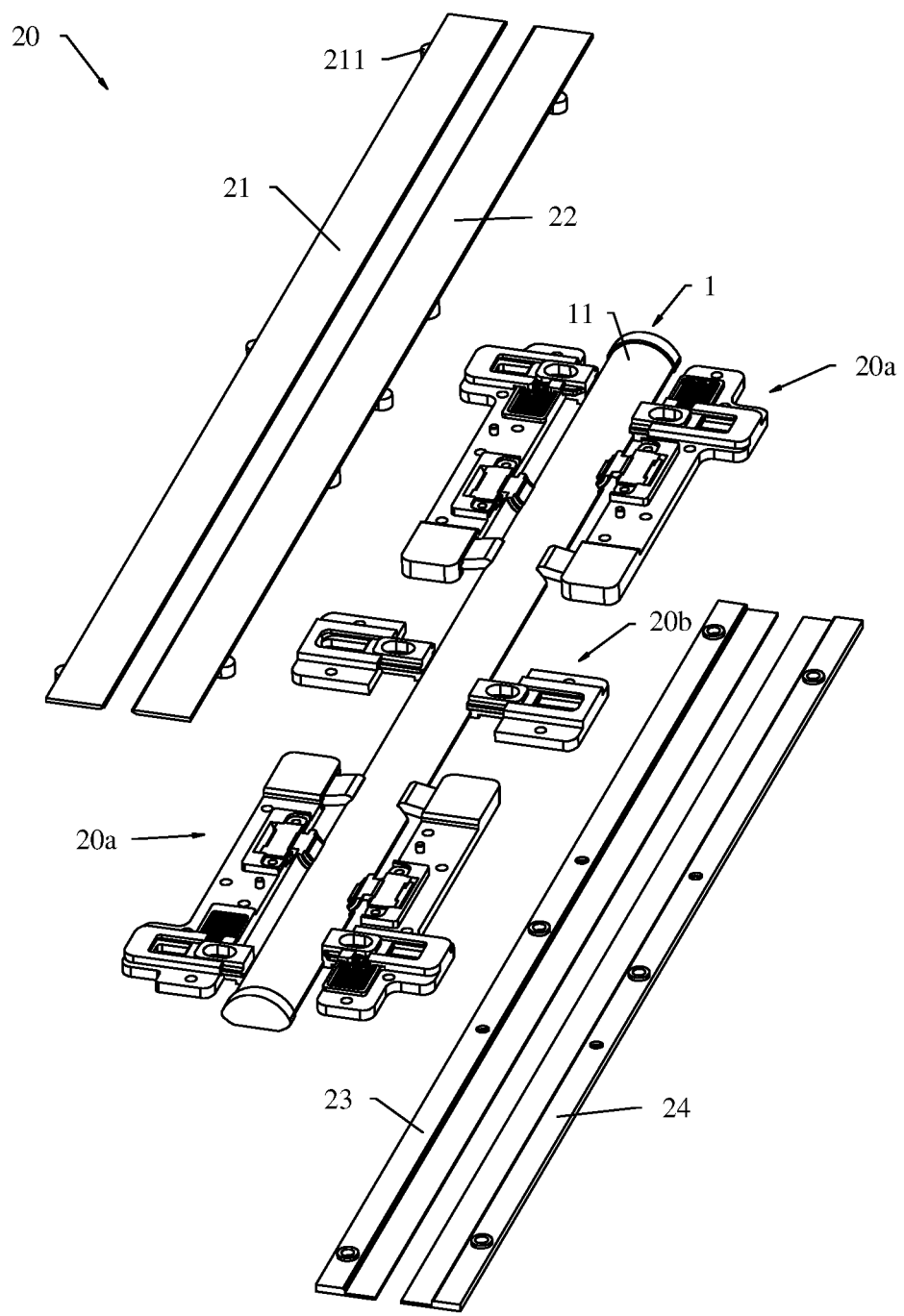
FIG. 8 is a schematic diagram of a partially-exploded structure of a rotating mechanism shown in FIG. 7.

FIG. 7 is a schematic diagram of a partially-exploded structure of the folding apparatus 100 shown in FIG. 2, and FIG. 8 is a schematic diagram of a partially-exploded structure of a rotating mechanism 20 shown in FIG. 7. Fasteners in the folding apparatus 100 are not shown in the accompanying drawings of this application, to simplify the drawings and show a main structure of the folding apparatus 100 more clearly.

In some embodiments, the rotating mechanism 20 of the folding apparatus 100 includes a main shaft assembly 1, an end connecting assembly 20a, a middle connecting assembly 20b, a first supporting plate 21, a second supporting plate 22, a first shielding plate 23, and a second shielding plate 24.

The main shaft assembly 1 is located between the first housing 10 and the second housing 30. The end connecting assembly 20a is connected to the first housing 10, the main shaft assembly 1, and the second housing 30. There are two end connecting assemblies 20a, and the two end connecting assemblies 20a are spaced in an axial direction of the main shaft assembly 1, for example, may be respectively connected to the top and the bottom of the main shaft assembly 1. The middle connecting assembly 20b is connected to the first housing 10, the main shaft assembly 1, and the second housing 30. The middle connecting assembly 20b is located between the two end connecting assemblies 20a. The first supporting plate 21 and the second supporting plate 22 are located on one side of a plurality of connecting assemblies (that is, the two end connecting assemblies 20a and the middle connecting assembly 20b), and the first shielding plate 23 and the second shielding plate 24 are located on the other side of the plurality of connecting assemblies (the assemblies 20a and the assembly 20b).

The first supporting plate 21 is located on a side that is of the main shaft assembly 1 and that faces the first housing 10, and the first supporting plate 21 is connected to the end connecting assemblies 20a. In some embodiments, the first supporting plate 21 may alternatively be connected to the middle connecting assembly 20b. The second supporting plate 22 is located on a side that is of the main shaft assembly 1 and that faces the second housing 30, and the second supporting plate 22 is connected to the end connecting assemblies 20a. In some embodiments, the second supporting plate 22 may alternatively be connected to the middle connecting assembly 20b.

The first housing 10 has a first supporting surface 101, and the first supporting surface 101 is configured to support the flexible display 200. The second housing 30 has a second supporting surface 301, and the second supporting surface 301 is configured to support the flexible display 200. When the first housing 10 and the second housing 30 are unfolded relative to each other to the flattened state, the first supporting surface 101 is flush with the second supporting surface 301, to better support the flexible display 200, so that the flexible display 200 is flatter, improving user experience.

The main shaft assembly 1 has a supporting surface 11. When the first housing 10 and the second housing 30 are unfolded relative to each other to the flattened state, the supporting surface 11 of the main shaft assembly 1 is partially exposed relative to the first supporting plate 21 and the second supporting plate 22. The first supporting plate 21, the main shaft assembly 1, and the second supporting plate 22 can jointly support the bending part 2002 of the flexible display 200, so that the flexible display 200 is flatter and is not easily damaged due to an external force touch, improving reliability of the flexible display 200. As shown in FIG. 4, when the first housing 10 and the second housing 30 are in the intermediate state, the supporting surface 11 of the main shaft assembly 1 is partially exposed relative to the first supporting plate 21 and the second supporting plate 22, an exposed area of the supporting surface 11 of the main shaft assembly 1 is larger than an exposed area in the flattened state, and the supporting surface 11 of the main shaft assembly 1, the first supporting plate 21, and the second supporting plate 22 jointly support the bending part 2002 of the flexible display 200. As shown in FIG. 6, when the first housing 10 and the second housing 30 are folded relative to each other to the closed state, the supporting surface 11 of the main shaft assembly 1 is completely exposed relative to the first supporting plate 21 and the second supporting plate 22, and the supporting surface 11 of the main shaft assembly 1 supports the bending part 2002 of the flexible display 200.

For example, the supporting surface 11 of the main shaft assembly 1 is arc-shaped. In this case, when the first housing 10 and the second housing 30 are folded relative to each other to a closed state, the main shaft assembly 1 can provide complete-semicircle or nearly-semicircle support for the bending part 2002 of the flexible display 200, and this is consistent with an ideal closed form of the bending part 2002 of the flexible display 200, so that more optimized support can be provided for the flexible display 200 in the closed form. A central angle of the supporting surface 11 of the main shaft assembly 1 may be within a range of 150° to 180°, to better support the flexible display 200.

It may be understood that, in this embodiment of this application, there are two cases in which the supporting surface 11 of the main shaft assembly 1 is arc-shaped. One is that the supporting surface 11 of the main shaft assembly 1 is standard-arc-shaped, and the other is that the entire supporting surface 11 of the main shaft assembly 1 is approximately arc-shaped. In some other embodiments, the supporting surface 11 of the main shaft assembly 1 may alternatively have another shape. For example, the supporting surface 11 of the main shaft assembly 1 is set to a semi-ellipse shape, to reduce a width of the folding apparatus 100 in the closed state, so that it is more convenient to carry and place the electronic device. A shape of the supporting surface of the main shaft assembly 1 is not strictly limited in this embodiment of this application.

Figure 9:
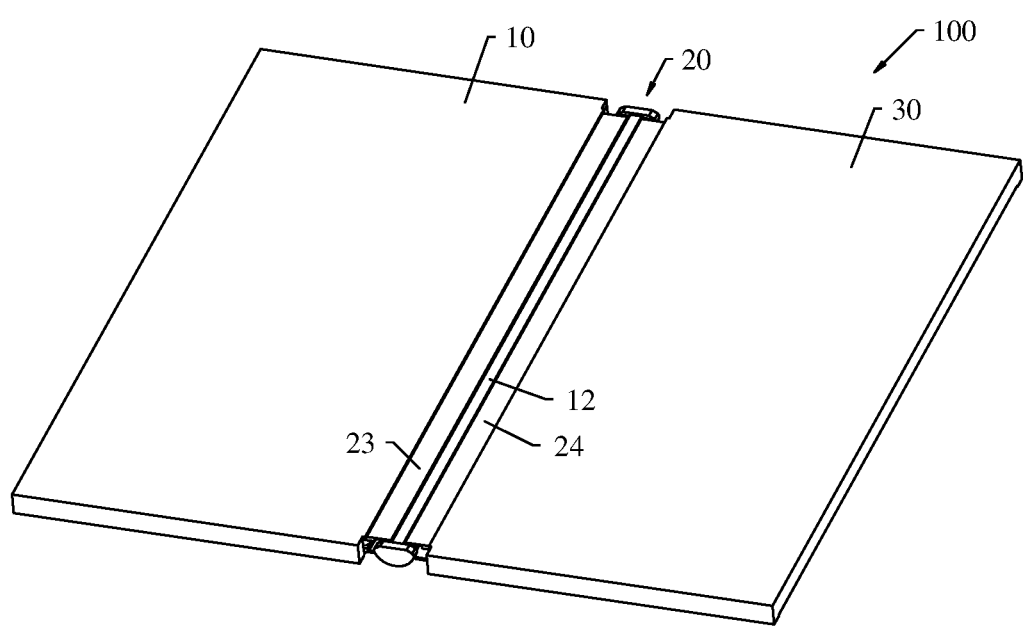
FIG. 9 is a schematic diagram of a structure of the folding apparatus shown in FIG. 2 from another angle.

FIG. 9 is a schematic diagram of a structure of the folding apparatus 100 shown in FIG. 2 from another angle. A view angle of the folding apparatus 100 in FIG. 9 is a view angle obtained after a view angle of the folding apparatus 100 in FIG. 2 is turned over.

In some embodiments, the first shielding plate 23 is located on the side that is of the main shaft assembly 1 and that faces the first housing 10, and the first shielding plate 23 is connected to the end connecting assemblies 20a. In some embodiments, the first shielding plate 23 may alternatively be connected to the middle connecting assembly 20b. The second shielding plate 24 is located on the side that is of the main shaft assembly 1 and that faces the second housing 30, and the second shielding plate 24 is connected to the end connecting assemblies 20a. In some embodiments, the second shielding plate 24 may alternatively be connected to the middle connecting assembly 20b.

The main shaft assembly 1 has a shielding surface 12. When the first housing 10 and the second housing 30 are unfolded relative to each other to the flattened state, the shielding surface 12 of the main shaft assembly 1 is exposed relative to the first shielding plate 23 and the second shielding plate 24. The first shielding plate 23 is located between the first housing 10 and the main shaft assembly 1, and can shield a gap between the first housing 10 and the main shaft assembly 1. The second shielding plate 24 is located between the second housing 30 and the main shaft assembly 1, and can shield a gap between the second housing 30 and the main shaft assembly 1. Therefore, the first shielding plate 23, the main shaft assembly 1, and the second shielding plate 24 can jointly shield a gap between the first housing 10 and the second housing 30, so that the rotating mechanism 20 can implement self-shielding in the flattened state. In this way, appearance integrity is improved, and a risk that dust, sundries, and the like enter the rotating mechanism 20 from outside can also be lowered, to ensure reliability of the folding apparatus 100.

Figure 10:
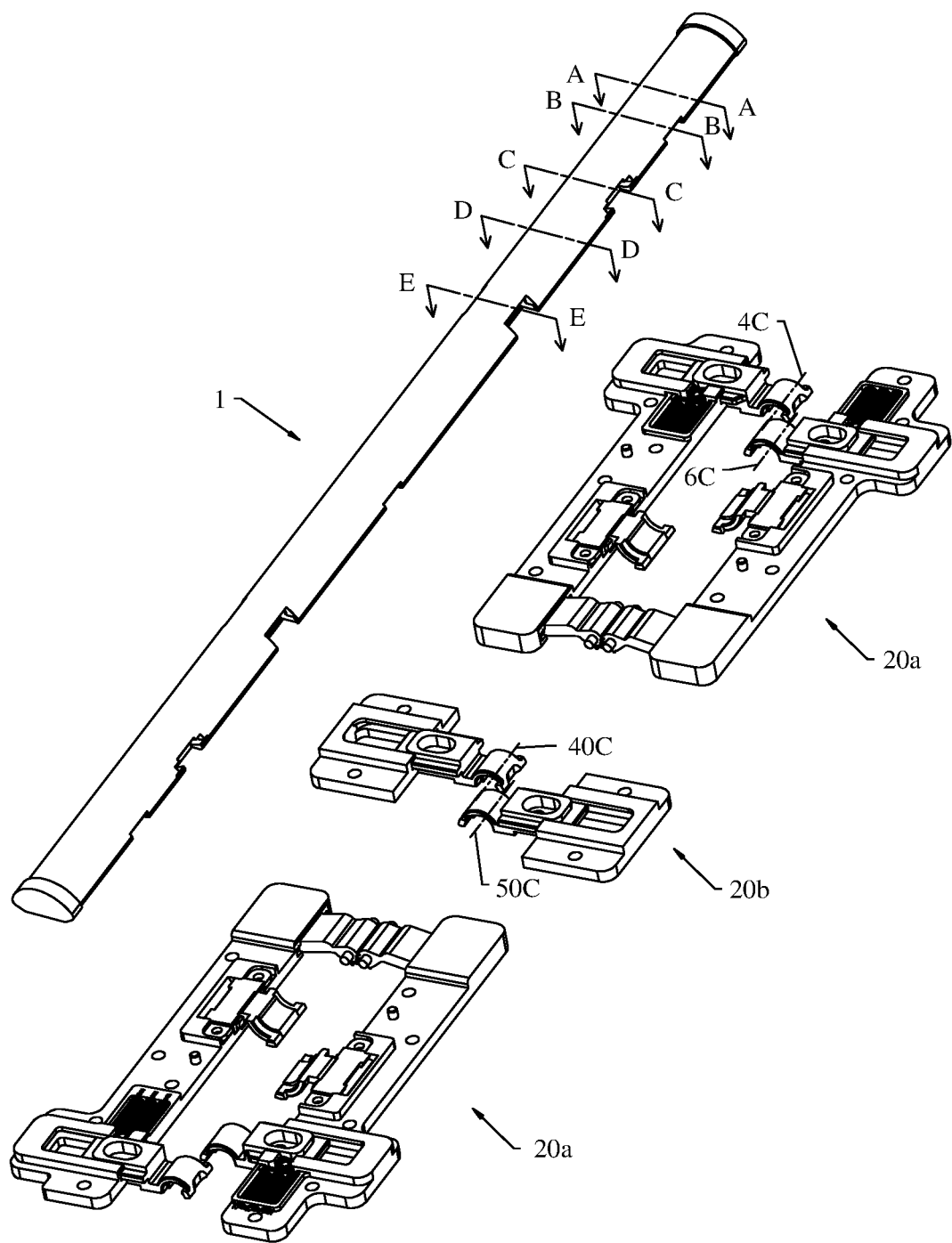
FIG. 10 is a schematic diagram of a partially-exploded partial structure of the folding apparatus shown in FIG. 2.

FIG. 10 is a schematic diagram of a partially-exploded partial structure of the folding apparatus 100 shown in FIG. 2.

In some embodiments, a plurality of movement spaces communicating with the outside of the main shaft assembly 1 are formed inside the main shaft assembly 1, and the plurality of connecting assemblies (the assemblies 20a and the assembly 20b) of the rotating mechanism 20 are movably disposed in these movement spaces to connect to the main shaft assembly 1. A rotation center of the entire rotating mechanism 20 is parallel to the axial direction of the main shaft assembly 1, and the main shaft assembly 1 extends in the axial direction of the main shaft assembly 1.

In some embodiments, structures of the two end connecting assemblies 20a are mirror-symmetrical with each other. In this case, the structures of the two end connecting assemblies 20a are the same, so that an overall structure of the rotating mechanism 20 is simple and processing costs are low. Because the two end connecting assemblies 20a are mirror-symmetrically arranged, in a rotation process of the folding apparatus 100, stress between the two end connecting assemblies 20a and the main shaft assembly 1, between the two end connecting assemblies 20a and the first housing 10, and between the two end connecting assemblies 20a and the second housing 30 are even. This helps improve reliability of the folding apparatus 100. In some other embodiments, structures of the two end connecting assemblies 20a may alternatively be different.

A structure of the middle connecting assembly 20b is simpler than the structure of the end connecting assembly 20a. In the rotating mechanism 20, the two end connecting assemblies 20a implement primary connection and control functions, and the middle connecting assembly 20b implements secondary connection and control functions. In some other embodiments, the rotating mechanism 20 may not be provided with the middle connecting assembly 20b. In some other embodiments, alternatively, in the rotating mechanism 20, a middle connecting assembly may be set to a primary connecting assembly (for example, for a structure of the connecting assembly, refer to the structure of the end connecting assembly 20a in FIG. 10), and an end connecting assembly may be set to a secondary connecting assembly (for example, for a structure of the connecting assembly, refer to the structure of the middle connecting assembly 20b in FIG. 10). In some other embodiments, in this embodiment of this application, only one end connecting assembly 20a may be disposed, and the end connecting assembly 20a is connected to the middle of the main shaft assembly 1, the middle of the first housing 10, and the middle of the second housing 30. It may be understood that the structure of the rotating mechanism 20 may have a plurality of combination and variation manners. This is not strictly limited in this embodiment of this application.

Figure 11:
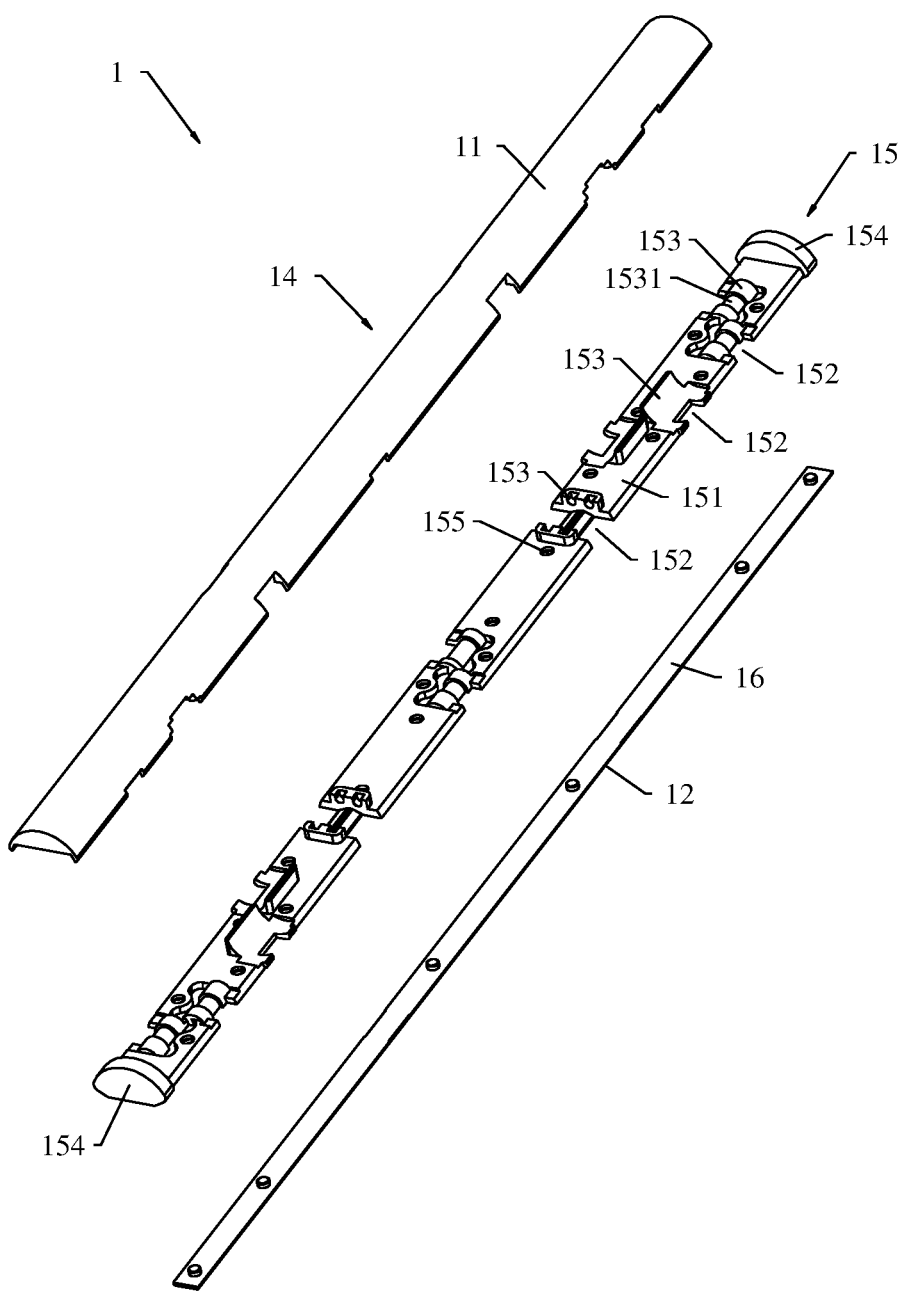
FIG. 11 is a schematic diagram of an exploded structure of a main shaft assembly shown in FIG. 10.
Figure 12:
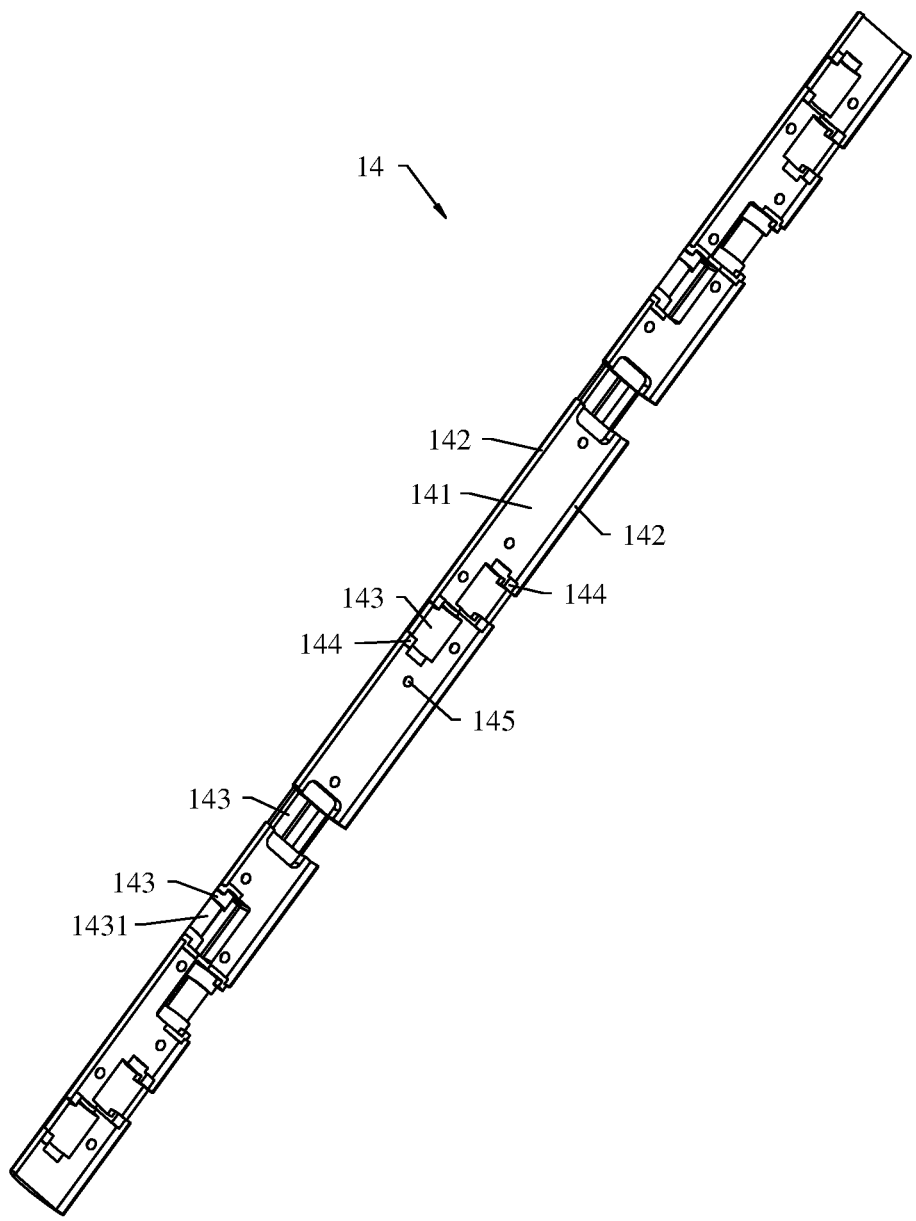
FIG. 12 is a schematic diagram of a structure of a main outer shaft shown in FIG. 11 from another angle.

FIG. 11 is a schematic diagram of an exploded structure of the main shaft assembly 1 shown in FIG. 10. FIG. 12 is a schematic diagram of a structure of a main outer shaft 14 shown in FIG. 11 from another angle.

In some embodiments, the main shaft assembly 1 includes the main outer shaft 14, a main inner shaft 15, and a shielding plate 16. The main outer shaft 14 is fastened on one side of the main inner shaft 15, and the shielding plate 16 is fastened on the other side of the main inner shaft 15. The supporting surface 11 of the main shaft assembly 1 is formed on the main outer shaft 14, and is disposed to face away from the main inner shaft 15. The shielding surface 12 of the main shaft assembly 1 is formed on the shielding plate 16, and is disposed to face away from the main outer shaft 14. In some embodiments, the shielding plate 16 and the main inner shaft 15 may be fastened to each other in an assembled manner. In some other embodiments, the shielding plate 16 and the main inner shaft 15 may be alternatively an integrally-formed mechanical part.

A plurality of three-dimensional space structures are disposed on both the main inner shaft 15 and the main outer shaft 14. These structures are designed, so that after the main inner shaft 15 and the main outer shaft 14 are assembled, the main inner shaft 15 and the main outer shaft 14 can jointly form a plurality of movement spaces, and mechanical parts of the plurality of connecting assemblies (the assemblies 20a and the assembly 20b) are movably disposed in the plurality of movement spaces of the main shaft assembly 1, to implement connection to the main shaft assembly 1. A split design of the main inner shaft 15 and the main outer shaft 14 helps reduce manufacturing difficulty of the main shaft assembly 1, and improve manufacturing precision and a product yield of the main shaft assembly 1.

In some embodiments, as shown in FIG. 11, the main inner shaft 15 includes a main inner shaft body 151, a plurality of grooves 152, a plurality of projections 153, two end stoppers 154 and a plurality of fastening holes 155. The plurality of grooves 152 and the plurality of projections 153 are formed on the main inner shaft body 151, and the plurality of grooves 152 and the plurality of projections 153 are combined with each other to form a plurality of three-dimensional spatial structures. The two end stoppers 154 are fastened at two ends of the main inner shaft body 151. The plurality of fastening holes 155 are formed on the main inner shaft body 151. Some grooves 152, some projections 153, and some fastening holes 155 are schematically marked in FIG. 11.

As shown in FIG. 12, the main outer shaft 14 includes a main outer shaft body 141, two limiting flanges 142, a plurality of grooves 143, a plurality of projections 144, and a plurality of fastening holes 145. The two limiting flanges 142 are spaced from each other and respectively fixed on two sides of the main outer shaft body 141, and the limiting flanges 142 extend along an extension direction of the main shaft assembly 1. The plurality of grooves 143 and the plurality of projections 144 are formed on the main outer shaft body 141, and the plurality of grooves 143 and the plurality of projections 144 are combined with each other to form a plurality of three-dimensional spatial structures. The plurality of fastening holes 145 are formed on the main outer shaft body 141. Some grooves 143, some projections 144, and some fastening holes 145 are schematically marked in FIG. 12.

After the main outer shaft 14 and the main inner shaft 15 are fastened to each other, the main outer shaft body 141 and the main inner shaft body 151 are in contact with each other, the end stoppers 154 of the main inner shaft 15 are exposed. The plurality of fastening holes 155 of the main outer shaft 14 are aligned with the plurality of fastening holes 145 of the main inner shaft 15, and the main inner shaft 15 and the main outer shaft 14 are fastened by using fasteners (not shown in the figure). The fastener includes but is not limited to a screw, a bolt, a rivet, a dowel pin, and the like. The plurality of three-dimensional space structures of the main outer shaft 14 and the plurality of three-dimensional space structures of the main inner shaft 15 jointly form the plurality of movement spaces of the main shaft assembly 1. For example, some of the plurality of movement spaces are the same in structure, and some of the plurality of movement spaces are different in structure. The movement spaces with different structures are used to cooperate with mechanical parts with different structures, so that connection structures between the main shaft assembly 1 and the plurality of connecting assemblies (the assemblies 20a and the assembly 20b) are more flexible and diversified. The movement spaces with a same structure are used to cooperate with mechanical parts with a same structure, which helps reduce design difficulty and costs of the main shaft assembly 1 and the connecting assemblies.

In some embodiments, as shown in FIG. 11, some projections 153 of the main inner shaft 15 have limiting grooves 1531, configured to limit, in the axial direction of the main shaft assembly 1, a mechanical part disposed in a corresponding movement space, to improve reliability of a connection structure. Some limiting grooves 1531 are schematically marked in FIG. 11. As shown in FIG. 12, limiting grooves 1431 are disposed on groove walls of some grooves 143 of the main outer shaft 14, configured to limit, in the axial direction of the main shaft assembly 1, a mechanical part disposed in a corresponding movement space, to improve reliability of a connection structure. Some limiting grooves 1431 are schematically marked in FIG. 12. It may be understood that when one limiting groove (1531/1431) is disposed in a same movement space, a mechanical part can be limited in the axial direction of the main shaft assembly 1. In some other embodiments, two limiting grooves (1531 and 1431) may alternatively be disposed in a same movement space. This is not strictly limited in this embodiment of this application.

In some embodiments, as shown in FIG. 12, some projections 144 of the main outer shaft 14 have a limiting function. These projections 144 are located in the movement spaces of the main shaft assembly 1, and are configured to limit mechanical parts of the connecting assemblies (the assemblies 20a and the assembly 20b), to prevent the mechanical parts from accidentally detaching from the main shaft assembly 1, so as to improve reliability of connection and motion between the connecting assemblies (the assemblies 20a and the assembly 20b) and the main shaft assembly 1, so that reliability of the rotating mechanism 20 and the folding apparatus 100 are higher. It may be understood that, in the main shaft assembly 1, a projection may alternatively be disposed on the main inner shaft 15 for a limiting function.

Figure 13:
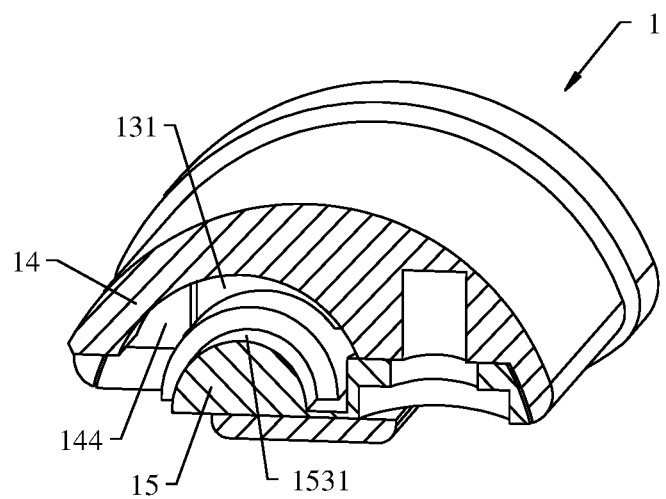
FIG. 13 is a schematic diagram of a structure in which a main shaft assembly shown in FIG. 10 is cut along a line A-A.
Figure 14:
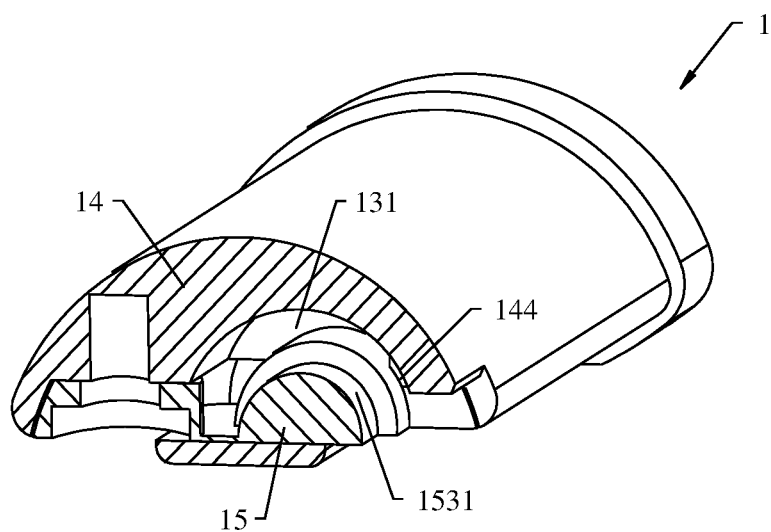
FIG. 14 is a schematic diagram of a structure in which a main shaft assembly shown in FIG. 10 is cut along a line B-B.
Figure 15:
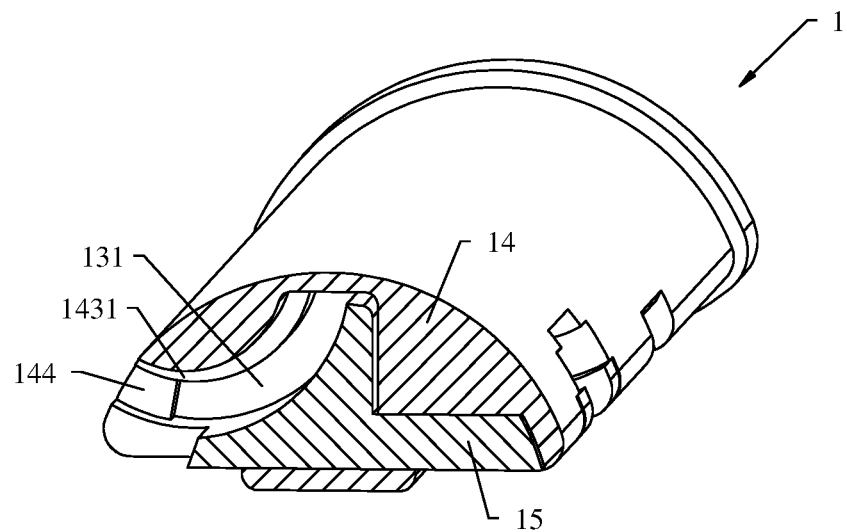
FIG. 15 is a schematic diagram of a structure in which a main shaft assembly shown in FIG. 10 is cut along a line C-C.
Figure 16:
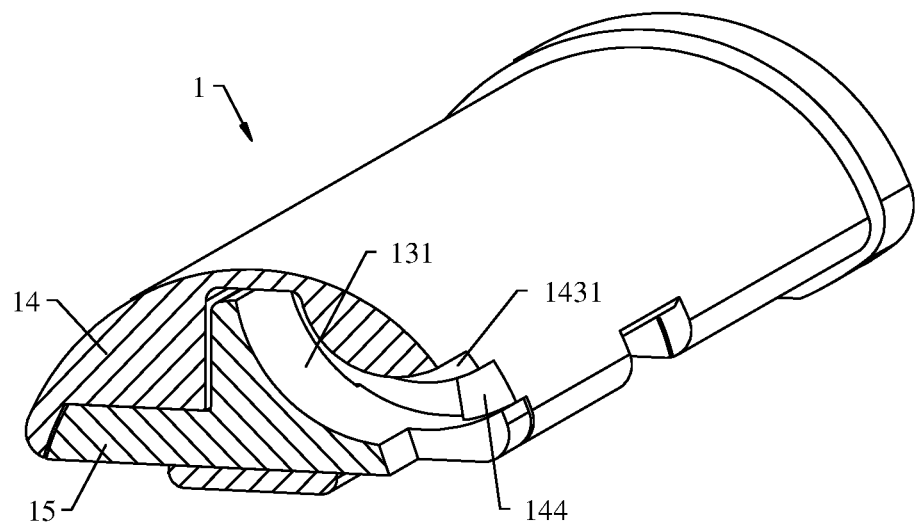
FIG. 16 is a schematic diagram of a structure in which a main shaft assembly shown in FIG. 10 is cut along a line D-D.
Figure 17:
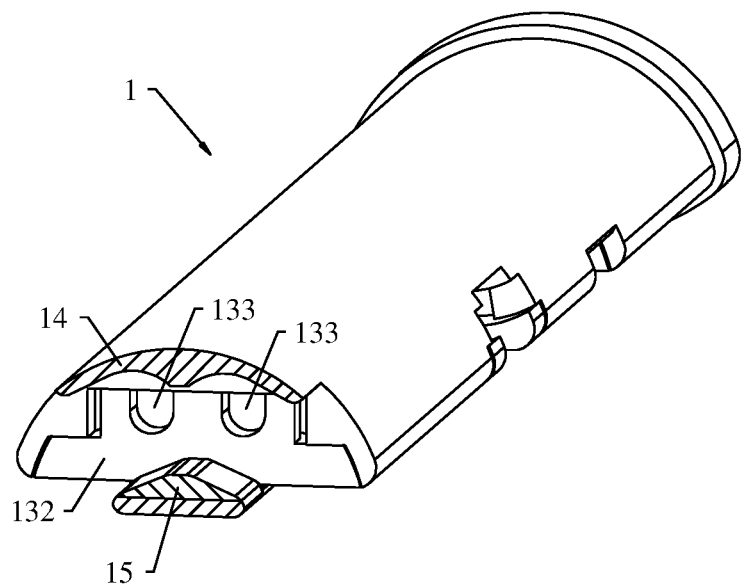
FIG. 17 is a schematic diagram of a structure in which a main shaft assembly shown in FIG. 10 is cut along a line E-E.

FIG. 13 is a schematic diagram of a structure in which the main shaft assembly 1 shown in FIG. 10 is cut along a line A-A, FIG. 14 is a schematic diagram of a structure in which the main shaft assembly 1 shown in FIG. 10 is cut along a line B-B, FIG. 15 is a schematic diagram of a structure in which the main shaft assembly 1 shown in FIG. 10 is cut along a line C-C, FIG. 16 is a schematic diagram of a structure in which the main shaft assembly 1 shown in FIG. 10 is cut along a line D-D, and FIG. 17 is a schematic diagram of a structure in which the main shaft assembly 1 shown in FIG. 10 is cut along a line E-E.

For example, in this embodiment, there are a plurality of movement spaces with different shapes formed on the main shaft assembly 1, configured to cooperate with different mechanical parts.

As shown in FIG. 13, the main outer shaft 14 and the main inner shaft 15 jointly enclose an arc-shaped groove 131. A circle center of the arc-shaped groove 131 is close to the main inner shaft 15 and away from the main outer shaft 14, to form a movement space. In some embodiments, the movement space may further include a limiting groove 1531 communicating with the arc-shaped groove 131. The limiting groove 1531 is formed on the main inner shaft 13. In some embodiments, the main outer shaft 14 may further include a projection 144 having a limiting function, and the projection 144 extends into the arc-shaped groove 131 to limit a mechanical part disposed in the movement space.

As shown in FIG. 14, the main outer shaft 14 and the main inner shaft 15 jointly enclose an arc-shaped groove 131. A circle center of the arc-shaped groove 131 is close to the main inner shaft 15 and away from the main outer shaft 14, to form a movement space. The arc-shaped groove 131 shown in FIG. 13 and the arc-shaped groove 131 shown in FIG. 14 are disposed in pairs. In some embodiments, the movement space may further include a limiting groove 1531 communicating with the arc-shaped groove 131. The limiting groove 1531 is formed on the main inner shaft 15. In some embodiments, the main outer shaft 14 may further include a projection 144 having a limiting function, and the projection 144 extends into the arc-shaped groove 131 to limit a mechanical part disposed in the movement space.

As shown in FIG. 15, the main outer shaft 14 and the main inner shaft 15 jointly enclose an arc-shaped groove 131. A circle center of the arc-shaped groove 131 is close to the main outer shaft 14 and away from the main inner shaft 15, to form a movement space. In some embodiments, the movement space may further include a limiting groove 1431 communicating with the arc-shaped groove 131. The limiting groove 1431 is formed on the main outer shaft 14. In some embodiments, the main outer shaft 14 may further include a projection 144 having a limiting function, and the projection 144 extends into the arc-shaped groove 131 to limit a mechanical part disposed in the movement space.

As shown in FIG. 16, the main outer shaft 14 and the main inner shaft 15 jointly enclose an arc-shaped groove 131. A circle center of the arc-shaped groove 131 is close to the main outer shaft 14 and away from the main inner shaft 15, to form a movement space. The arc-shaped groove 131 shown in FIG. 15 and the arc-shaped groove 131 shown in FIG. 16 are disposed in pairs. In some embodiments, the movement space may further include a limiting groove 1431 communicating with the arc-shaped groove 131. The limiting groove 1431 is formed on the main outer shaft 14. In some embodiments, the main outer shaft 14 may further include a projection 144 having a limiting function, and the projection 144 extends into the arc-shaped groove 131 to limit a mechanical part disposed in the movement space.

In other words, the main inner shaft 15 and the main outer shaft 14 of the main shaft assembly 1 jointly enclose a plurality of arc-shaped grooves 131. The arc-shaped grooves 131 at different locations may be connected to different mechanical parts of the connecting assemblies (the assemblies 20a and the assembly 20b).

As shown in FIG. 17, the main outer shaft 14 and the main inner shaft 15 jointly enclose an M-shaped groove 132, two spaced recess grooves 133 are formed on a side wall of the M-shaped groove 132, and the M-shaped groove 132 and the two recess grooves 133 jointly form a movement space.

It may be understood that the main shaft assembly 1 in this embodiment of this application may alternatively have another structure. This is not strictly limited in this application.

Figure 18:
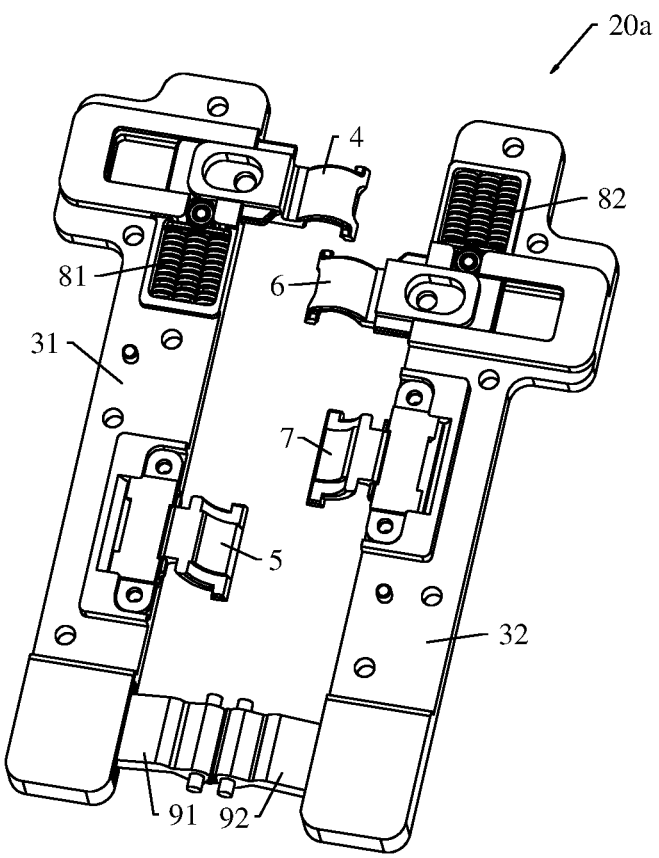
FIG. 18 is a schematic diagram of a structure of an end connecting assembly shown in FIG. 10 from another angle.
Figure 19:
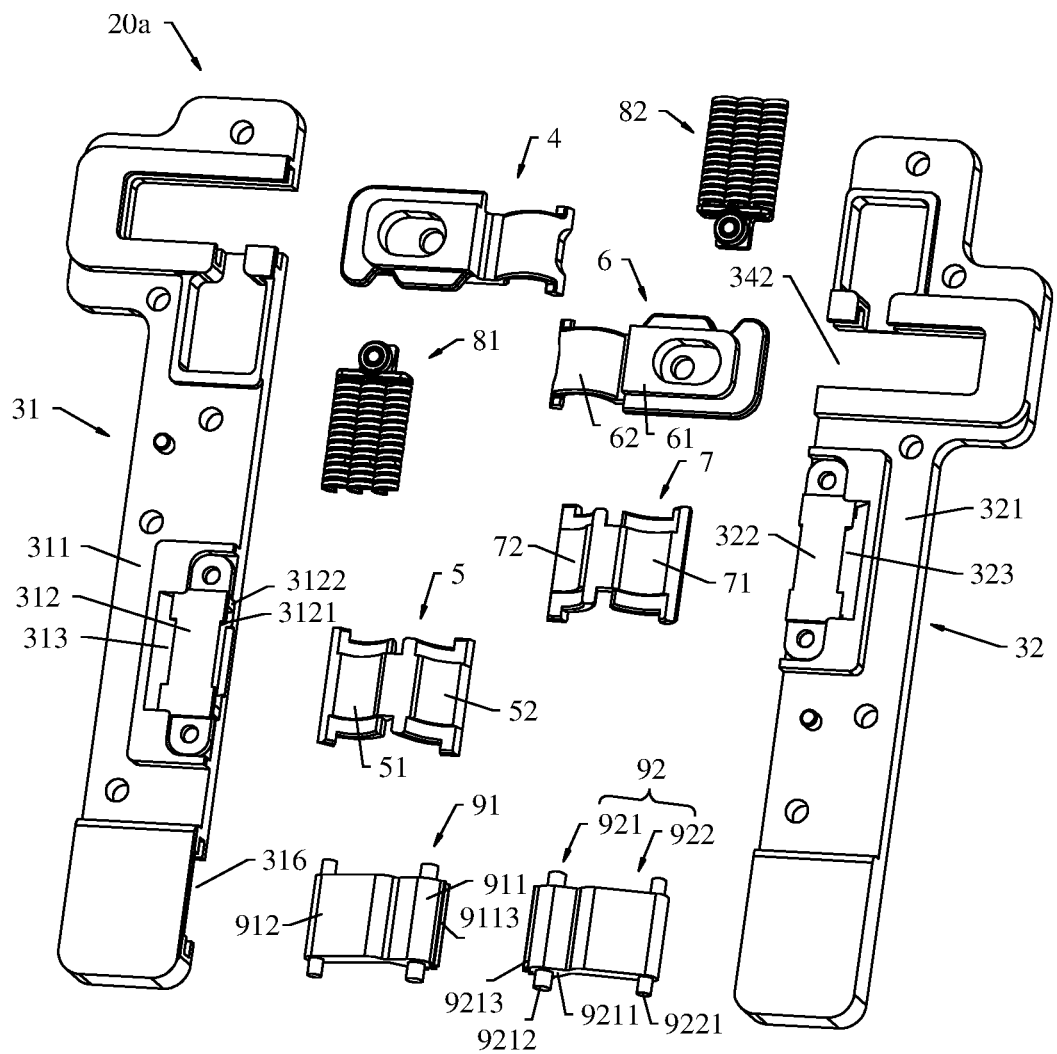
FIG. 19 is a schematic diagram of a partially-exploded structure of the end connecting assembly shown in FIG. 18.

FIG. 18 is a schematic diagram of a structure of the end connecting assembly 20a shown in FIG. 10 from another angle, and FIG. 19 is a schematic diagram of a partially-exploded structure of the end connecting assembly 20a shown in FIG. 18.

In some embodiments, the end connecting assembly 20a of the rotating mechanism 20 includes a first fixed bracket 31, a second fixed bracket 32, a first transmission arm 4, a first rotating arm 5, a second transmission arm 6, and a second rotating arm 7. In some embodiments, the rotating mechanism 20 may further include a first limiting component 81 and a second limiting component 82. In some embodiments, the rotating mechanism 20 may further include a first synchronous swing arm 91 and a second synchronous swing arm 92.

Figure 20:
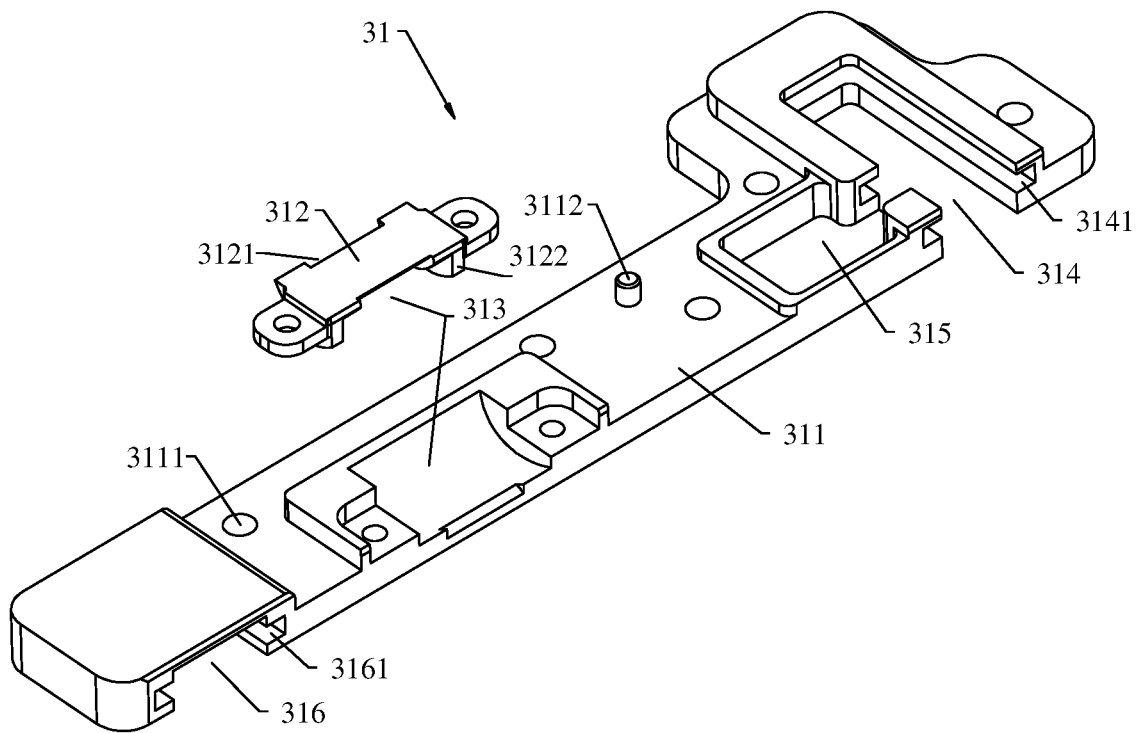
FIG. 20 is a schematic diagram of an exploded structure of a first fixed bracket of the end connecting assembly shown in FIG. 19.

FIG. 20 is a schematic diagram of an exploded structure of the first fixed bracket 31 of the end connecting assembly 20a shown in FIG. 19.

In some embodiments, the first fixed bracket 31 includes a first fixed base 311 and a first fastener 312. The first fastener 312 is fastened to the first fixed base 311, and encloses a first arc-shaped groove 313 with the first fixed base 311. For example, the first fastener 312 and the first fixed base 311 may be fastened to each other by using a fastener.

In this embodiment, a processing manner is used in which the first fixed base 311 and the first fastener 312 are separately manufactured, and then the first fixed base 311 and the first fastener 312 are assembled into the first fixed bracket 31. This helps reduce processing difficulty of the first fixed bracket 31, and improve a product yield of the first fixed bracket 31. In some other embodiments, the first fixed bracket 31 may alternatively be an integrally-formed mechanical part.

In some embodiments, as shown in FIG. 20, the first fastener 312 has an arc surface used to enclose the first arc-shaped groove 313, and a limiting groove 3121 is formed on a middle part of the arc surface and configured to limit, in an axial direction of the main shaft assembly 1, a mechanical part disposed in the first arc-shaped groove 313, to improve reliability of a connection structure. In some other embodiments, the limiting groove may alternatively be formed on an arc surface that is of the first fixed base 311 and that is used to enclose the first arc-shaped groove 313. For example, the first fastener 312 may further have a stop block 3122, configured to prevent the mechanical part disposed in the first arc-shaped groove 313 from being accidentally detached from the first arc-shaped groove 313.

As shown in FIG. 20, in some embodiments, there may be further a first sliding slot 314 and a first accommodating slot 315 on the first fixed base 311 of the first fixed bracket 31, and the first accommodating slot 315 communicates with the first sliding slot 314. In some embodiments, there may be a recessed guiding space 3141 on a side wall of the first sliding slot 314. In some embodiments, there may further be a third sliding slot 316 on the first fixed base 311 of the first fixed bracket 31, and there is a recessed guiding space 3161 on a slot wall of the third sliding slot 316. A guiding direction of the guiding space 3161 of the third sliding slot 316 is the same as a guiding direction of the guiding space 3141 of the first sliding slot 314.

It may be understood that, in this embodiment, the first sliding slot 314, the third sliding slot 316, and the first arc-shaped groove 313 are all formed on a same mechanical part, and the first fixed base 311 is an integrated mechanical part. In some other embodiments, the first sliding slot 314, the third sliding slot 316, and the first arc-shaped groove 313 may alternatively be formed on different mechanical parts, and the first fixed base 311 may include a plurality of mechanical parts. This is not strictly limited in this application.

As shown in FIG. 20, in some embodiments, the first fixed base 311 of the first fixed bracket 31 has a plurality of fastening holes 3111. In the rotating mechanism 20, the first fixed bracket 31 may be fastened to the first housing 10 by using a plurality of fasteners. In some embodiments, the first fixed bracket 31 may further have a positioning projection 3112, and the positioning projection 3112 is configured to cooperate with the first housing 10, so that assembly precision and stability of a connection structure between the first fixed bracket 31 and the first housing 10 are higher.

Figure 21:
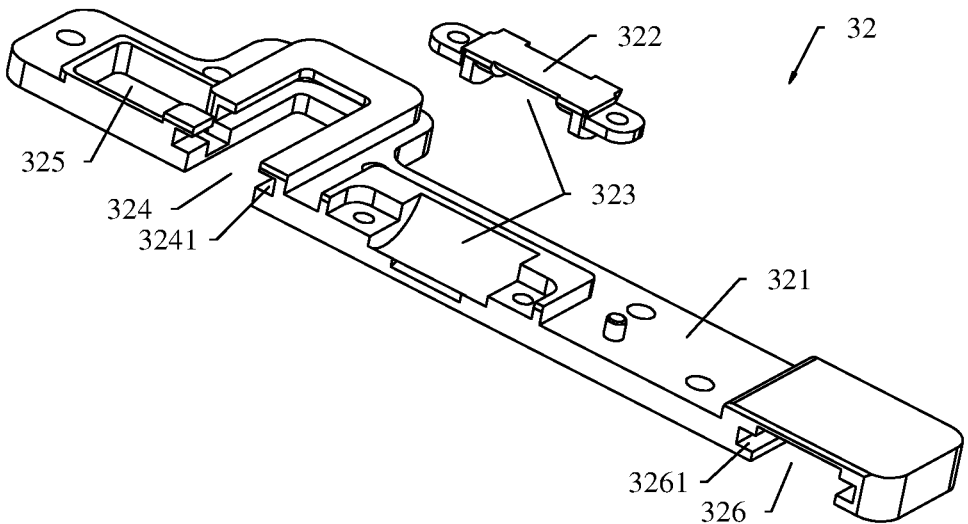
FIG. 21 is a schematic diagram of an exploded structure of a second fixed bracket of the end connecting assembly shown in FIG. 19.

FIG. 21 is a schematic diagram of an exploded structure of the second fixed bracket 32 of the end connecting assembly 20a shown in FIG. 19.

In some embodiments, a structure of the second fixed bracket 32 is similar to a structure of the first fixed bracket 31. For example, the second fixed bracket 32 includes a second fixed base 321 and a second fastener 322. The second fastener 322 is fastened to the second fixed base 321, and encloses a second arc-shaped groove 323 with the second fixed base 321. A structure of the second fastener 322 may be the same as a structure of the first fastener 312.

There may be further a second sliding slot 324 and a second accommodating slot 325 on the second fixed base 321 of the second fixed bracket 32, and the second accommodating slot 325 communicates with the second sliding slot 324. There may be a recessed guiding space 3241 on a side wall of the second sliding slot 324. Structures of the second sliding slot 324 and the second accommodating slot 325 may be the same as structures of the first sliding slot 314 and the first accommodating slot 315 of the first fixed bracket 31. There may be further a fourth sliding slot 326 on the second fixed base 321 of the second fixed bracket 32, and there is a recessed guiding space 3261 on a slot wall of the fourth sliding slot 326. A structure of the fourth sliding slot 326 may be the same as a structure of the second sliding slot 324 of the first fixed bracket 31.

Locations of a plurality of slots on the second fixed bracket 32 may be different from locations of a plurality of slots on the first fixed bracket 31. For example, the plurality of slots on the second fixed bracket 32 may be staggered with the plurality of slots on the first fixed bracket 31 in a direction parallel to the axial direction the main shaft assembly 1, so that a plurality of mechanical parts connected to the second fixed bracket 32 and the first fixed bracket 31 can be arranged in the axial direction of the main shaft assembly 1, to improve space utilization of the rotating mechanism 20.

Figure 22:
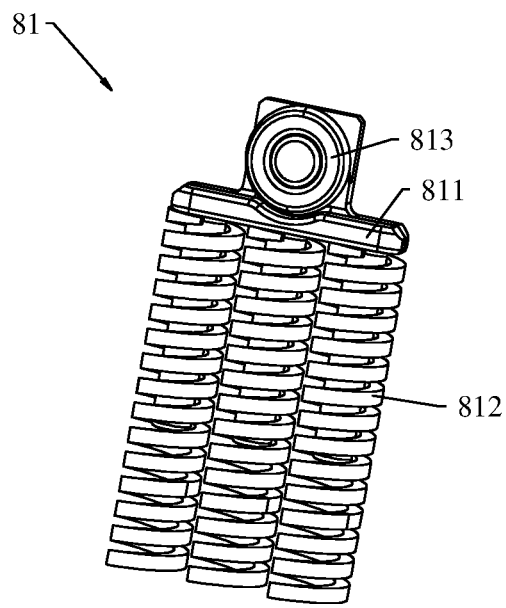
FIG. 22 is a schematic diagram of a structure of a first limiting component of the end connecting assembly shown in FIG. 19.
Figure 23:
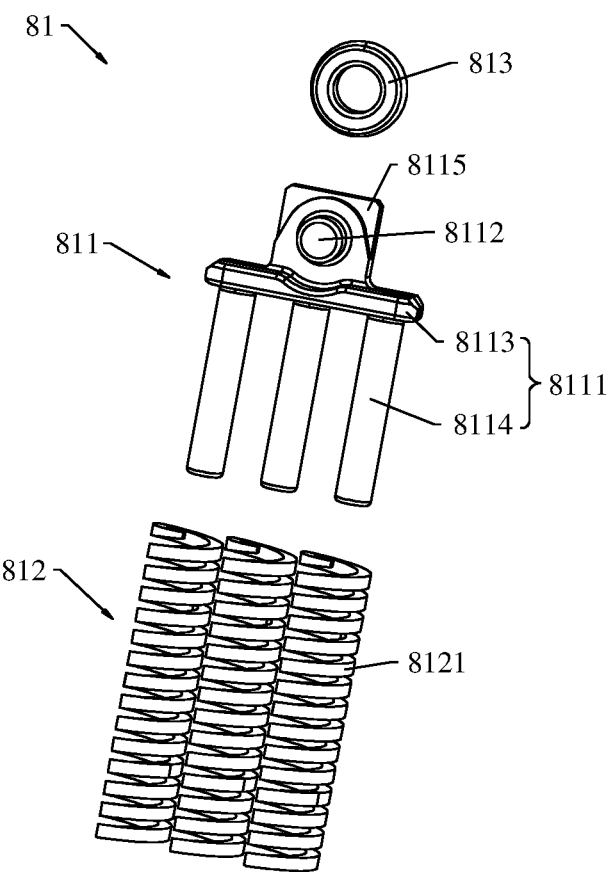
FIG. 23 is a schematic diagram of an exploded structure of a first limiting component shown in FIG. 22.

FIG. 22 is a schematic diagram of a structure of the first limiting component 81 of the end connecting assembly 20a shown in FIG. 19, and FIG. 23 is a schematic diagram of an exploded structure of the first limiting component 81 shown in FIG. 22.

In some embodiments, the first limiting component 81 includes a first bracket 811 and a first elastic part 812. The first bracket 811 is a rigid structure and is not easy to deform under an external force. The first bracket 811 includes a control part 8111 and an abutting part 8112. The abutting part 8112 is configured to abut against an external mechanical part to limit the mechanical part. The control part 8111 is configured to control a location of the abutting part 8112. For example, the control part 8111 includes a substrate 8113 and a plurality of guide columns 8114, and the plurality of guide columns 8114 are fastened on one side of the substrate

8113 and spaced from each other. The abutting part 8112 is fastened on the other side of the substrate 8113. The first elastic part 812 is an elastic structure and is easy to deform under an external force. One end of the first elastic part 812 is disposed on the control part 8111 of the first bracket 811. For example, the first elastic part 812 may include a plurality of springs 8121, and the plurality of springs 8121 are sleeved on the plurality of guide columns 8114 in a one-to-one correspondence. Refer to FIG. 18, FIG. 20, and FIG. 22. The first limiting component 81 is disposed in the first accommodating slot 315 of the first fixed bracket 31. The other end (that is, an end away from the control part 8111) of the first elastic part 812 abuts against a slot wall of the first accommodating slot 315, the first elastic part 812 is in a compressed state, and the abutting part 8112 of the first bracket 811 partially extends into the first sliding slot 314.

In some embodiments, the first limiting component 81 may further include a first elastic part 813, and the first elastic part 813 is disposed on the abutting part 8112 of the first bracket 811. The first elastic part 813 may be made of a material (for example, rubber) with low rigidity, so that when subject to an external force, the first elastic part 813 can absorb an impact force through deformation, to implement cushioning. In the first limiting component 81, the first elastic part 813 is disposed to cushion stress between the abutting part 8112 and a mechanical part, to improve reliability of a limiting structure.

In some embodiments, the first bracket 811 of the first limiting component 81 may further include a positioning part 8115. The positioning part 8115 is fastened below the abutting part 8112, and protrudes relative to the abutting part 8112 in a direction away from the control part 8111. When a mechanical part abuts against the abutting part 8112, the positioning part 8115 can position and support the mechanical part, to improve reliability of the limiting structure.

In some embodiments, a structure of the second limiting component 82 may be similar to or the same as a structure of the first limiting component 81, to perform a limiting function.

Figure 24:
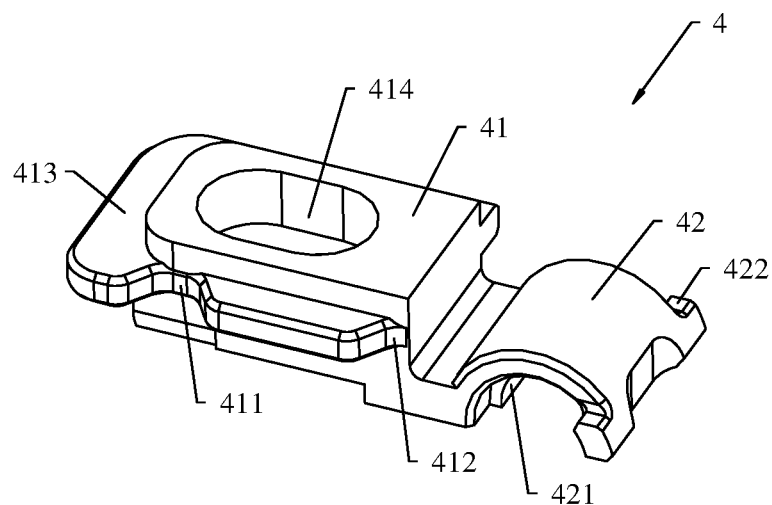
FIG. 24 is a schematic diagram of a structure of a first transmission arm of the end connecting assembly shown in FIG. 19.

FIG. 24 is a schematic diagram of a structure of the first transmission arm 4 of the end connecting assembly 20a shown in FIG. 19.

In some embodiments, the first transmission arm 4 includes a sliding end 41 and a rotating end 42, and the sliding end 41 and the rotating end 42 of the first transmission arm 4 are fastened to each other. For example, the first transmission arm 4 may be an integrally-formed mechanical part.

In some embodiments, there is a first recessed area 411 and a second recessed area 412 on the sliding end 41 of the first transmission arm 4, and the second recessed area 412 is located between the first recessed area 411 and the rotating end 42 of the first transmission arm 4. The sliding end 41 of the first transmission arm 4 includes a first flange 413 on a circumferential side. The first recessed area 411 and the second recessed area 412 are formed on a first flange 413.

Refer to FIG. 18, FIG. 20, and FIG. 24. The sliding end 41 of the first transmission arm 4 is disposed in the first sliding slot 314, and the first flange 413 is disposed in the guiding space 3141 of the first sliding slot 314. In this embodiment, the guiding space 3141 of the first sliding slot 314 cooperates with the first flange 413 of the first transmission arm 4, so that the sliding end 41 of the first transmission arm 4 can be guided in a sliding direction of the first sliding slot 314. In this way, a relative sliding action between the first transmission arm 4 and the first fixed bracket 31 is easier to implement and control precision is higher.

The first limiting component 81 is clamped to the sliding end 41 of the first transmission arm 4 to limit the first transmission arm 4, so that the first transmission arm 4 and the first fixed bracket 31 can maintain a preset relative position relationship when no large external force is applied, the rotating mechanism 20 can stay at a preset angle, and the rotating mechanism can maintain the flattened state or the closed state. In this way, user experience of the folding apparatus 100 and the electronic device 1000 is improved. In some embodiments, when the first housing 10 and the second housing 30 are unfolded relative to each other to the flattened state, the first limiting component 81 is partially clamped into the first recessed area 411. When the first housing 10 and the second housing 30 are folded relative to each other to the closed state, the first limiting component 81 is partially clamped into the second recessed area 412.

Refer to FIG. 18, FIG. 23, and FIG. 24. For example, the abutting part 8112 of the first bracket 811 of the first limiting component 81 is clamped to the sliding end 41 of the first transmission arm 4. Because the first elastic part 812 of the first limiting component 81 can deform under an external force, the first limiting component 81 can smoothly move between the first recessed area 411 and the second recessed area 412 relative to the sliding end 41 of the first transmission arm 4, to improve reliability of limiting between the first limiting component 81 and the sliding end 41 of the first transmission arm 4.

Because the first elastic part 813 is sleeved on the abutting part 8112 of the first bracket 811, the first limiting component 81 abuts against the sliding end 41 of the first transmission arm 4 by using the first elastic part 813 having a cushioning function. This helps reduce a risk of wearing the first bracket 811 and the first transmission arm 4 in a long-time relative movement, improve limiting reliability of the first limiting component 81, and improve reliability of the rotating assembly.

For example, two adjacent surfaces of the first flange 413 of the first transmission arm 4 respectively abut the abutting part 8112 of the first bracket 811 and the positioning part 8115 of the first bracket 811, so that the first flange 413 can slide relative to the positioning part 8115 of the first bracket 811. The positioning part 8115 of the first bracket 811 is disposed, so that a limiting connection relationship between the first limiting component 81 and the sliding end 41 of the first transmission arm 4 is more reliable, to improve reliability of the rotating assembly.

In some embodiments, as shown in FIG. 24, the rotating end 42 of the first transmission arm 4 is arc-shaped. Refer to FIG. 13 and FIG. 24. The rotating end 42 of the first transmission arm 4 may be disposed in one of the arc-shaped grooves 131 of the main shaft assembly 1, so that the first transmission arm 4 is rotatably connected to the main shaft assembly 1. In this case, a rotation center around which the first transmission arm 4 rotates relative to the main shaft assembly 1 is close to the main inner shaft 15 and away from the main outer shaft 14.

In this embodiment, the first transmission arm 4 is connected to the main shaft assembly 1 by using a virtual shaft. The rotatable connection has a simple structure and occupies small space. This helps reduce a thickness of the rotating mechanism 20, so that the folding apparatus 100 and the electronic device 1000 are more light and thin. In some other embodiments, the first transmission arm 4 may alternatively be connected to the main shaft assembly 1 by using a physical shaft. This is not strictly limited in this embodiment of this application.

The rotating end 42 of the first transmission arm 4 includes a limiting bulge 421 and a limiting projection 422, and the limiting bulge 421 is formed on an inner side of the rotating end 42 and the limiting projection 422 is formed on an end part of the rotating end 42. The limiting bulge 421 is configured to cooperate with the limiting groove 1531 (refer to FIG. 13) of the main shaft assembly 1, so that mutual limiting of the first transmission arm 4 and the main shaft assembly 1 is implemented in the axial direction of the main shaft assembly 1. The limiting projection 422 is configured to cooperate with the projection 144 (refer to FIG. 13) of the main shaft assembly 1 that has a limiting function, to prevent the first transmission arm 4 from being accidentally detached from the main shaft assembly 1.

In some embodiments, as shown in FIG. 18 and FIG. 19, a structure of the second transmission arm 6 may be the same as a structure of the first transmission arm 4. The second transmission arm 6 includes a sliding end 61 and a rotating end 62. The sliding end 61 of the second transmission arm 6 is slidably connected to the second fixed bracket 32. The sliding end 61 of the second transmission arm 6 may be disposed in the second sliding slot 324 of the second fixed bracket 32. A second limiting component 82 may be disposed on the second fixed bracket 32, and the second limiting component 82 is configured to limit a relative motion between the sliding end 61 of the second transmission arm 6 and the second fixed bracket 32. The rotating end 62 of the second transmission arm 6 is rotatably connected to the main shaft assembly 1.

Refer to FIG. 14 and FIG. 19. The rotating end 62 of the second transmission arm 6 is arc-shaped and is disposed in one of the arc-shaped grooves 131 of the main shaft assembly 1. In this case, a rotation center around which the second transmission arm 6 rotates relative to the main shaft assembly 1 is close to the main inner shaft 15 and away from the main outer shaft 14. In this embodiment, the second transmission arm 6 is connected to the main shaft assembly 1 by using a virtual shaft. In some other embodiments, the first transmission arm 4 may alternatively be connected to the main shaft assembly 1 by using a physical shaft. This is not strictly limited in this embodiment of this application.

Figure 25:
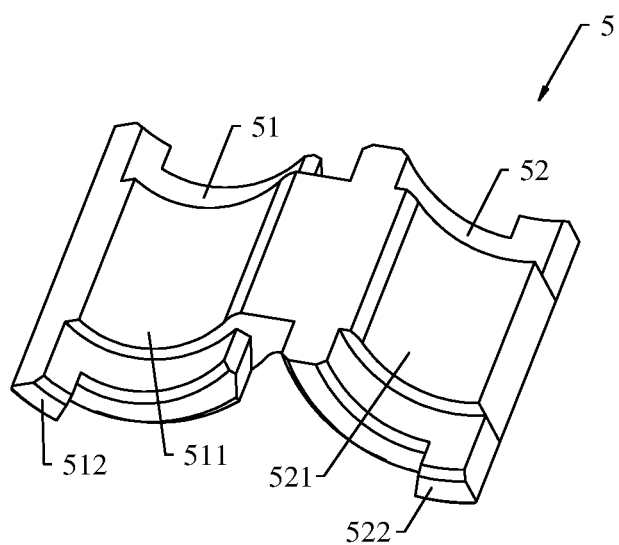
FIG. 25 is a schematic diagram of a structure of a first rotating arm of the end connecting assembly shown in FIG. 19.

FIG. 25 is a schematic diagram of a structure of the first rotating arm 5 of the end connecting assembly 20a shown in FIG. 19.

In some embodiments, both ends of the first rotating arm 5 are rotating ends. One end 51 that is of the first rotating arm 5 and that is rotatably connected to the first fixed bracket 31 is arc-shaped and is disposed in the first arc-shaped groove 313. For example, one end 51 of the first rotating arm 5 includes a limiting bulge 511 and a limiting projection 512. The limiting bulge 511 is configured to cooperate with the limiting groove 3121 of the first arc-shaped groove 313. The limiting projection 512 is configured to cooperate with the stop block 3122 of the first fixed bracket 31.

Refer to FIG. 25 and FIG. 15. One end 52 that is of the first rotating arm 5 and that is rotatably connected to the main shaft assembly 1 is arc-shaped and is disposed in one of the arc-shaped grooves 131 of the main shaft assembly 1. In this case, a rotation center around which the first rotating arm 5 rotates relative to the main shaft assembly 1 is close to the main outer shaft 14 and away from the main inner shaft 15. For example, the end 52 of the first rotating arm 5 includes a limiting bulge 521 and a limiting projection 522. The limiting bulge 521 is configured to cooperate with the limiting groove 1431 of the main shaft assembly 1. The limiting projection 522 is configured to cooperate with the limiting projection 144 of the main shaft assembly 1.

In this embodiment, the first rotating arm 5 is approximately in a "W" shape. The first rotating arm 5 is connected to the first fixed bracket 31 by using a virtual shaft, and the first rotating arm 5 is also connected to the main shaft assembly 1 by using a virtual shaft. In this way, the rotatable connection has a simple structure and occupies small space. This helps reduce a thickness of the rotating mechanism 20, so that the folding apparatus 100 and the electronic device 1000 are more light and thin. In some other embodiments, the first rotating arm 5 may alternatively be connected to the first fixed bracket 31 by using a physical shaft, and the first rotating arm 5 may alternatively be connected to the main shaft assembly 1 by using a physical shaft. This is not strictly limited in this embodiment of this application.

In some embodiments, as shown in FIG. 18 and FIG. 19, a structure of the second rotating arm 7 may be the same as a structure of the first rotating arm 5. Both ends of the second rotating arm 7 are rotating ends. The second rotating arm 7 is approximately in a "W" shape. One end 71 that is of the second rotating arm 7 and that is rotatably connected to the second fixed bracket 32 is arc-shaped and is disposed in the second arc-shaped groove 323. Refer to FIG. 16 and FIG. 19. One end 72 that is of the second rotating arm 7 and that is rotatably connected to the main shaft assembly 1 is arc-shaped and is disposed in one of the arc-shaped grooves 131 of the main shaft assembly 1. In this case, a rotation center around which the second rotating arm 7 rotates relative to the main shaft assembly 1 is close to the main outer shaft 14 and away from the main inner shaft 15. In this embodiment, the second rotating arm 7 is separately connected to the second fixed bracket 32 and the main shaft assembly 1 by using a virtual shaft. In some other embodiments, the second rotating arm 7 may alternatively be separately connected to the second fixed bracket 32 and the main shaft assembly 1 by using a physical shaft. This is not strictly limited in this embodiment of this application.

Figure 26:
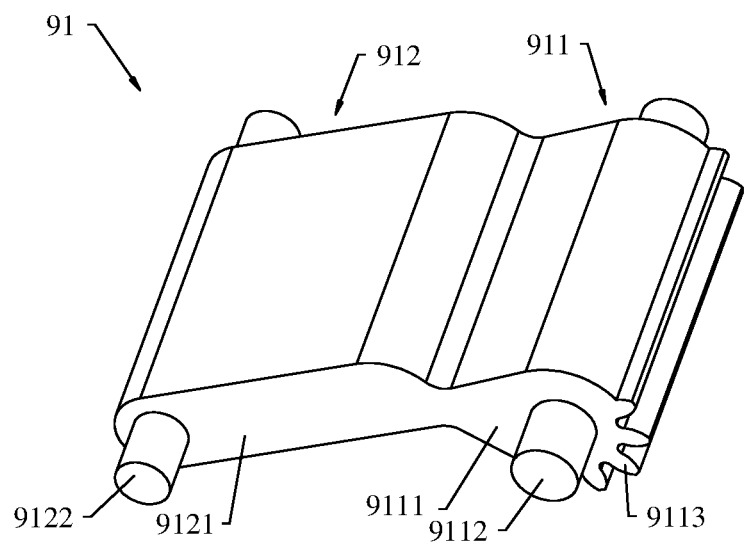
FIG. 26 is a schematic diagram of a structure of a first synchronous swing arm of the end connecting assembly shown in FIG. 19.

FIG. 26 is a schematic diagram of a structure of the first synchronous swing arm 91 of the end connecting assembly 20a shown in FIG. 19.

In some embodiments, the first synchronous swing arm 91 includes a rotating end 911 and a movable end 912. The rotating end 911 of the first synchronous swing arm 91 is rotatably connected to the main shaft assembly 1, and the movable end 912 of the first synchronous swing arm 91 is movably connected to the first fixed bracket 31. When the first housing 10 and the second housing 30 are folded or unfolded relative to each other, the movable end 912 of the first synchronous swing arm 91 slides and rotates relative to the first fixed bracket 31.

For example, the rotating end 911 of the first synchronous swing arm 91 includes a first rotating body 9111, a first rotating shaft 9112, and a first gear 9113. The first rotating body 9111 includes a front facet and a back facet that are disposed back to back, and a circumferential side facet connected between the front facet and the back facet. The first gear 9113 is fastened to the circumferential side facet of the first rotating body 9111. The first rotating shaft 9112 is fastened to the front facet and/or the back facet of the first rotating body 9111. In embodiments of this application, "A and/or B" includes three cases: "A", "B", and "A and B". In some embodiments, the first rotating shaft 9112 includes two parts, and the two parts are respectively fastened to the front facet and the back facet of the first rotating body 9111, so that the first synchronous swing arm 91 has improved balance and stability when being rotatably connected to another structure by using the first rotating shaft 9112. In some other embodiments, the first rotating shaft 9112 includes one part, and the first rotating shaft 9112 is fastened to the front facet or the back facet of the first rotating body 9111, to lower a requirement for space of the first synchronous swing arm 91. The first rotating shaft 9112 is configured to be rotatably connected to the main shaft assembly 1. The first synchronous swing arm 91 may be disposed in one of M-shaped grooves 132 (as shown in FIG. 17) of the main shaft assembly 1, and the first rotating shaft 9112 is disposed in one recess groove 133 of the M-shaped groove 132. In this embodiment, the rotating end 911 of the first synchronous swing arm 91 is rotatably connected to the main shaft assembly 1 by using a physical shaft. In some other embodiments, the rotating end 911 of the first synchronous swing arm 91 may alternatively be rotatably connected to the main shaft assembly 1 by using a virtual shaft. This is not strictly limited in this embodiment of this application.

For example, the movable end 912 of the first synchronous swing arm 91 includes a third rotating body 9121 and a third rotating shaft 9122, and the third rotating shaft 9122 is fastened to a front facet and/or a back facet of the third rotating body 9121. The movable end 912 of the first synchronous swing arm 91 may be disposed in the third sliding slot 316 of the first fixed bracket 31, and the third rotating shaft 9122 may be disposed in the guiding space 3161 of the third sliding slot 316. The movable end 912 of the first synchronous swing arm 91 can slide and rotate relative to the first fixed bracket 31.

In this embodiment, the guiding space 3161 of the third sliding slot 316 cooperates with the first rotating shaft 9112 of the first synchronous swing arm 91, so that the movable end 912 of the first synchronous swing arm 91 can be guided in a sliding direction of the third sliding slot 316. In this way, a relative movement action between the first synchronous swing arm 91 and the first fixed bracket 31 is easier to implement and control precision is higher.

As shown in FIG. 18 and FIG. 19, for example, the second synchronous swing arm 92 includes a rotating end 921 and a movable end 922, the rotating end 921 of the second synchronous swing arm 92 is rotatably connected to the main shaft assembly 1, the rotating end 921 of the second synchronous swing arm 92 is engaged with the rotating end 911 of the first synchronous swing arm 91, and the movable end 922 of the second synchronous swing arm 92 is movably connected to the second fixed bracket 32. When the first housing 10 and the second housing 30 are folded or unfolded relative to each other, the movable end 922 of the second synchronous swing arm 92 slides and rotates relative to the second fixed bracket 32.

In this embodiment, the rotating end 911 of the first synchronous swing arm 91 and the rotating end 921 of the second synchronous swing arm 92 are engaged with each other, and both the rotating end 911 of the first synchronous swing arm 91 and the rotating end 921 of the second synchronous swing arm 92 are rotatably connected to the main shaft assembly 1, the movable end 912 of the first synchronous swing arm 91 is movably connected to the first fixed bracket 31, and the movable end 922 of the second synchronous swing arm 92 is movably connected to the second fixed bracket 32. Therefore, when the first fixed bracket 31 and the second fixed bracket 32 are unfolded or folded relative to each other, the first synchronous swing arm 91 and the second synchronous swing arm 92 can control rotation angles of the first fixed bracket 31 and the second fixed bracket 32 to be consistent relative to the main shaft assembly 1, so that rotation actions of the first fixed bracket 31 and the second fixed bracket 32 are synchronous and consistent. Symmetry of folding actions and unfolding actions of the rotating mechanism 20 is high. This helps improve user experience.

The first synchronous swing arm 91 is rotatably connected to the main shaft assembly 1, and slidably and rotatably connected to the first fixed bracket 31, so that a link-slider structure is formed. The second synchronous swing arm 92 is rotatably connected to the main shaft assembly 1, and slidably and rotatably connected to the second fixed bracket 32, so that a link-slider structure is formed. The two link-slider structures that are engaged with each other can effectively control the rotation actions of the first housing 10 and the second housing 30 to be synchronous and consistent.

In some embodiments, as shown in FIG. 19, the rotating end 921 of the second synchronous swing arm 92 includes a second rotating body 9211, a second rotating shaft 9212, and a second gear 9213. The second rotating shaft 9212 is fastened to a front facet and/or a back facet of the second rotating body 9211, and the second gear 9213 is fastened to a circumferential side facet of the second rotating body 9211. The rotating end 921 of the second synchronous swing arm 92 may be disposed in one of the M-shaped grooves 132 (as shown in FIG. 17) of the main shaft assembly 1, and the second rotating shaft 9212 is disposed in the other recess groove 133 of the M-shaped groove 132. The second rotating shaft 9212 is rotatably connected to the main shaft assembly 1, and the second gear 9213 is engaged with the first gear 9113.

In this embodiment, the rotating end 911 of the first synchronous swing arm 91 and the rotating end 921 of the second synchronous swing arm 92 are directly engaged with each other by using the first gear 9113 and the second gear 9213, so that a synchronization assembly jointly formed by the first synchronous swing arm 91 and the second synchronous swing arm 92 has a simple structure, a movement process is easy to control, and accuracy is high.

For example, the movable end 922 of the second synchronous swing arm 92 has a fourth rotating shaft 9221, the second synchronous swing arm 92 is disposed in the fourth sliding slot 326, and the fourth rotating shaft 9221 is disposed in the guiding space 3261 of the fourth sliding slot 326. The guiding space 3261 of the fourth sliding slot 326 cooperates with the fourth rotating shaft 9221 of the second synchronous swing arm 92, so that the movable end 922 of the second synchronous swing arm 92 can be guided in a sliding direction of the fourth sliding slot 326. In this way, a relative movement action between the second synchronous swing arm 92 and the second fixed bracket 32 is easier to implement and control precision is higher.

In some other embodiments, the first synchronous swing arm 91 may alternatively be connected to the first fixed bracket 31 by using a connector, and the second synchronous swing arm 92 may alternatively be connected to the second fixed bracket 32 by using a connector. For example, the rotating mechanism 20 further includes a first connector and a second connector. The first connector is slidably disposed in the guiding space 3161 of the third sliding slot 316, the first rotating shaft 9112 is rotatably connected to the first connector, the second connector is slidably disposed in the guiding space 3261 of the fourth sliding slot 326, and the second rotating shaft 9212 is rotatably connected to the second connector.

For example, a structure of the second synchronous swing arm 92 may be approximately the same as a structure of the first synchronous swing arm 91, to reduce material types of the rotating mechanism 20, and reduce design difficulty and costs of the rotating mechanism 20. A structure difference between the second synchronous swing arm 92 and the first synchronous swing arm 91 lies in that the first gear 9113 and the second gear 9213 are arranged at different angles, to facilitate engagement of the first gear 9113 and the second gear 9213.

Figure 27:
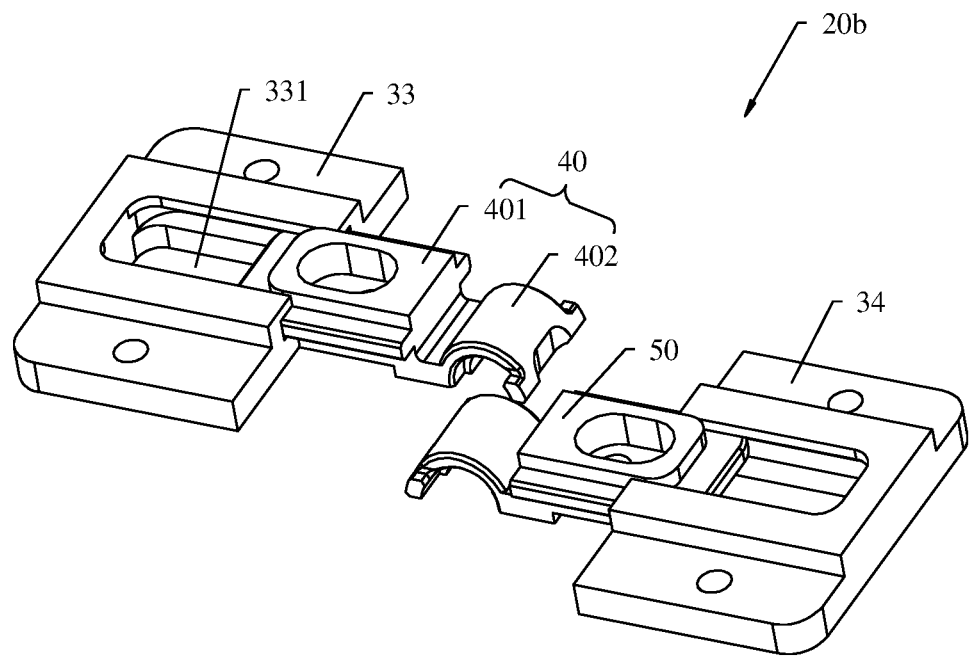
FIG. 27 is a schematic diagram of a structure of a middle connecting assembly shown in FIG. 10 from another angle.
Figure 28:
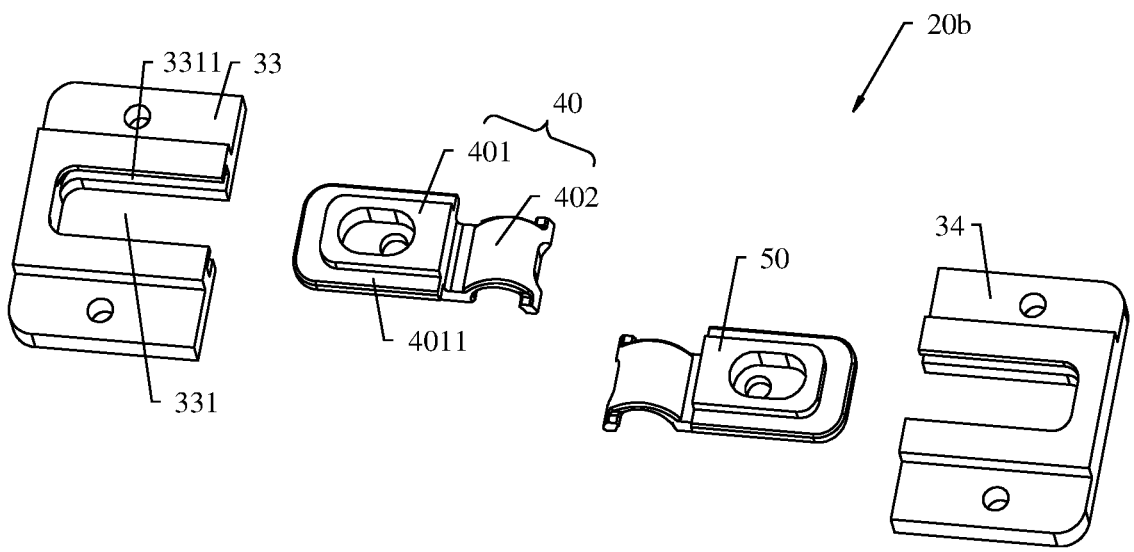
FIG. 28 is a schematic diagram of an exploded structure of the middle connecting assembly shown in FIG. 27.

FIG. 27 is a schematic diagram of a structure of the middle connecting assembly 20b shown in FIG. 10 from another angle, and FIG. 28 is a schematic diagram of an exploded structure of the middle connecting assembly 20b shown in FIG. 27.

In some embodiments, the middle connecting assembly 20b of the rotating mechanism 20 includes a third transmission arm 40, a third fixed bracket 33, a fourth transmission arm 50, and a fourth fixed bracket 34. The third fixed bracket 33 is fastened to the first housing 10. One end of the third transmission arm 40 is rotatably connected to the main shaft assembly 1, and the other end of the third transmission arm 40 is slidably connected to the third fixed bracket 33. The fourth fixed bracket 34 is fastened to the second housing 30. One end of the fourth transmission arm 50 is rotatably connected to the main shaft assembly 1, and the other end of the fourth transmission arm 50 is slidably connected to the fourth fixed bracket 34.

In this embodiment, the third transmission arm 40, the third fixed bracket 33, the fourth transmission arm 50, and the fourth fixed bracket 34 are disposed in the rotating mechanism 20 to increase interaction force between the first housing 10 and the second housing 30, and the rotating mechanism 20, so that the folding apparatus 100 is easier to fold and unfold.

For example, there is a fifth sliding slot 331 on the third fixed bracket 33, and a middle part of a slot wall of the fifth sliding slot 331 is recessed to form a guiding space 3311 of the fifth sliding slot 331. The third transmission arm 40 includes a sliding end 401 and a rotating end 402. The sliding end 401 of the third transmission arm 40 has a third flange 4011. The sliding end 401 of the third transmission arm 40 is disposed in the fifth sliding slot 331, and the third flange 4011 is disposed in the guiding space 3311 of the fifth sliding slot 331. The rotating end 402 of the third transmission arm 40 is arc-shaped and is disposed in one of the arc-shaped grooves 131 of the main shaft assembly 1. In this case, the third transmission arm 40 is rotatably connected to the main shaft assembly 1 by using a virtual shaft. In some other embodiments, the third transmission arm 40 may alternatively be rotatably connected to the main shaft assembly 1 by using a physical shaft. This is not strictly limited in this embodiment of this application.

The rotating end 402 of the third transmission arm 40 includes a limiting bulge and a limiting projection, and the limiting bulge is formed on an inner side of the rotating end 402 and the limiting projection is formed on an end part of the rotating end 402. The limiting bulge is configured to cooperate with the limiting groove of the main shaft assembly 1, so that mutual limiting of the third transmission arm 40 and the main shaft assembly 1 is implemented in the axial direction of the main shaft assembly 1. The limiting projection is configured to cooperate with the projection of the main shaft assembly 1 that has a limiting function, to prevent the third transmission arm 40 from being accidentally detached from the main shaft assembly 1.

For example, a structure of the fourth fixed bracket 34 may be the same as a structure of the third fixed bracket 33, and a structure of the fourth transmission arm 50 may be the same as a structure of the third transmission arm 40. Details are not described in this embodiment of this application.

In some embodiments, as shown in FIG. 10, a rotation center 40C around which the third transmission arm 40 rotates relative to the main shaft assembly 1 and the rotation center 4C around which the first transmission arm 4 rotates relative to the main shaft assembly 1 are collinear. A rotation center 50C around which the fourth transmission arm 50 rotates relative to the main shaft assembly 1 and the rotation center 6C around which the second transmission arm 6 rotates relative to the main shaft assembly 1 are collinear.

In this embodiment, the rotation centers around which the third transmission arm 40 and the first transmission arm 4 rotate relative to the main shaft assembly 1 are collinear, and the third transmission arm 40 is slidably connected to the third fixed bracket 33, and the rotation centers around which the fourth transmission arm 50 and the second transmission arm 6 rotate relative to the main shaft assembly 1 are collinear, and the fourth transmission arm 50 is slidably connected to the fourth fixed bracket 34. In this way, movement of the third transmission arm 40 can be synchronized with movement of the first transmission arm 4, and movement of the fourth transmission arm 50 can be synchronized with movement of the second transmission arm 6, so that a structure design and a connection relationship of the rotating mechanism 20 can be simplified, and reliability of the rotating structure is improved. In addition, a structure of the third transmission arm 40 may be the same as a structure of the first transmission arm 4, and a structure of the fourth transmission arm 50 may be the same as a structure of the second transmission arm 6, to reduce design difficulty of the rotating mechanism 20.

Figure 29:
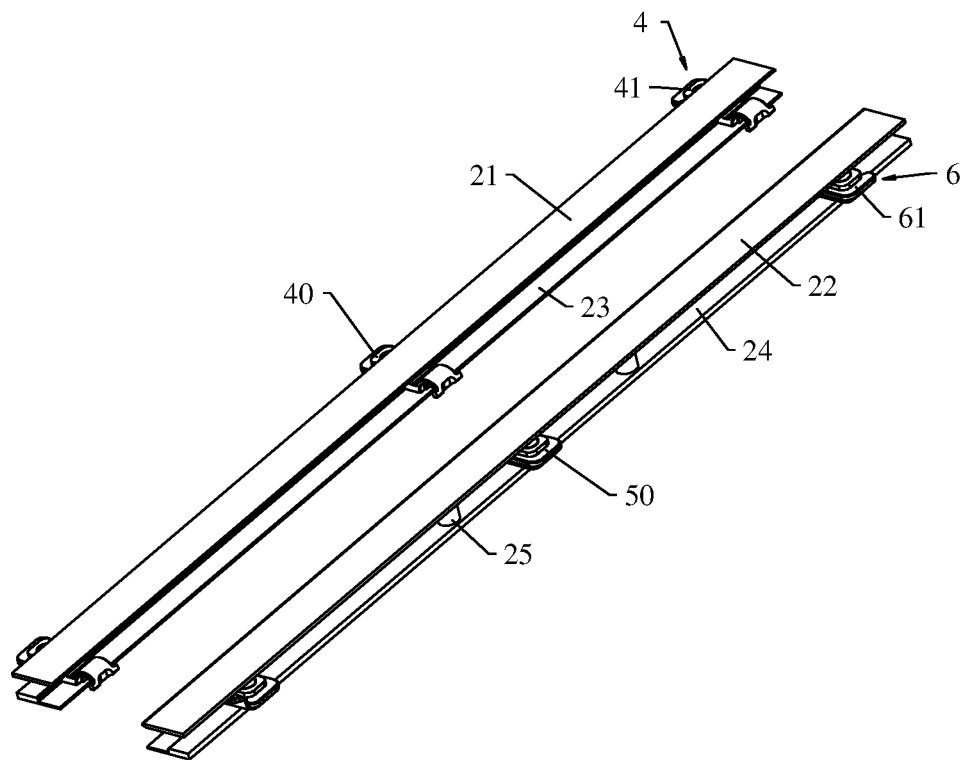
FIG. 29 is a schematic diagram of a partial structure of a rotating mechanism shown in FIG. 7.

FIG. 29 is a schematic diagram of a partial structure of the rotating mechanism 20 shown in FIG. 7.

In some embodiments, the first supporting plate 21 is fixedly connected to the sliding end 41 of the first transmission arm 4, and the second supporting plate 22 is fixedly connected to the sliding end 61 of the second transmission arm 6. The first shielding plate 23 is located on a side that is of the first transmission arm 4 and that faces away from the first supporting plate 21, and is fixedly connected to the sliding end 41 of the first transmission arm 4. The second shielding plate 24 is located on a side that is of the second transmission arm 6 and that faces away from the second supporting plate 22, and is fixedly connected to the sliding end 61 of the second transmission arm 6. In other words, both the first supporting plate 21 and the first shielding plate 23 are fastened to the sliding end 41 of the first transmission arm 4, and are respectively located on two sides of the first transmission arm 4. Both the second supporting plate 22 and the second shielding plate 24 are fastened to the sliding end 61 of the second transmission arm 6, and are respectively located on two sides of the second transmission arm 6.

In this embodiment, the first supporting plate 21, the first shielding plate 23, and the first transmission arm 4 are assembled into one component, and the second supporting plate 22, the second shielding plate 24, and the second transmission arm 6 are assembled into one component. Therefore, the first transmission arm 4 can directly control motion tracks of the first supporting plate 21 and the first shielding plate 23, and the second transmission arm 6 can directly control motion tracks of the second supporting plate 22 and the second shielding plate 24. In this way, precision is high in controlling movement processes of the first supporting plate 21, the second supporting plate 22, the first shielding plate 23, and the second shielding plate 24, and hysteresis is small, to implement accurately extending or retracting when the folding apparatus 100 is rotated, so as to meet a requirement of supporting the flexible display 200 and a self-shielding requirement of the rotating mechanism 20.

For example, both the first supporting plate 21 and the first shielding plate 23 are fastened to first transmission arms 4 of the two end connecting assemblies 20a, and may further be fastened to the third transmission arm 40 of the middle connecting assembly 20b, and both the second supporting plate 22 and the second shielding plate 24 are fastened to second transmission arms 6 of the two end connecting assemblies 20a, and may further be fastened to the fourth transmission arm 50 of the middle connecting assembly 20b. In this case, the plurality of connecting assemblies (the assemblies 20a and the assembly 20b) may jointly drive the first supporting plate 21, the first shielding plate 23, the second supporting plate 22, and the second shielding plate 24 to move, so that motion control difficulty is reduced and motion control precision is improved.

In some embodiments, sliding ends of a plurality of transmission arms can be locked and fastened to the supporting plate and the shielding plate by using fasteners. The fastener includes but is not limited to a screw, a bolt, a rivet, a dowel pin, and the like. Concave-convex fitting structures may be further disposed between the sliding ends of the plurality of transmission arms and the supporting plate, and between the sliding ends of the plurality of transmission arms and the shielding plate, so that assembly precision and reliability are improved. For example, as shown in FIG. 24, there is further a positioning hole 414 on the sliding end 41 of the first transmission arm 4. As shown in FIG. 8, the first supporting plate 21 includes a positioning block 211. The positioning block 211 of the first supporting plate 21 may be embedded into the positioning hole 414 of the first transmission arm 4, to implement mutual positioning and limiting between the first supporting plate 21 and the first transmission arm 4.

In some embodiments, as shown in FIG. 29, the first supporting plate 21 and/or the first shielding plate 23 further include/includes one or more supporting columns, configured to support the first supporting plate 21 and the first shielding plate 23, to improve support strength of the first supporting plate 21 and the first shielding plate 23. The second supporting plate 22 and/or the second shielding plate 24 further include/includes one or more supporting columns 25, configured to support the second supporting plate 22 and the second shielding plate 24, to improve support strength of the second supporting plate 22 and the second shielding plate 24.

Figure 30:
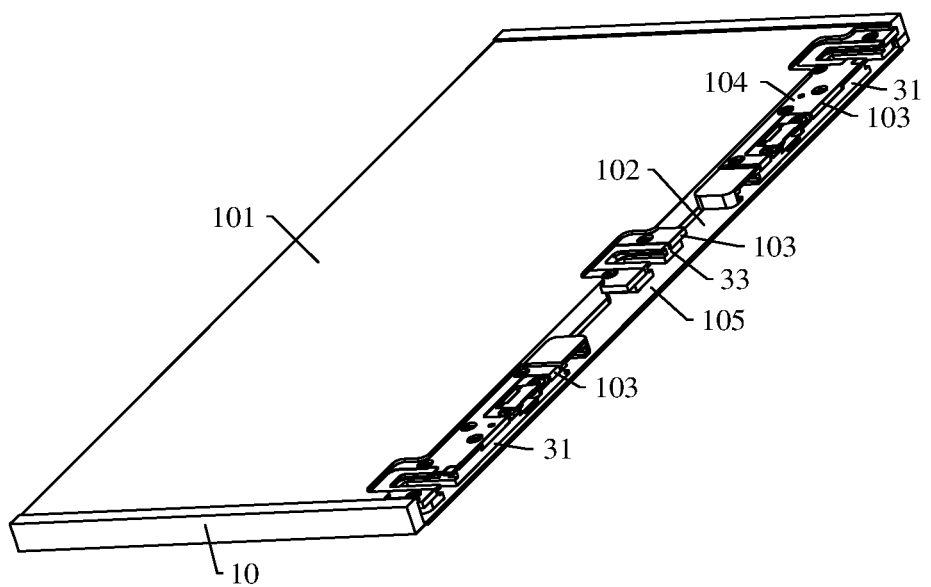
FIG. 30 is a schematic diagram of a partial structure of the folding apparatus shown in FIG. 2.

FIG. 30 is a schematic diagram of a partial structure of the folding apparatus 100 shown in FIG. 2. The structure shown in FIG. 30 includes the first housing 10, first fixed brackets 31 of the two end connecting assemblies 20a, and the third fixed bracket 33 of the middle connecting assembly 20b.

In some embodiments, there is a first fixed groove 102 on a side that is of the first housing 10 and that is close to the rotating mechanism 20, the first housing 10 includes a first positioning plate 103 located in the first fixed groove 102, the first positioning plate 103 and a groove bottom wall of the first fixed groove 102 are spaced, and the first fixed bracket 31 is located between the first positioning plate 103 and the groove bottom wall of the first fixed groove 102, and is fixedly connected to the first positioning plate 103. In this embodiment, because the first fixed bracket 31 and the first housing 10 are fastened to each other, the first housing 10 moves with the first fixed bracket 31, and the rotating mechanism 20 may control a motion trail of the first housing 10 by controlling a motion trail of the first fixed bracket 31.

In some embodiments, the first housing 10 has a first supporting surface 101, and the first positioning plate 103 sinks relative to the first supporting surface 101 to form a first accommodating groove 104. The first accommodating groove 104 can provide an accommodation and movement space for the first supporting plate 21. A location at which the first accommodating groove 104 is disposed enables a supporting surface of the first supporting plate 21 disposed in the first accommodating groove 104 to be flush with the first supporting surface 101 of the first housing 10. In this way, the first supporting plate 21 can better support the flexible display 200. A depth of the first accommodating groove 104 is very shallow, and a supporting backplane with high hardness is disposed on a non-display side of the flexible display 200. Therefore, when the first supporting plate 21 partially extends out of the first accommodating groove 104, a part that is of the flexible display 200 and that faces the first accommodating groove 104 does not deform significantly when been pressed by a user. This also ensures reliability of the flexible display 200.

For example, the third fixed bracket 33 is located between the first positioning plate 103 and the groove bottom wall of the first fixed groove 102, and is fixedly connected to the first positioning plate 103. A gap 105 is formed between the two first fixed brackets 31 and the third fixed bracket 33, and the groove bottom wall of the first fixed groove 102, and the gap 105 is used to provide an accommodation and movement space for the first shielding plate 23.

For example, the first positioning plate 103 may include a plurality of structures spaced from each other, or may be a continuous structure. This is not strictly limited in this application. The first fixed brackets 31 and the third fixed bracket 33 may be locked with the first positioning plate 103 by using fasteners. The fastener may be but is not limited to a structure such as a screw, a bolt, or a rivet. In some other embodiments, another connection structure may be alternatively formed between the first fixed brackets 31 and the third fixed bracket 33, and the first housing 10. This is not strictly limited in this application.

Figure 31:
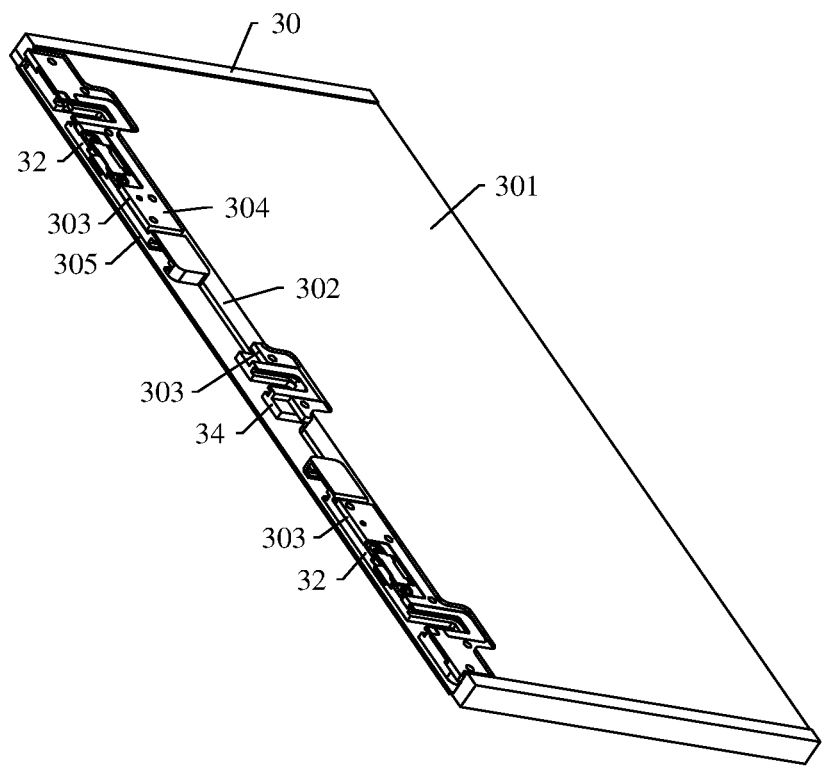
FIG. 31 is a schematic diagram of a partial structure of the folding apparatus shown in FIG. 2.

FIG. 31 is a schematic diagram of a partial structure of the folding apparatus 100 shown in FIG. 2. The structure shown in FIG. 31 includes the second housing 30, second fixed brackets 32 of the two end connecting assemblies 20a, and the fourth fixed bracket 34 of the middle connecting assembly 20b.

In some embodiments, there is a second fixed groove 302 on a side that is of the second housing 30 and that is close to the rotating mechanism 20, the second housing 30 includes a second positioning plate 303 located in the second fixed groove 302, the second positioning plate 303 and a groove bottom wall of the second fixed groove 302 are spaced, and the second fixed bracket 32 is located between the second positioning plate 303 and the groove bottom wall of the second fixed groove 302, and is fixedly connected to the second positioning plate 303. In this embodiment, because the second fixed bracket 32 and the second housing 30 are fastened to each other, the second housing 30 moves with the second fixed bracket 32, and the rotating mechanism 20 may control a motion trail of the second housing 30 by controlling a motion trail of the second fixed bracket 32.

In some embodiments, the second housing 30 has a second supporting surface 301, and the second positioning plate 303 sinks relative to the second supporting surface 301 to form a second accommodating groove 304. The second accommodating groove 304 can provide an accommodation and movement space for the second supporting plate 22. A location at which the second accommodating groove 304 is disposed enables a supporting surface of the second supporting plate 22 disposed in the second accommodating groove 304 to be flush with the second supporting surface 301 of the second housing 30. In this way, the second supporting plate 22 can better support the flexible display 200. A depth of the second accommodating groove 304 is very shallow, and the supporting backplane with high hardness is disposed on the non-display side of the flexible display 200. Therefore, when the second supporting plate 22 partially extends out of the second accommodating groove 304, a part that is of the flexible display 200 and that faces the second accommodating groove 304 does not deform significantly when been pressed by a user. This also ensures reliability of the flexible display 200.

For example, the fourth fixed bracket 34 is located between the second positioning plate 303 and the groove bottom wall of the second fixed groove 302, and is fixedly connected to the second positioning plate 303. A gap 305 is formed between the two second fixed brackets 32 and the fourth fixed bracket 34, and the groove bottom wall of the second fixed groove 302, and the gap 305 is used to provide an accommodation and movement space for the second shielding plate 24.

For example, the second positioning plate 303 may include a plurality of structures spaced from each other, or may be a continuous structure. This is not strictly limited in this application. The second fixed brackets 32 and the fourth fixed bracket 34 may be locked with the second positioning plate 303 by using fasteners. The fastener may be but is not limited to a structure such as a screw, a bolt, or a rivet. In some other embodiments, another connection structure may be alternatively formed between the second fixed brackets 32 and the fourth fixed bracket 34, and the second housing 30. This is not strictly limited in this application.

Figure 32:
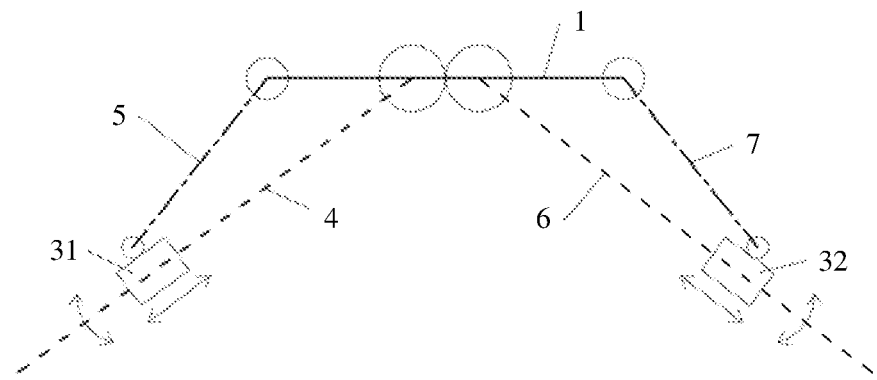
FIG. 32 is a schematic diagram of a connection relationship between a partial structure of an end connecting assembly and a main shaft assembly shown in FIG. 8.

FIG. 32 is a schematic diagram of a connection relationship between a partial structure of the end connecting assembly 20a and the main shaft assembly 1 shown in FIG. 8.

One end of the first transmission arm 4 is rotatably connected to the main shaft assembly 1 and the other end of the first transmission arm 4 is movably connected to the first fixed bracket 31. One end of the first rotating arm 5 is rotatably connected to the main shaft assembly 1 and the other end of the first rotating arm 5 is rotatably connected to the first fixed bracket 31. One end of the second transmission arm 6 is rotatably connected to the main shaft assembly 1 and the other end of the second transmission arm 6 is movably connected to the second fixed bracket 32. One end of the second rotating arm 7 is rotatably connected to the main shaft assembly 1 and the other end of the second rotating arm 7 is rotatably connected to the second fixed bracket 32. When both the first transmission arm 4 and the first rotating arm 5 rotate relative to the main shaft assembly 1, the first fixed bracket 31 can be pulled back to approach the main shaft assembly 1, or the first fixed bracket 31 can be pushed out to move away from the main shaft assembly 1. In this way, the first fixed bracket 31 drives the first housing 10 to implement pull-in and push-out motions. When both the second transmission arm 6 and the second rotating arm 7 rotate relative to the main shaft assembly 1, the second fixed bracket 32 can be pulled back to approach the main shaft assembly 1, or the second fixed bracket 32 can be pushed out to move away from the main shaft assembly 1. In this way, the second fixed bracket 32 drives the second housing 30 to implement pull-in and push-out motions.

The following describes a structure of the folding apparatus 100 with reference to a plurality of diagrams of internal structures obtained when the folding apparatus 100 is in the flattened state, the intermediate state, and the closed state.

Figure 33:
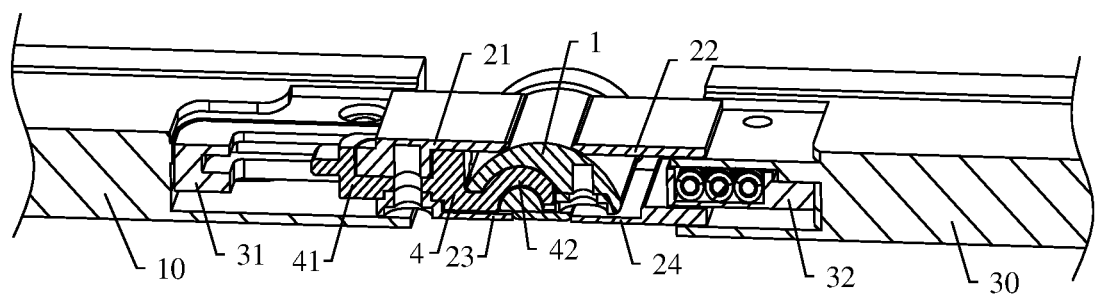
FIG. 33 is a schematic cross-sectional diagram of a structure of a position that is of a first transmission arm and that is corresponding to the folding apparatus shown in FIG. 2.
Figure 34:
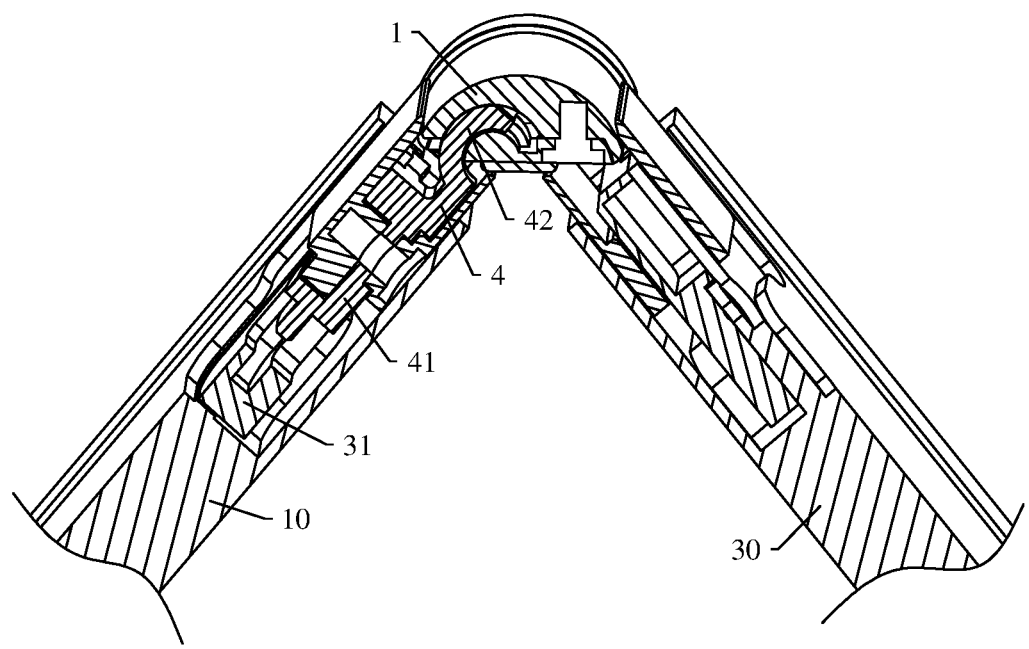
FIG. 34 is a schematic cross-sectional diagram of a structure of a position that is of a first transmission arm and that is corresponding to the folding apparatus shown in FIG. 4.
Figure 35:
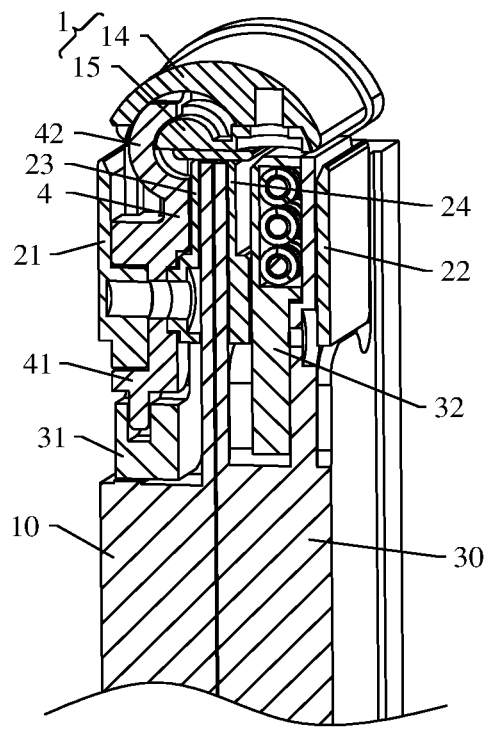
FIG. 35 is a schematic cross-sectional diagram of a structure of a position that is of a first transmission arm and that is corresponding to the folding apparatus shown in FIG. 6.

FIG. 33 is a schematic cross-sectional diagram of a structure of a position that is of the first transmission arm 4 and that is corresponding to the folding apparatus 100 shown in FIG. 2. FIG. 34 is a schematic cross-sectional diagram of a structure of a position that is of the first transmission arm 4 and that is corresponding to the folding apparatus 100 shown in FIG. 4. FIG. 35 is a schematic cross-sectional diagram of a structure of a position that is of the first transmission arm 4 and that is corresponding to the folding apparatus 100 shown in FIG. 6. FIG. 33 to FIG. 35 show position changes of the first transmission arm 4 obtained when the folding apparatus 100 is switched from the flattened state to the closed state.

As shown in FIG. 33, when the first housing 10 and the second housing 30 are unfolded relative to each other to the flattened state, the first transmission arm 4 is approximately parallel to the main shaft assembly 1, the rotating end 42 of the first transmission arm 4 is in a rotate-in position relative to the main shaft assembly 1, the sliding end 41 of the first transmission arm 4 is in a slide-out position relative to the first fixed bracket 31, and the first transmission arm 4 is away from the first fixed bracket 31 and the first housing 10.

As shown in FIG. 34, when the first housing 10 and the second housing 30 are in the intermediate state, the first transmission arm 4 is inclined relative to the main shaft assembly 1, the rotating end 42 of the first transmission arm 4 is in a partially rotate-out position/partially rotate-in position relative to the main shaft assembly 1, the sliding end 41 of the first transmission arm 4 is in a partially slide-in position/partially slide-out position relative to the first fixed bracket 31, and the first transmission arm 4 gradually approaches the first fixed bracket 31 and the first housing 10.

As shown in FIG. 35, when the first housing 10 and the second housing 30 are folded relative to each other to the closed state, the first transmission arm 4 is approximately perpendicular to the main shaft assembly 1, the rotating end 42 of the first transmission arm 4 is in a rotate-out position relative to the main shaft assembly 1, the sliding end 41 of the first transmission arm 4 is in a slide-in position relative to the first fixed bracket 31, and the first transmission arm 4 approaches the first fixed bracket 31 and the first housing 10.

Figure 36:
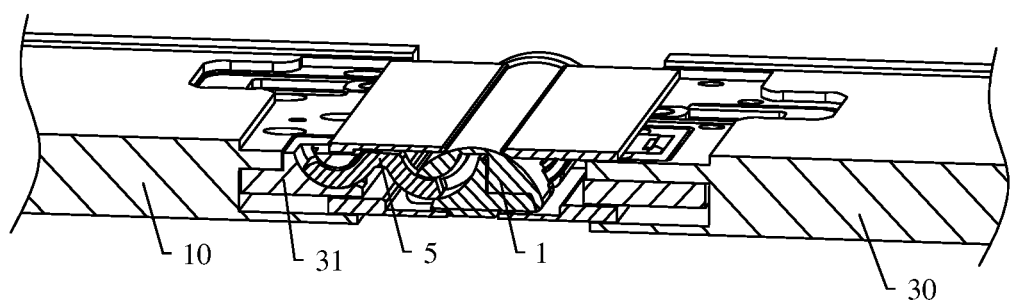
FIG. 36 is a schematic cross-sectional diagram of a structure of a position that is of a first rotating arm and that is corresponding to the folding apparatus shown in FIG. 2.
Figure 37:
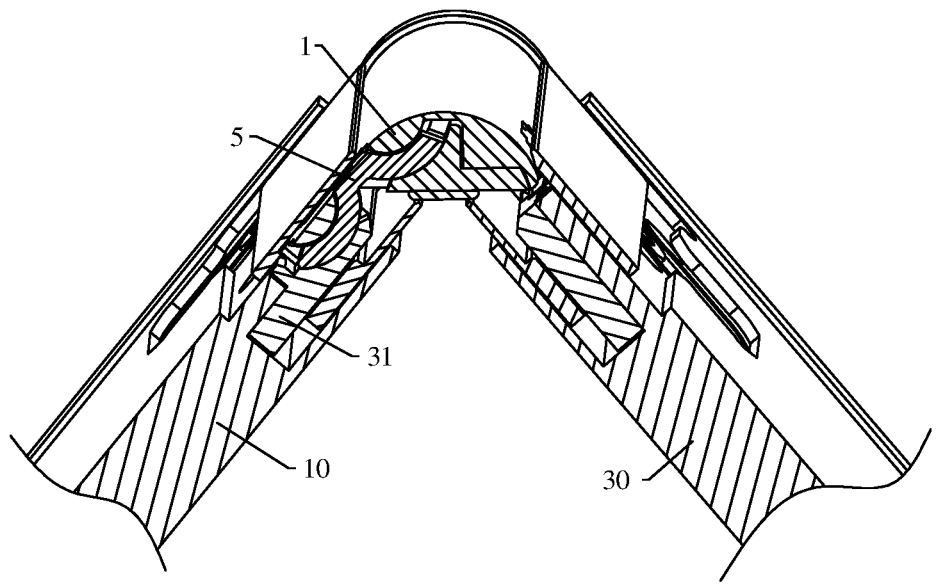
FIG. 37 is a schematic cross-sectional diagram of a structure of a position that is of a first rotating arm and that is corresponding to the folding apparatus shown in FIG. 4.
Figure 38:
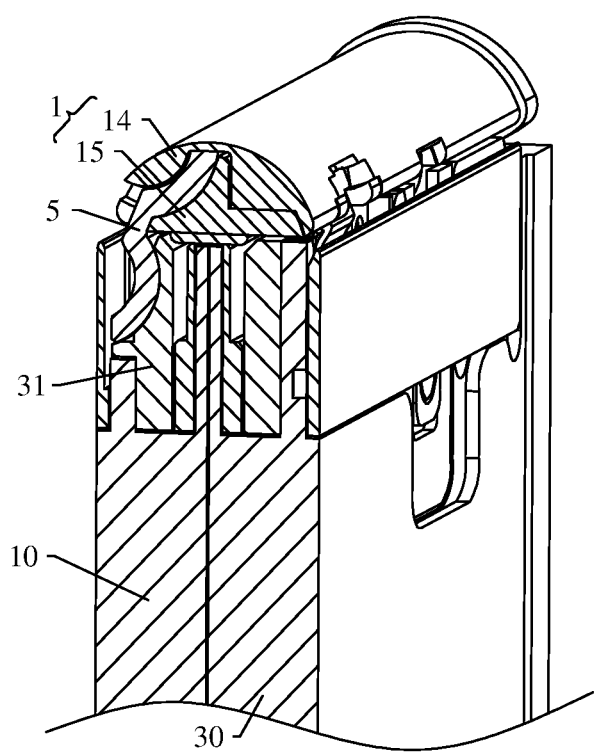
FIG. 38 is a schematic cross-sectional diagram of a structure of a position that is of a first rotating arm and that is corresponding to the folding apparatus shown in FIG. 6.

FIG. 36 is a schematic cross-sectional diagram of a structure of a position that is of the first rotating arm 5 and that is corresponding to the folding apparatus 100 shown in FIG. 2. FIG. 37 is a schematic cross-sectional diagram of a structure of a position that is of the first rotating arm 5 and that is corresponding to the folding apparatus 100 shown in FIG. 4. FIG. 38 is a schematic cross-sectional diagram of a structure of a position that is of the first rotating arm 5 and that is corresponding to the folding apparatus 100 shown in FIG. 6. FIG. 36 to FIG. 38 show position changes of the first rotating arm 5 obtained when the folding apparatus 100 is switched from the flattened state to the closed state.

As shown in FIG. 36, when the first housing 10 and the second housing 30 are unfolded relative to each other to the flattened state, one end of the first rotating arm 5 is in a rotate-out position relative to the main shaft assembly 1, and the other end of the first rotating arm 5 is in a rotate-out position relative to the first fixed bracket 31. As shown in FIG. 37, when the first housing 10 and the second housing 30 are in the intermediate state, one end of the first rotating arm 5 is in a partially rotate-out position/partially rotate-in position relative to the main shaft assembly 1, and the other end of the first rotating arm 5 is in a partially rotate-out position/partially rotate-in position relative to the first fixed bracket 31. As shown in FIG. 38, when the first housing 10 and the second housing 30 are folded relative to each other to the closed state, one end of the first rotating arm 5 is in a rotate-in position relative to the main shaft assembly 1, and the other end of the first rotating arm 5 is in a rotate-in position relative to the first fixed bracket 31.

In this embodiment, a position of the first rotating arm 5 and a position of the first transmission arm 4 (refer to FIG. 33 to FIG. 35) are mutually limited, and the first rotating arm 5 and the first transmission arm 4 jointly function, so that the first housing 10 can be rotated relative to the main shaft assembly 1 by using the flexible display 200 as a neutral surface.

For example, it can be learned from FIG. 36 to FIG. 38 that a rotation radian stroke of one end of the first rotating arm 5 in the first fixed bracket 31 is less than a rotation radian stroke of the other end of the first rotating arm 5 in the main shaft assembly 1. In some other embodiments, rotation radian strokes of the two ends of the first rotating arm 5 may alternatively be the same, or a rotation radian stroke of one end of the first rotating arm 5 in the first fixed bracket 31 may be greater than a rotation radian stroke of the other end of the first rotating arm 5 in the main shaft assembly 1.

Figure 39:
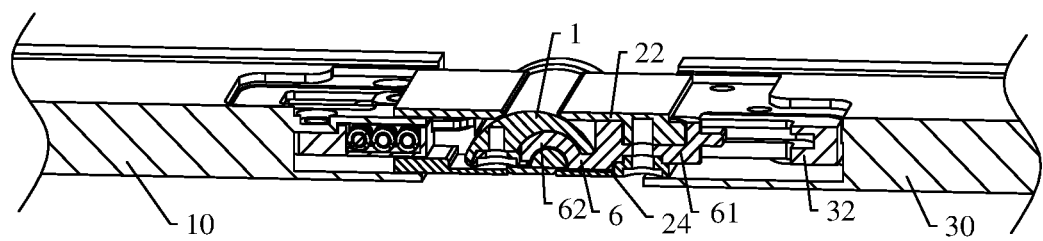
FIG. 39 is a schematic cross-sectional diagram of a structure of a position of a second transmission arm corresponding to the folding apparatus shown in FIG. 2.
Figure 40:
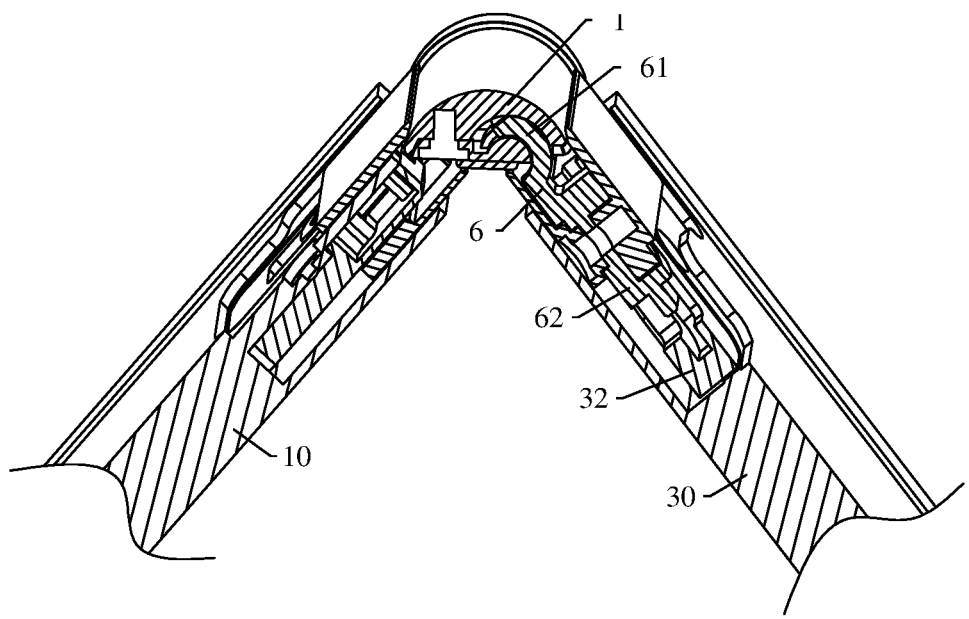
FIG. 40 is a schematic cross-sectional diagram of a structure of a position of a second transmission arm corresponding to the folding apparatus shown in FIG. 4.
Figure 41:
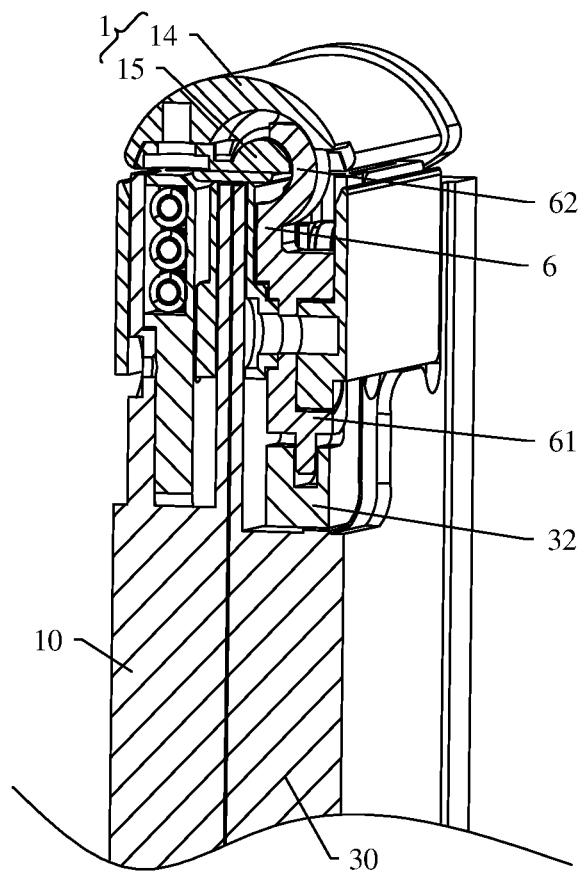
FIG. 41 is a schematic cross-sectional diagram of a structure of a position of a second transmission arm corresponding to the folding apparatus shown in FIG. 6.

FIG. 39 is a schematic cross-sectional diagram of a structure of a position that is of the second transmission arm 6 and that is corresponding to the folding apparatus 100 shown in FIG. 2. FIG. 40 is a schematic cross-sectional diagram of a structure of a position that is of the second transmission arm 6 and that is corresponding to the folding apparatus 100 shown in FIG. 4. FIG. 41 is a schematic cross-sectional diagram of a structure of a position that is of the second transmission arm 6 and that is corresponding to the folding apparatus 100 shown in FIG. 6. FIG. 39 to FIG. 41 show position changes of the second transmission arm 6 obtained when the folding apparatus 100 is switched from the flattened state to the closed state.

As shown in FIG. 39, when the first housing 10 and the second housing 30 are unfolded relative to each other to the flattened state, the second transmission arm 6 is approximately parallel to the main shaft assembly 1, the rotating end 62 of the second transmission arm 6 is in a rotate-in position relative to the main shaft assembly 1, the sliding end 61 of the second transmission arm 6 is in a slide-out position relative to the second fixed bracket 32, and the second transmission arm 6 is away from the second fixed bracket 32 and the second housing 30.

As shown in FIG. 40, when the first housing 10 and the second housing 30 are in the intermediate state, the second transmission arm 6 is inclined relative to the main shaft assembly 1, the rotating end 62 of the second transmission arm 6 is in a partially rotate-out position/partially rotate-in position relative to the main shaft assembly 1, the sliding end 61 of the second transmission arm 6 is in a partially slide-in position/partially slide-out position relative to the second fixed bracket 32, and the second transmission arm 6 gradually approaches the second fixed bracket 32 and the second housing 30.

As shown in FIG. 41, when the first housing 10 and the second housing 30 are folded relative to each other to the closed state, the second transmission arm 6 is approximately perpendicular to the main shaft assembly 1, the rotating end 62 of the second transmission arm 6 is in a rotate-out position relative to the main shaft assembly 1, the sliding end 61 of the second transmission arm 6 is in a slide-in position relative to the second fixed bracket 32, and the second transmission arm 6 approaches the second fixed bracket 32 and the second housing 30.

Figure 42:
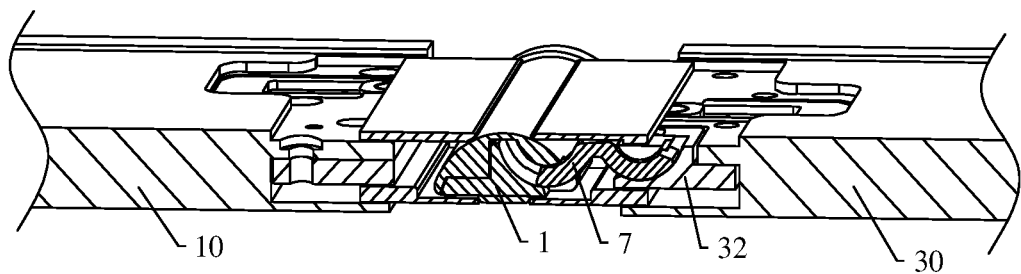
FIG. 42 is a schematic cross-sectional diagram of a structure of a position that is of a second rotating arm and that is corresponding to the folding apparatus shown in FIG. 2.
Figure 43:
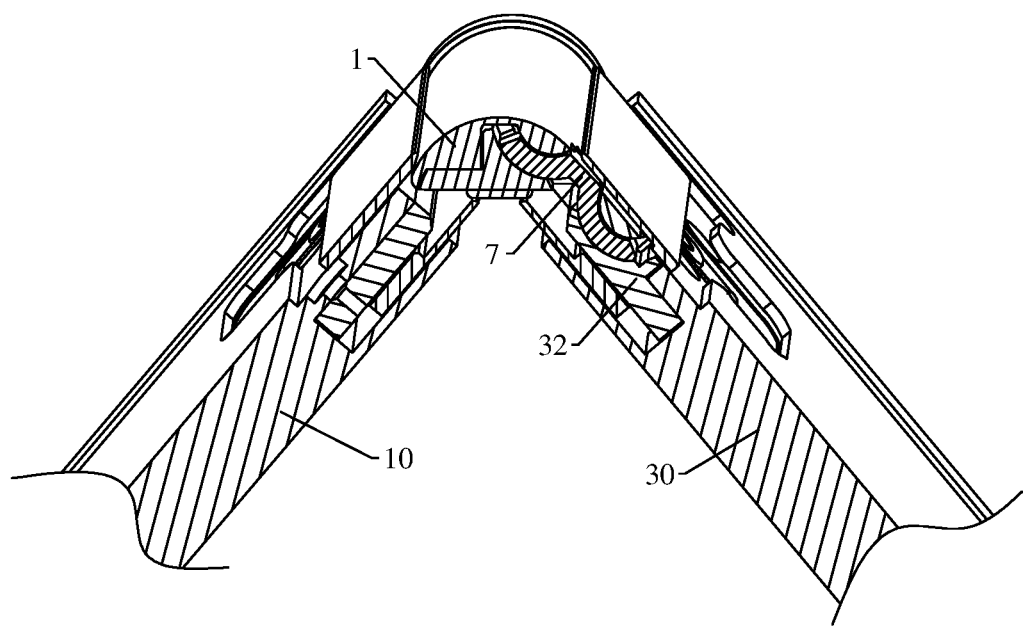
FIG. 43 is a schematic cross-sectional diagram of a structure of a position that is of a second rotating arm and that is corresponding to the folding apparatus shown in FIG. 4.
Figure 44:
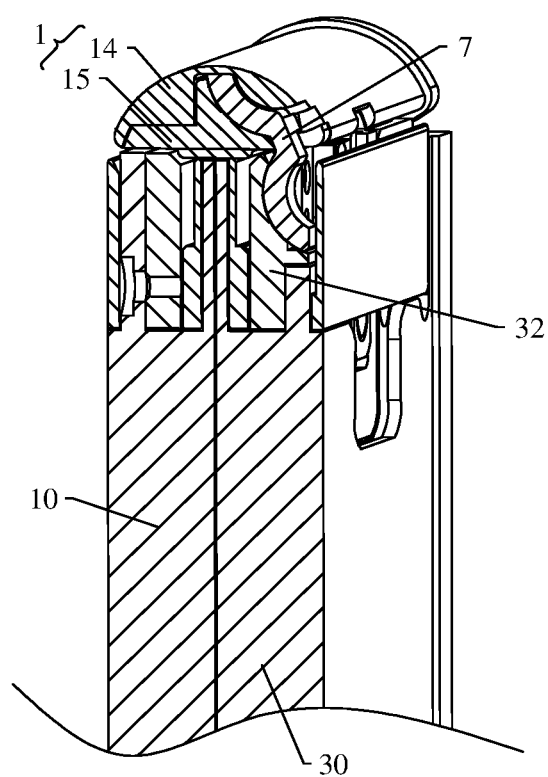
FIG. 44 is a schematic cross-sectional diagram of a structure of a position that is of a second rotating arm and that is corresponding to the folding apparatus shown in FIG. 6.

FIG. 42 is a schematic cross-sectional diagram of a structure of a position that is of the second rotating arm 7 and that is corresponding to the folding apparatus 100 shown in FIG. 2. FIG. 43 is a schematic cross-sectional diagram of a structure of a position that is of the second rotating arm 7 and that is corresponding to the folding apparatus 100 shown in FIG. 4. FIG. 44 is a schematic cross-sectional diagram of a structure of a position that is of the second rotating arm 7 and that is corresponding to the folding apparatus 100 shown in FIG. 6. FIG. 42 to FIG. 44 show position changes of the second rotating arm 7 obtained when the folding apparatus 100 is switched from the flattened state to the closed state.

As shown in FIG. 42, when the first housing 10 and the second housing 30 are unfolded relative to each other to the flattened state, one end of the second rotating arm 7 is in a rotate-out position relative to the main shaft assembly 1, and the other end of the second rotating arm 7 is in a rotate-out position relative to the second fixed bracket 32. As shown in FIG. 43, when the first housing 10 and the second housing 30 are in the intermediate state, one end of the second rotating arm 7 is in a partially rotate-out position/partially rotate-in position relative to the main shaft assembly 1, and the other end of the second rotating arm 7 is in a partially rotate-out position/partially rotate-in position relative to the second fixed bracket 32. As shown in FIG. 44, when the first housing 10 and the second housing 30 are folded relative to each other to the closed state, one end of the second rotating arm 7 is in a rotate-in position relative to the main shaft assembly 1, and the other end of the second rotating arm 7 is in a rotate-in position relative to the second fixed bracket 32.

In this embodiment, a position of the second rotating arm 7 and a position of the second transmission arm 6 (refer to FIG. 39 to FIG. 41) are mutually limited, and the second rotating arm 7 and the second transmission arm 6 jointly function, so that the second housing 30 can be rotated relative to the main shaft assembly 1 by using the flexible display 200 as a neutral surface.

For example, it can be learned from FIG. 42 to FIG. 44 that a rotation radian stroke of one end of the second rotating arm 7 in the second fixed bracket 32 is less than a rotation radian stroke of the other end of the second rotating arm 7 in the main shaft assembly 1. In some other embodiments, rotation radian strokes of the two ends of the second rotating arm 7 may alternatively be the same, or a rotation radian stroke of one end of the second rotating arm 7 in the second fixed bracket 32 is greater than a rotation radian stroke of the other end of the second rotating arm 7 in the main shaft assembly 1.

In this embodiment of this application, as shown in FIG. 33 to FIG. 44, the rotating mechanism 20 controls motion tracks of the first fixed bracket 31 and the first housing 10 by using both the first transmission arm 4 and the first rotating arm 5, and controls motion tracks of the second fixed bracket 32 and the second housing 30 by using both the second transmission arm 6 and the second rotating arm 7. Therefore, when the first housing 10 and the second housing 30 are folded relative to each other, the rotating mechanism 20 enables the first fixed bracket 31 to drive the first housing 10 to approach the main shaft assembly 1, and enables the second fixed bracket 32 to drive the second housing 30 to approach the main shaft assembly 1. When the first housing 10 and the second housing 30 are unfolded relative to each other, the rotating mechanism 20 enables the first fixed bracket 31 to drive the first housing 10 to move away from the main shaft assembly 1, and enables the second fixed bracket 32 to drive the second housing 30 to move away from the main shaft assembly 1. In other words, the rotating mechanism 20 can implement pulling-in of the housing when the folding apparatus 100 is switched from the flattened state to the closed state and pushing-out of the housing when the folding apparatus 100 is switched from the closed state to the flattened state, so that the folding apparatus 100 can implement deformation by using the flexible display 200 as a neutral surface when being unfolded or folded. In this way, a risk that the flexible display 200 is stretched or squeezed is reduced, to protect the flexible display 200 and improve reliability of the flexible display 200, so that the flexible display 200 and the electronic device 1000 have long service lives.

In addition, when the first housing 10 and the second housing 30 are folded relative to each other to the closed state by using the rotating mechanism 20, the first housing 10 and the second housing 30 can be completely closed, and there is no gap between the first housing 10 and the second housing 30 or a gap between the first housing 10 and the second housing 30 is small. Therefore, appearance integrity of the folding apparatus 100 is implemented, and self-shielding in appearance is implemented. Appearance integrity of the electronic device 1000 to which the folding apparatus 100 is applied is implemented, so that product reliability and user experience are improved.

In addition, the first transmission arm 4 is rotatably connected to the main shaft assembly 1 and slidably connected to the first fixed bracket 31 to form a link-slider structure, and the first rotating arm 5 is rotatably connected to the main shaft assembly 1 and rotatably connected to the first fixed bracket 31 to form a link structure. The second transmission arm 6 is rotatably connected to the main shaft assembly 1 and is slidably connected to the second fixed bracket 32 to form a link-slider structure. The second rotating arm 7 is rotatably connected to the main shaft assembly 1 and rotatably connected to the second fixed bracket 32 to form a link structure. In the rotating mechanism 20, the housing is connected to the main shaft assembly 1 by using the link-slider structure and the link structure. A quantity of components of the rotating mechanism 20 is small, a cooperation relationship and a cooperation position are simple, and the components are easy to manufacture and assemble. This facilitates mass production. In addition, because the main shaft assembly 1 is associated with the first fixed bracket 31 by using the first transmission arm 4 and the first rotating arm 5, and the main shaft assembly 1 is associated with the second fixed bracket 32 by using the second transmission arm 6 and the second rotating arm 7, the rotating mechanism 20 has a better mechanism stretching-resistance capability and mechanism squeezing-resistance capability.

As shown in FIG. 35, when the first housing 10 and the second housing 30 are folded relative to each other to the closed state, the main inner shaft 15 of the main shaft assembly 1 is located between the main outer shaft 14 and each of the first fixed bracket 31 and the second fixed bracket 32. As shown in FIG. 35, FIG. 38, FIG. 41 and FIG. 44, the rotation center around which the first transmission arm 4 rotates relative to the main shaft assembly 1 is close to the main inner shaft 15 and away from the main outer shaft 14, and the rotation center around which the first rotating arm 5 rotates relative to the main shaft assembly 1 is close to the main outer shaft 14 and away from the main inner shaft 15. The rotation center around which the second transmission arm 6 rotates relative to the main shaft assembly 1 is close to the main inner shaft 15 and away from the main outer shaft 14, and the rotation center around which the second rotating arm 7 rotates relative to the main shaft assembly 1 is close to the main outer shaft 14 and away from the main inner shaft 15.

In this embodiment, locations of the rotation center around which the first transmission arm 4 rotates relative to the main shaft assembly 1, the rotation center around which the first rotating arm 5 rotates relative to the main shaft assembly 1, the rotation center around which the second transmission arm 6 rotates relative to the main shaft assembly 1, and the rotation center around which the second rotating arm 7 rotates relative to the main shaft assembly 1 are set, so that the rotating mechanism 20 can more easily implement pulling-in of the housing when the folding apparatus 100 is switched from the flattened state to the closed state and pushing-out of the housing when the folding apparatus 100 is switched from the closed state to the flattened state.

As shown in FIG. 33, when the first housing 10 and the second housing 30 are unfolded relative to each other to the flattened state, the first supporting plate 21 is flush with the second supporting plate 22, the first supporting plate 21 is laid between the first fixed bracket 31 and the main shaft assembly 1, and the second supporting plate 22 is laid between the second fixed bracket 32 and the main shaft assembly 1. The first supporting plate 21, the main shaft assembly 1, and the second supporting plate 22 can jointly form a complete planar support for the bending part 2002 of the flexible display 200. As shown in FIG. 35, when the first housing 10 and the second housing 30 are folded relative to each other to the closed state, the first supporting plate 21 is stacked on a side that is of the first fixed bracket 31 and that is away from the second fixed bracket 32, and the second supporting plate 22 is stacked on a side that is of the second fixed bracket 32 and that is away from the first fixed bracket 31. The first supporting plate 21 and the second supporting plate 22 can slide and be accommodated relative to the first housing 10 and the second housing 30 respectively, so that the main shaft assembly 1 is exposed to form complete support for the bending part 2002 of the flexible display 200. In other words, when the folding apparatus 100 is in the flattened state or the closed state, the rotating mechanism 20 can completely support the bending part 2002 of the flexible display 200, thereby helping protect the flexible display 200 and improving user experience.

As shown in FIG. 33, when the first housing 10 and the second housing 30 are unfolded relative to each other to the flattened state, the first shielding plate 23 is flush with the second shielding plate 24, the first shielding plate 23 is laid between the first fixed bracket 31 and the main shaft assembly 1, and can shield a gap between the first fixed bracket 31 and the main shaft assembly 1, and the second shielding plate 24 is laid between the second fixed bracket 32 and the main shaft assembly 1, and can shield a gap between the second fixed bracket 32 and the main shaft assembly 1. Therefore, the folding apparatus 100 can implement self-shielding. In this way, appearance integrity is improved, a risk that dust, sundries, and the like enter the rotating mechanism 20 from outside can also be lowered, to ensure reliability of the folding apparatus 100. As shown in FIG. 35, when the first housing 10 and the second housing 30 are folded relative to each other to the closed state, the first shielding plate 23 can be accommodated between the first fixed bracket 31 and the first housing 10, and the second shielding plate 24 can be accommodated between the second fixed bracket 32 and the second housing 30, so that avoidance is achieved. In this way, the folding apparatus 100 can be smoothly folded to the closed form, and mechanism reliability is high.

As shown in FIG. 33 and FIG. 39, the first supporting plate 21 and the first shielding plate 23 are fastened to the sliding end 41 of the first transmission arm 4, and the first supporting plate 21 and the first shielding plate 23 move with the sliding end 41 of the first transmission arm 4, and the second supporting plate 22 and the second shielding plate 24 are fastened to the sliding end 61 of the second transmission arm 6, and the second supporting plate 22 and the second shielding plate 24 move with the sliding end 61 of the second transmission arm 6. Therefore, when the folding apparatus 100 is switched from the closed state to the flattened state or when the folding apparatus 100 is switched from the flattened state to the closed state, the first supporting plate 21 and the second supporting plate 22 gradually approach the main shaft assembly 1 or move away from the main shaft assembly 1, so that the folding apparatus 100 can completely support the flexible display 200 in various forms. In this way, reliability of the flexible display 200 and the electronic device 1000 is improved and service lives of the flexible display 200 and the electronic device 1000 are increased. In addition, when the folding apparatus 100 is switched from the closed state to the flattened state or when the folding apparatus 100 is switched from the flattened state to the closed state, the first shielding plate 23 and the second shielding plate 24 gradually approach the main shaft assembly 1 or move away from the main shaft assembly 1, so that the folding apparatus 100 in the various forms can adapt to forms of the rotating mechanism 20, to implement self-shielding. In this way, mechanism reliability is high.

Moreover, because both the first supporting plate 21 and the first shielding plate 23 are fastened to the sliding end 41 of the first transmission arm 4, and both the second supporting plate 22 and the second shielding plate 24 are fastened to the sliding end 61 of the second transmission arm 6, the first transmission arm 4 and the second transmission arm 6 not only control rotation actions of the first housing 10 and the second housing 30, but also control extending or retracting of the first supporting plate 21, the first shielding plate 23, the second supporting plate 22, and the second shielding plate 24. Therefore, the rotating mechanism 20 is highly integrated, an overall connection relationship is simple, and mechanism reliability is high.

Figure 45:
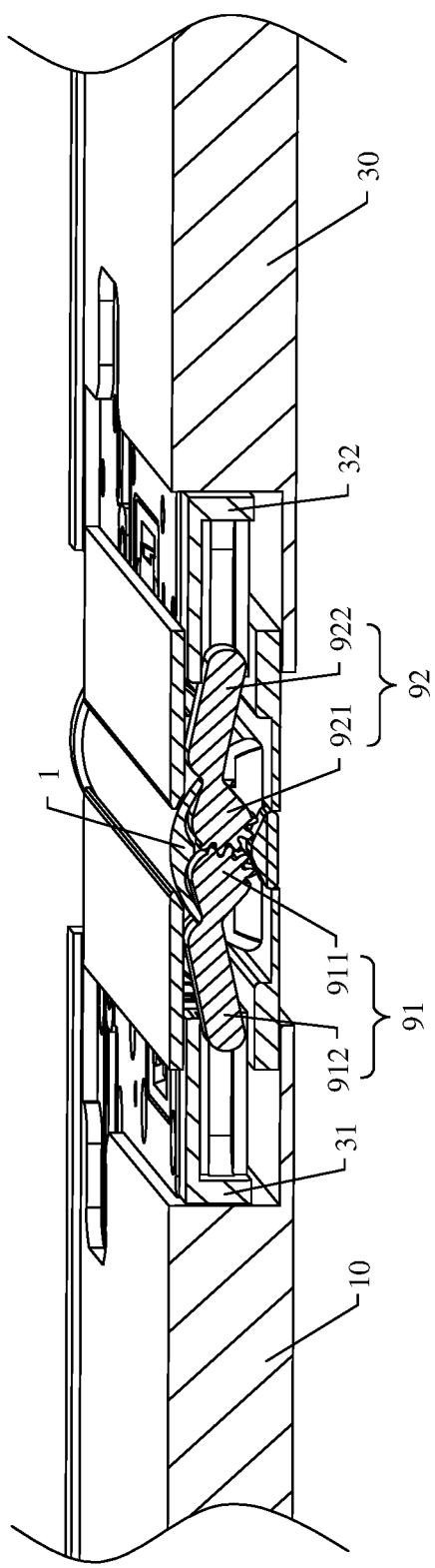
FIG. 45 is a schematic cross-sectional diagram of a structure of positions that are of a first synchronous swing arm and a second synchronous swing arm and that are corresponding to the folding apparatus shown in FIG. 2.
Figure 46:
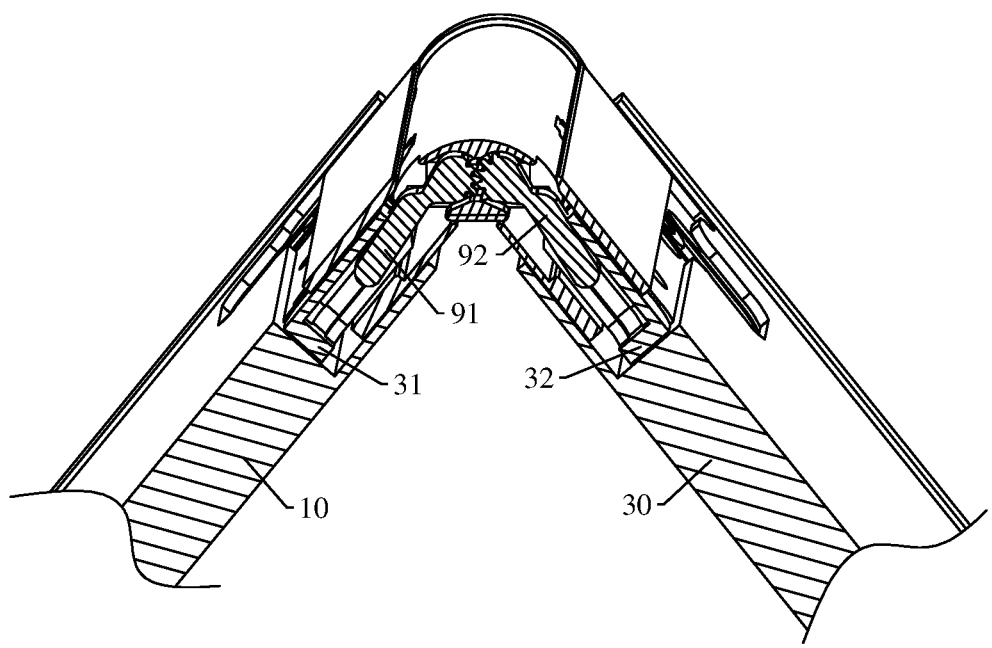
FIG. 46 is a schematic cross-sectional diagram of a structure of positions that are of a first synchronous swing arm and a second synchronous swing arm and that are corresponding to the folding apparatus shown in FIG. 4.
Figure 47:
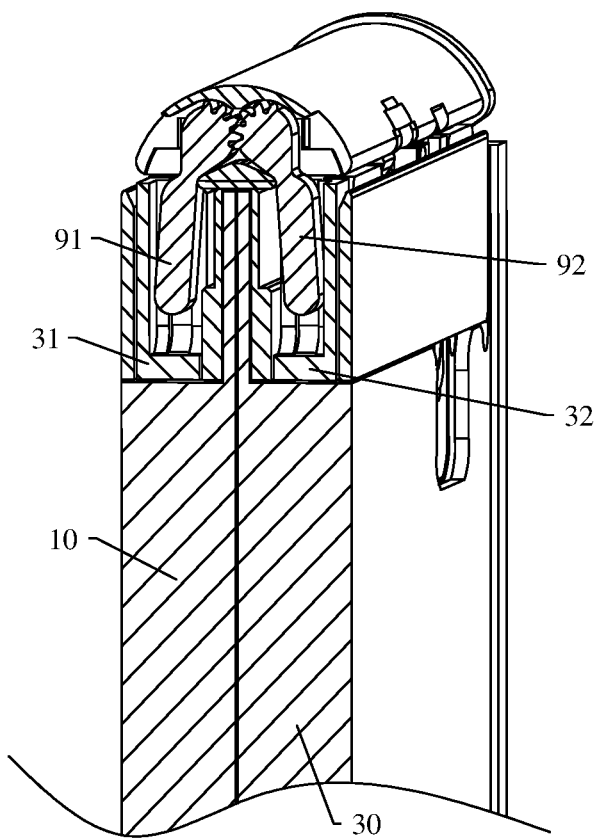
FIG. 47 is a schematic cross-sectional diagram of a structure of positions that are of a first synchronous swing arm and a second synchronous swing arm and that are corresponding to the folding apparatus shown in FIG. 6.

FIG. 45 is a schematic cross-sectional diagram of a structure of positions that are of the first synchronous swing arm 91 and the second synchronous swing arm 92 and that are corresponding to the folding apparatus 100 shown in FIG. 2. FIG. 46 is a schematic cross-sectional diagram of a structure of positions that are of the first synchronous swing arm 91 and the second synchronous swing arm 92 and that are corresponding to the folding apparatus 100 shown in FIG. 4. FIG. 47 is a schematic cross-sectional diagram of a structure of positions that are of the first synchronous swing arm 91 and the second synchronous swing arm 92 and that are corresponding to the folding apparatus 100 shown in FIG. 6. FIG. 45 to FIG. 47 show position changes of the first synchronous swing arm 91 and the second synchronous swing arm 92 obtained when the folding apparatus 100 is switched from the flattened state to the closed state.

As shown in FIG. 45, when the first housing 10 and the second housing 30 are unfolded relative to each other to the flattened state, the first synchronous swing arm 91 and the second synchronous swing arm 92 are in a flattened state, the first synchronous swing arm 91 is in an extend-out position relative to the first fixed bracket 31, the first synchronous swing arm 91 is away from the first fixed bracket 31 and the first housing 10, the second synchronous swing arm 92 is in an extend-out position relative to the second fixed bracket 32, and the second synchronous swing arm 92 is away from the second fixed bracket 32 and the second housing 30.

As shown in FIG. 46, when the first housing 10 and the second housing 30 are in the intermediate state, the first synchronous swing arm 91 and the second synchronous swing arm 92 are in an intermediate state, and an included angle is formed between the first synchronous swing arm 91 and the second synchronous swing arm 92. The first synchronous swing arm 91 is in a partially extend-out position/partially retracted position relative to the first fixed bracket 31, and the second synchronous swing arm 92 is in a partially extend-out position/partially retracted position relative to the second fixed bracket 32.

As shown in FIG. 47, when the first housing 10 and the second housing 30 are folded relative to each other to the closed state, the first synchronous swing arm 91 and the second synchronous swing arm 92 are in a folded state, the first synchronous swing arm 91 is in a retracted position relative to the first fixed bracket 31, the first synchronous swing arm 91 is close to the first fixed bracket 31 and the first housing 10, the second synchronous swing arm 92 is in a retracted position relative to the second fixed bracket 32, and the second synchronous swing arm 92 is close to the second fixed bracket 32 and the second housing 30.

In this embodiment, the rotating end 911 of the first synchronous swing arm 91 and the rotating end 921 of the second synchronous swing arm 92 are engaged with each other, and both the rotating end 911 of the first synchronous swing arm 91 and the rotating end 921 of the second synchronous swing arm 92 are rotatably connected to the main shaft assembly 1, the movable end 912 of the first synchronous swing arm 91 is movably connected to the first fixed bracket 31, and the movable end 922 of the second synchronous swing arm 92 is movably connected to the second fixed bracket 32. Therefore, when the first housing 10 and the second housing 30 are unfolded or folded relative to each other, the first synchronous swing arm 91 and the second synchronous swing arm 92 can control rotation angles of the first fixed bracket 31 and the second fixed bracket 32 to be consistent relative to the main shaft assembly 1, so that rotation actions of the first housing 10 and the second housing 30 are synchronous and consistent. Symmetry of folding actions and unfolding actions of the folding apparatus 100 is high. This helps improve user experience.

The first synchronous swing arm 91 is rotatably connected to the main shaft assembly 1, and slidably and rotatably connected to the first fixed bracket 31, so that a link-slider structure is formed. The second synchronous swing arm 92 is rotatably connected to the main shaft assembly 1, and slidably and rotatably connected to the second fixed bracket 32, so that a link-slider structure is formed. The two link-slider structures that are engaged with each other can effectively control the rotation actions of the first housing 10 and the second housing 30 to be synchronous and consistent.

According to embodiments of this application, the folding apparatus 100 can implement pulling-in of the housing when the folding apparatus 100 is switched from the flattened state to the closed state and pushing-out of the housing when the folding apparatus 100 is switched from the closed state to the flattened state, to implement deformation by using the flexible display 200 as a neutral surface when being unfolded or folded. In this way, a risk that the flexible display 200 is stretched or squeezed is reduced, to protect the flexible display 200 and improve reliability of the flexible display 200, so that the flexible display 200 and the electronic device 1000 have long service lives.

The foregoing descriptions are merely specific embodiments of this application, but are not intended to limit the protection scope of this application. Any variation or replacement readily figured out by a person skilled in the art within the technical scope disclosed in this application, for example, reducing or adding a mechanical part, or changing a shape of a mechanical part, shall fall within the protection scope of this application. In a case that no conflict occurs, embodiments in this application and features in embodiments may be mutually combined. Therefore, the protection scope of this application shall be subject to the protection scope of the claims.

What is claimed is:

1. A rotating mechanism, comprising:
a main shaft assembly;
a first fixed bracket;
a first transmission arm;
a first rotating arm;
a second fixed bracket;
a second transmission arm; and
a second rotating arm,
wherein the first transmission arm comprises a first sliding end and a first rotating end, wherein the first sliding end of the first transmission arm is slidably connected to the first fixed bracket, wherein the first rotating end of the first transmission arm is rotatably connected to the main shaft assembly, wherein first one end of the first rotating arm is rotatably connected to the first fixed bracket, and wherein first another end of the first rotating arm is rotatably connected to the main shaft assembly,
wherein the second transmission arm comprises a second sliding end and a second rotating end, wherein the second sliding end of the second transmission arm is slidably connected to the second fixed bracket, wherein the second rotating end of the second transmission arm is rotatably connected to the main shaft assembly, wherein second one end of the second rotating arm is rotatably connected to the second fixed bracket, and wherein second another end of the second rotating arm is rotatably connected to the main shaft assembly, and
wherein the rotating mechanism further comprises a first supporting plate and a second supporting plate, wherein the first supporting plate is fixedly connected to the first sliding end of the first transmission arm, and wherein the second supporting plate is fixedly connected to the second sliding end of the second transmission arm.

2. The rotating mechanism according to claim 1, wherein the main shaft assembly comprises a main inner shaft and a main outer shaft, wherein the main outer shaft is fastened to the main inner shaft, and wherein, when the rotating mechanism is folded to a closed state, the main inner shaft is located between the main outer shaft and each of the first fixed bracket and the second fixed bracket.

3. The rotating mechanism according to claim 2,
wherein a first distance between a first rotation center around which the first transmission arm rotates relative to the main shaft assembly and the main inner shaft is less than a second distance between the first rotation center around which the first transmission arm rotates relative to the main shaft assembly and the main outer shaft, and wherein a third distance between a second rotation center around which the first rotating arm rotates relative to the main shaft assembly and the main outer shaft is less than a fourth distance between the second rotation center around which the first rotating arm rotates relative to the main shaft assembly and the main inner shaft, and
a fifth distance between a third rotation center around which the second transmission arm rotates relative to the main shaft assembly and the main inner shaft is less than a sixth distance between the third rotation center around which the second transmission arm rotates relative to the main shaft assembly and the main outer shaft, and wherein a seventh distance between a fourth rotation center around which the second rotating arm rotates relative to the main shaft assembly and the main outer shaft is less than an eighth distance between the fourth rotation center around which the second rotating arm rotates relative to the main shaft assembly and the main inner shaft.

4. The rotating mechanism according to claim 2, wherein the main inner shaft and the main outer shaft jointly enclose a plurality of arc-shaped grooves,
wherein the first rotating end of the first transmission arm is arc-shaped and is disposed in a first arc-shaped groove of the plurality of arc-shaped grooves, and wherein a first end of the first rotating arm and rotatably connected to the main shaft assembly is arc-shaped and is disposed in a second arc-shaped groove of the plurality of arc-shaped grooves, and
wherein the second rotating end of the second transmission arm is arc-shaped and is disposed in a third arc-shaped groove of the plurality of arc-shaped grooves, and wherein a second end of the second rotating arm and rotatably connected to the main shaft assembly is arc-shaped and is disposed in a fourth arc-shaped groove of the plurality of arc-shaped grooves.

5. The rotating mechanism according to claim 4, wherein there is a fifth arc-shaped groove on the first fixed bracket, and wherein the first end of the first rotating arm and rotatably connected to the first fixed bracket is arc-shaped and is disposed in the fifth arc-shaped groove, and
wherein there is a sixth arc-shaped groove on the second fixed bracket, and wherein the second end of the second rotating arm and rotatably connected to the second fixed bracket is arc-shaped and is disposed in the sixth arc-shaped groove.

6. The rotating mechanism according to claim 5, wherein the first fixed bracket comprises a first fixed base and a first fastener, and wherein the first fastener is fastened to the first fixed base and encloses the fifth arc-shaped groove with the first fixed base.

7. The rotating mechanism according to claim 1, wherein there is a first sliding slot on the first fixed bracket, and wherein the first sliding end of the first transmission arm is disposed in the first sliding slot.

8. The rotating mechanism according to claim 1, wherein the rotating mechanism further comprises a first synchronous swing arm and a second synchronous swing arm,
wherein the first synchronous swing arm comprises a third rotating end and a first movable end, wherein the third rotating end of the first synchronous swing arm is rotatably connected to the main shaft assembly, wherein the first movable end of the first synchronous swing arm is movably connected to the first fixed bracket, and wherein, when the rotating mechanism is folded or unfolded, the first movable end of the first synchronous swing arm slides and rotates relative to the first fixed bracket, and wherein the second synchronous swing arm comprises a fourth rotating end and a second movable end, wherein the fourth rotating end of the second synchronous swing arm is rotatably connected to the main shaft assembly, wherein the fourth rotating end of the second synchronous swing arm is engaged with the third rotating end of the first synchronous swing arm, wherein the second movable end of the second synchronous swing arm is movably connected to the second fixed bracket, and wherein, when the rotating mechanism is folded or unfolded, the second movable end of the second synchronous swing arm slides and rotates relative to the second fixed bracket.

9. The rotating mechanism according to claim 8, wherein the third rotating end of the first synchronous swing arm comprises a first rotating body, a first rotating shaft, and a first gear, wherein the first rotating shaft is fastened to at least one of a first front facet or a first back facet of the first rotating body, the first gear is fastened to a first circumferential side facet of the first rotating body, and wherein the first rotating shaft is rotatably connected to the main shaft assembly, and wherein the fourth rotating end of the second synchronous swing arm comprises a second rotating body, a second rotating shaft, and a second gear, wherein the second rotating shaft is fastened to at least one of a second front facet or a second back facet of the second rotating body, wherein the second gear is fastened to a second circumferential side facet of the second rotating body, wherein the second rotating shaft is rotatably connected to the main shaft assembly, and wherein the second gear is engaged with the first gear.

10. The rotating mechanism according to claim 8, wherein there is a third sliding slot on the first fixed bracket, wherein there is a first recessed guiding space on a first slot wall of the third sliding slot, wherein the first movable end of the first synchronous swing arm has a third rotating shaft, wherein the first synchronous swing arm is disposed in the third sliding slot, and wherein the third rotating shaft is disposed in the first recessed guiding space of the third sliding slot, and wherein there is a fourth sliding slot on the second fixed bracket, wherein there is a second recessed guiding space on a second slot wall of the fourth sliding slot, wherein the second movable end of the second synchronous swing arm has a fourth rotating shaft, wherein the second synchronous swing arm is disposed in the fourth sliding slot, and wherein the fourth rotating shaft is disposed in the second recessed guiding space of the fourth sliding slot.

11. The rotating mechanism according to claim 1,
wherein, when the rotating mechanism is unfolded to a flattened state, wherein the first supporting plate is flush with the second supporting plate, wherein the first supporting plate is laid between the first fixed bracket and the main shaft assembly, and wherein the second supporting plate is laid between the second fixed bracket and the main shaft assembly, or
wherein, when the rotating mechanism is folded to a closed state, the first supporting plate is stacked on a first side of the first fixed bracket and away from the second fixed bracket, and wherein the second supporting plate is stacked on a second side of the second fixed bracket and away from the first fixed bracket.

12. The rotating mechanism according to claim 11, wherein the main shaft assembly has a supporting surface, wherein, when the rotating mechanism is folded to the closed state, the supporting surface of the main shaft assembly is exposed relative to the first supporting plate and the second supporting plate, and wherein the supporting surface of the main shaft assembly is arc-shaped.

13. The rotating mechanism according to claim 1, wherein the rotating mechanism further comprises a first shielding plate and a second shielding plate, wherein the first shielding plate is fixedly connected to the first sliding end of the first transmission arm, and wherein the second shielding plate is fixedly connected to the second sliding end of the second transmission arm, and wherein, when the rotating mechanism is unfolded relative to a flattened state, wherein the first shielding plate is flush with the second shielding plate, wherein the first shielding plate is laid between the first fixed bracket and the main shaft assembly, and wherein the second shielding plate is laid between the second fixed bracket and the main shaft assembly.

14. The rotating mechanism according to claim 1, wherein the rotating mechanism further comprises a third transmission arm, a third fixed bracket, a fourth transmission arm, and a fourth fixed bracket, wherein third one end of the third transmission arm is rotatably connected to the main shaft assembly, wherein third another end of the third transmission arm is slidably connected to the third fixed bracket, wherein fourth one end of the fourth transmission arm is rotatably connected to the main shaft assembly, and wherein fourth another end of the fourth transmission arm is slidably connected to the fourth fixed bracket.

15. The rotating mechanism according to claim 14, wherein a fifth rotation center around which the third transmission arm rotates relative to the main shaft assembly and a first rotation center around which the first transmission arm rotates relative to the main shaft assembly are collinear, and wherein a sixth rotation center around which the fourth transmission arm rotates relative to the main shaft assembly and a second rotation center around which the second transmission arm rotates relative to the main shaft assembly are collinear.

16. An electronic device, comprising:
a flexible display;
a first housing;
a rotating mechanism; and
a second housing,
wherein the rotating mechanism comprises a main shaft assembly, a first fixed bracket, a first transmission arm, a first rotating arm, a second fixed bracket, a second transmission arm, and a second rotating arm,
wherein the first fixed bracket is fastened to the first housing, wherein the first transmission arm comprises a first sliding end and a first rotating end, wherein the first sliding end of the first transmission arm is slidably connected to the first fixed bracket, wherein the first rotating end of the first transmission arm is rotatably connected to the main shaft assembly, wherein first one end of the first rotating arm is rotatably connected to the first fixed bracket, and wherein first another end of the first rotating arm is rotatably connected to the main shaft assembly, and
wherein the second fixed bracket is fastened to the second housing, the second transmission arm comprises a second sliding end and a second rotating end, wherein the second sliding end of the second transmission arm is slidably connected to the second fixed bracket, wherein the second rotating end of the second transmission arm is rotatably connected to the main shaft assembly, wherein second one end of the second rotating arm is rotatably connected to the second fixed bracket, and wherein second another end of the second rotating arm is rotatably connected to the main shaft assembly, wherein the rotating mechanism further comprises a first supporting plate and a second supporting plate, the first supporting plate is fixedly connected to the first sliding end of the first transmission arm, and the second supporting plate is fixedly connected to the second sliding end of the second transmission arm, and wherein the flexible display comprises a first part, a second part, and a third part that are sequentially arranged, wherein the first part is fastened to the first housing, wherein the third part is fastened to the second housing, and wherein, when the first housing and the second housing are folded or unfolded, a bending part deforms.

17. The electronic device according to claim 16, wherein the main shaft assembly comprises a main inner shaft and a main outer shaft, wherein the main outer shaft is fastened to the main inner shaft, and wherein, when the rotating mechanism is folded to a closed state, the main inner shaft is located between the main outer shaft and each of the first fixed bracket and the second fixed bracket.

18. The electronic device according to claim 17, wherein a first distance between a first rotation center around which the first transmission arm rotates relative to the main shaft assembly and the main inner shaft is less than a second distance between the first rotation center around which the first transmission arm rotates relative to the main shaft assembly and the main outer shaft, and a third distance between a second rotation center around which the first rotating arm rotates relative to the main shaft assembly and the main outer shaft is less than a fourth distance between the second rotation center around which the first rotating arm rotates relative to the main shaft assembly and the main inner shaft, and wherein a fifth distance between a third rotation center around which the second transmission arm rotates relative to the main shaft assembly and the main inner shaft is less than a sixth distance between the third rotation center around which the second transmission arm rotates relative to the main shaft assembly and the main outer shaft, and wherein a seventh distance between a fourth rotation center around which the second rotating arm rotates relative to the main shaft assembly and the main outer shaft is less than an eighth distance between the fourth rotation center around which the second rotating arm rotates relative to the main shaft assembly and the main inner shaft.

19. The electronic device according to claim 17, wherein the main inner shaft and the main outer shaft jointly enclose a plurality of arc-shaped grooves, wherein the first rotating end of the first transmission arm is arc-shaped and is disposed in a first arc-shaped groove of the plurality of arc-shaped grooves, and wherein a first end of the first rotating arm and rotatably connected to the main shaft assembly is arc-shaped and is disposed in a second arc-shaped groove of the plurality of arc-shaped grooves, and wherein the second rotating end of the second transmission arm is arc-shaped and is disposed in a third arc-shaped groove of the plurality of arc-shaped grooves, and wherein a second end of the second rotating arm and rotatably connected to the main shaft assembly is arc-shaped and is disposed in a fourth arc-shaped groove of the plurality of arc-shaped grooves.

20. The electronic device according to claim 19, wherein there is a fifth arc-shaped groove on the first fixed bracket, and wherein the first end of the first rotating arm and rotatably connected to the first fixed bracket is arc-shaped and is disposed in the fifth arc-shaped groove, and wherein there is a sixth arc-shaped groove on the second fixed bracket, and wherein the second end of the second rotating arm and rotatably connected to the second fixed bracket is arc-shaped and is disposed in the sixth arc-shaped groove.

* * * * *